(12) United States Patent
Otani

(10) Patent No.: US 6,456,788 B1
(45) Date of Patent: Sep. 24, 2002

(54) OPTICAL APPARATUS AND CAMERA PROVIDED WITH LINE-OF-SIGHT DETECTING DEVICE

(75) Inventor: Tadasu Otani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/932,316

(22) Filed: Aug. 17, 2001

(30) Foreign Application Priority Data

Aug. 21, 2000 (JP) .......................................... 2000-249680
Aug. 21, 2000 (JP) .......................................... 2000-249682

(51) Int. Cl.$^7$ ............................................... G03B 13/36
(52) U.S. Cl. ........................................... 396/51; 396/123
(58) Field of Search ........................... 396/51, 121, 122, 396/123

(56) References Cited

U.S. PATENT DOCUMENTS 5,708,862 A * 1/1998 Tsunekawa et al. ........... 396/51
5,721,967 A * 2/1998 Akashi ........................... 396/51
5,765,045 A * 6/1998 Takagi et al. ................... 396/51

* cited by examiner

Primary Examiner—W. B. Perkey
(74) Attorney, Agent, or Firm—Robin, Blecker & Daley

(57) ABSTRACT

An optical apparatus and a camera are provided, which have line-of-sight detecting means, and are capable of selecting a proper AF point selected even if the actually detected line of sight deviates significantly from the observer's intention and capable of reducing the time required for selecting the AF point. A plurality of focus detecting areas are provided on an observing screen, from which focus information on a subject is detected. A line-of-sight detecting device picks up an image of an eyeball of the user to detect the location of a gazing point of the user, A grouping circuit groups the focus detecting areas into a plurality of groups with priorities based on the detected location of the gazing point. A selecting circuit selects one of the groups according to the priorities and selects at least one focus detecting area from the selected group.

23 Claims, 43 Drawing Sheets

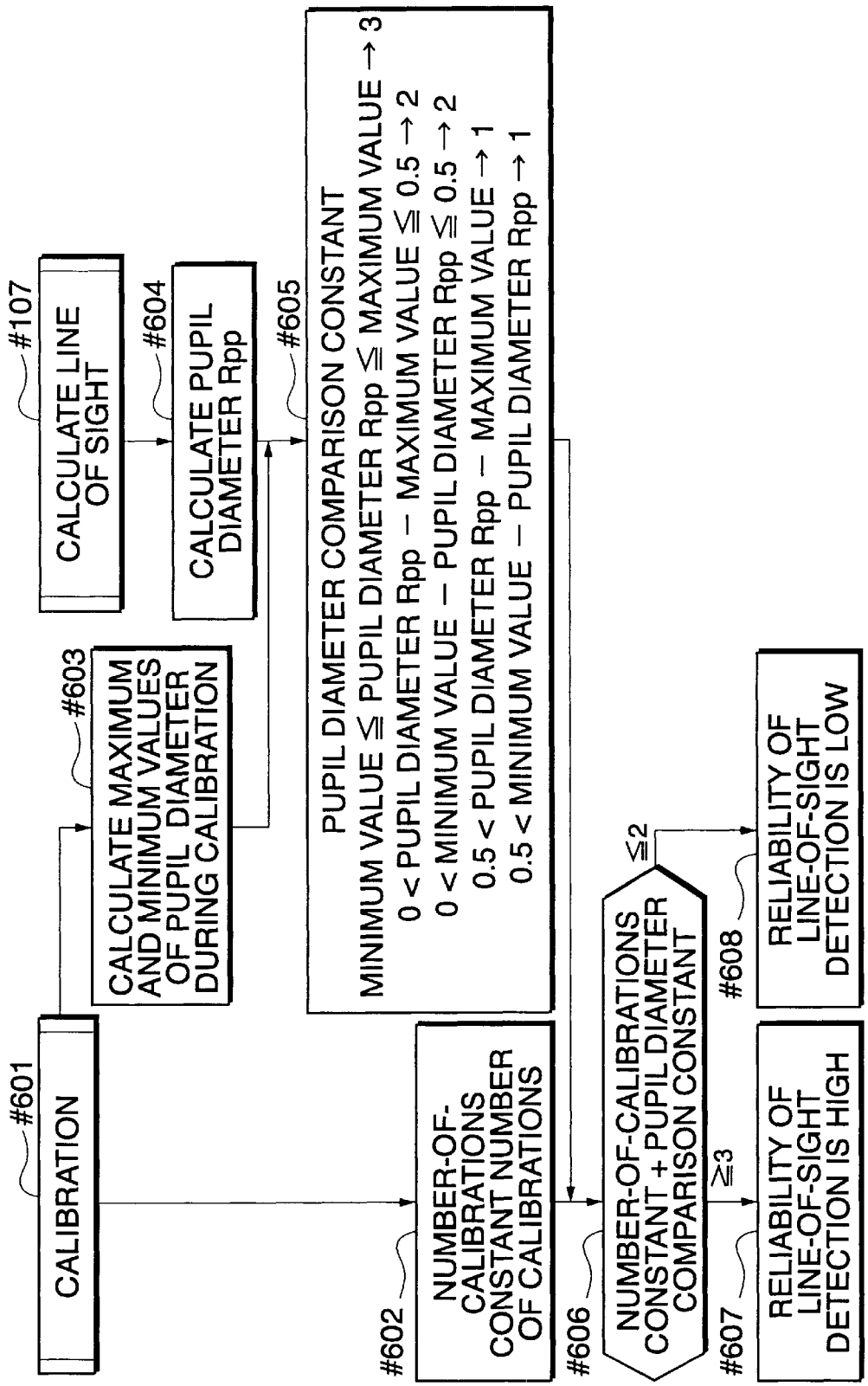

FIG. 11

| GAZING POINT AREA | CORRESPONDING AF POINT | GAZING POINT AREA | CORRESPONDING AF POINT | GAZING POINT AREA | CORRESPONDING AF POINT | GAZING POINT AREA | CORRESPONDING AF POINT | GAZING POINT AREA | CORRESPONDING AF POINT |
|---|---|---|---|---|---|---|---|---|---|
| L3·T | NONE | L3·U | 301 | L3·C | 301 | L3·D | 301 | L3·B | NONE |
| L2·T | NONE | L2·U | 301 | L2·C | 301 | L2·D | 301 | L2·B | NONE |
| L1·T | NONE | L1·U | 302 | L1·C | 302 | L1·D | 302 | L1·B | NONE |
| C·T | 306 | C·U | 306 | C·C | 303 | C·D | 307 | C·B | 307 |
| R1·T | NONE | R1·U | 304 | R1·C | 304 | R1·D | 307 | R1·B | NONE |
| R2·T | NONE | R2·U | 305 | R2·C | 305 | R2·D | 305 | R2·B | NONE |
| R3·T | NONE | R3·U | 305 | R3·C | 305 | R3·D | 305 | R3·B | NONE |

*FIG. 14*

GROUPING TABLE 1: CAMERA IN REGULAR POSITION/HIGH LINE-OF-SIGHT DETECTION RELIABILITY

| GROUPING | GAZING POINT AREA | CORRESPONDING AF POINT | FIRST PRIORITY GROUP OF AF POINTS | SECOND PRIORITY GROUP OF AF POINTS | CORRESPONDING FIGURE |
|---|---|---|---|---|---|
| 1-1 | C·U | 306 | 303 302 304 306 | 301 305 307 | FIG. 18A |
| 1-2 | C·T | 303 | 307 302 303 304 | 301 306 305 | FIG. 18B |
| | C·C | 307 | | | |
| | C·D | 304 | 304 305 | 301 302 303 306 307 | FIG. 18C |
| 1-3 | C·B | 305 | | | |
| | R1·C | 304 | | | |
| | R2·C | 304 | | | |
| | R2·U | 305 | | | |
| | R3·C | 302 | | | |
| | R3·D | 301 | | | |
| 1-4 | R1·U | 304 | 304 303 305 306 | 301 302 307 | FIG. 18D |
| 1-5 | R1·D | 304 | 304 303 305 306 307 | 301 302 | FIG. 18E |
| | R2·D | 305 | | | |
| 1-6 | L1·C | 302 | 302 301 | 304 305 303 306 307 | |
| | L2·C | 301 | | | |
| | L2·U | | | | |
| | L3·C | | | | |
| | L3·D | | | | |
| 1-7 | L1·U | 302 | 302 303 301 306 | 304 305 307 | NONE |
| 1-8 | L1·D | 302 | 302 303 306 307 | 304 305 | NONE |
| | L2·D | 301 | | | |
| | L3·T | NONE | AUTOMATICALLY SELECT AF POINT | | FIG. 18F |
| | L2·T | NONE | | | |
| | L1·T | NONE | | | |
| | R1·T | NONE | | | |
| 1-9 | R2·T | NONE | | | |
| | R3·T | NONE | | | |
| | L3·B | NONE | | | |
| | L2·B | NONE | | | |
| | L1·B | NONE | | | |
| | R1·B | NONE | | | |
| | R2·B | NONE | | | |
| | R3·B | NONE | | | |

CAMERA IN REGULAR POSITION/HIGH LINE-OF-SIGHT DETECTION RELIABILITY

GROUPING TABLE 2: CAMERA IN REGULAR POSITION/LOW LINE-OF-SIGHT DETECTION RELIABILITY

| GROUPING | GAZING POINT AREA | CORRESPONDING AF POINT | FIRST PRIORITY GROUP OF AF POINTS | SECOND PRIORITY GROUP OF AF POINTS | CORRESPONDING FIGURE |
|---|---|---|---|---|---|
| 2-1 | C·U<br>C·T | 306<br>303 | 302 304 306 301<br>303 305 | 307 | FIG. 19A |
| 2-2 | C·C<br>C·D | 303<br>307 | 307 302 303 304 306 | 301 305 | FIG. 19B |
| 2-3 | C·B<br>R1·C<br>R2·C<br>R2·U<br>R3·U<br>R3·C<br>R3·D | 304<br>305 | 304 305 303 306 | 301 302 307 | FIG. 19C |
| 2-4 | R1·U<br>R1·D | 304<br>304 | 304 303 305 306 302<br>304 303 305 306 307 | 301 307<br>301 | FIG. 19D |
| 2-5 | R2·D | 305 | 302 | | FIG. 19E |
| 2-6 | L1·C<br>L2·C<br>L2·U<br>L3·U<br>L3·C<br>L3·D | 302<br>301 | 302 301 303 306 | 304 305 307 | NONE |
| 2-7 | L1·U<br>L1·D | 302<br>302 | 302 303 301 306 301<br>302 303 301 306 307 | 305 307<br>305 | NONE<br>NONE |
| 2-8 | L2·D | 301 | 304 | | |
| 2-9 | L3·T<br>L2·T<br>L1·T<br>R1·T<br>R2·T<br>R3·T<br>L3·B<br>L2·B<br>L1·B<br>R1·B<br>R2·B<br>R3·B | NONE<br>NONE<br>NONE<br>NONE<br>NONE<br>NONE<br>NONE<br>NONE<br>NONE<br>NONE<br>NONE<br>NONE | AUTOMATICALLY SELECT AF POINT | | FIG. 19F |

CAMERA IN REGULAR POSITION/LOW LINE-OF-SIGHT DETECTION RELIABILITY

FIG. 15

GROUPING TABLE 3: CAMERA IN VERTICAL POSITION WITH GRIP POSITIONED UPWARD/HIGH LINE-OF-SIGHT DETECTION RELIABILITY

FIG. 16

| GROUPING | GROUPING | GAZING POINT AREA | | FIRST PRIORITY GROUP OF AF POINTS CORRESPONDING AF POINT | SECOND PRIORITY GROUP OF AF POINTS | THIRD PRIORITY GROUP OF AF POINTS | CORRESPONDING FIGURE |
|---|---|---|---|---|---|---|---|
| | 3-1 | R1·C | 304 | 304 305 | 303 306 307 | 301 302 | FIG.20A |
| | | R2·C | 305 | | | | |
| | | R2·U | | | | | |
| | | R2·D | | | | | |
| | | R3·U | | | | | |
| | | R3·C | | | | | |
| | | R3·D | | | | | |
| | 3-2 | C·C | 303 | 303 306 | 304 305 | 301 302 | FIG.20B |
| | 3-3 | L1·C | 302 | 302 303 306 | 301 | 304 305 | FIG.20C |
| | 3-4 | L2·C | 301 | 301 302 | | | FIG.20D |
| | | L2·U | | | | | |
| | | L2·D | | | | | |
| | | L3·U | | | | | |
| | | L3·C | | | | | |
| | | L3·D | | | | | |
| | 3-5 | R1·D | 304 | 304 303 307 | 305 306 | 301 302 | FIG.20E |
| | | C·D | 307 | | | | |
| | | C·B | | | | | |
| | 3-6 | L1·D | 302 | 302 303 304 307 | 301 | 306 305 | FIG.20F |
| | 3-7 | L1·B | 306 | 304 303 306 | 305 307 | 301 302 | NONE |
| | | C·U | | | | | |
| | | C·T | | | | | |
| | 3-8 | R1·U | 304 | 302 303 304 306 | 301 | 305 307 | NONE |
| | 3-9 | L1·U | 302 | AUTOMATICALLY SELECT AF POINT | | | NONE |
| | | L3·T | NONE | | | | |
| | | L2·T | NONE | | | | |
| | | L1·T | NONE | | | | |
| | | R1·T | NONE | | | | |
| | | R2·T | NONE | | | | |
| | | R3·T | NONE | | | | |
| | | L3·B | NONE | | | | |
| | | L2·B | NONE | | | | |
| | | L1·B | NONE | | | | |
| | | R1·B | NONE | | | | |
| | | R2·B | NONE | | | | |
| | | R3·B | NONE | | | | |

CAMERA IN VERTICAL POSITION WITH GRIP POSITIONED UPWARD/HIGH LINE-OF-SIGHT DETECTION RELIABILITY

GROUPING TABLE 4: CAMERA IN VERTICAL POSITION WITH GRIP POSITIONED UPWARD/LOW LINE-OF-SIGHT DETECTION RELIABILITY

FIG. 17

| GROUPING | GAZING POINT AREA | CORRESPONDING AF POINT | FIRST PRIORITY GROUP OF AF POINTS | SECOND PRIORITY GROUP OF AF POINTS | THIRD PRIORITY GROUP OF AF POINTS | CORRESPONDING FIGURE |
|---|---|---|---|---|---|---|
| 4-1 | R1·C | 304 | 304 305 303 306 | 301 302 | | FIG.21A |
| | R2·C | 305 | 304 307 | | | |
| | R2·U | | | | | |
| | R2·D | | | | | |
| | R3·U | | | | | |
| | R3·C | | | | | |
| | R3·D | | | | | |
| 4-2 | C·C | 303 | 303 306 307 304 | 305 | 301 | FIG.21B |
| | L1·C | 302 | 302 | | | |
| 4-3 | L2·C | 301 | 301 302 303 306 | 304 305 | | FIG.21C |
| | L2·U | | 307 | | | |
| | L2·D | | | | | |
| | L3·U | | | | | |
| | L3·C | | | | | |
| | L3·D | | | | | |
| 4-4 | R1·D | 304 | 304 303 307 305 | 306 | 301 302 | FIG.21D |
| | C·D | 307 | | | | |
| | C·B | | | | | |
| 4-5 | L1·D | 302 | 305 303 304 307 | 301 302 | 306 | FIG.21E |
| | L1·B | NONE | | | | |
| 4-6 | C·U | 306 | 304 303 306 305 | 307 | 301 302 | NONE |
| | C·T | | | | | |
| 4-7 | R1·U | 304 | 303 304 305 306 | 301 302 | 307 | NONE |
| | L1·U | 302 | | | | |
| | L1·T | NONE | | | | |
| 4-8 | L3·T | NONE | AUTOMATICALLY SELECT AF POINT | | | |
| | L2·T | NONE | | | | |
| | R1·T | NONE | | | | |
| | R2·T | NONE | | | | |
| | R3·T | NONE | | | | |
| | L3·B | NONE | | | | |
| | L2·B | NONE | | | | |
| | R1·B | NONE | | | | |
| | R2·B | NONE | | | | |
| | R3·B | NONE | | | | |

CAMERA IN VERTICAL POSITION WITH GRIP POSITIONED UPWARD/LOW LINE-OF-SIGHT DETECTION RELIABILITY

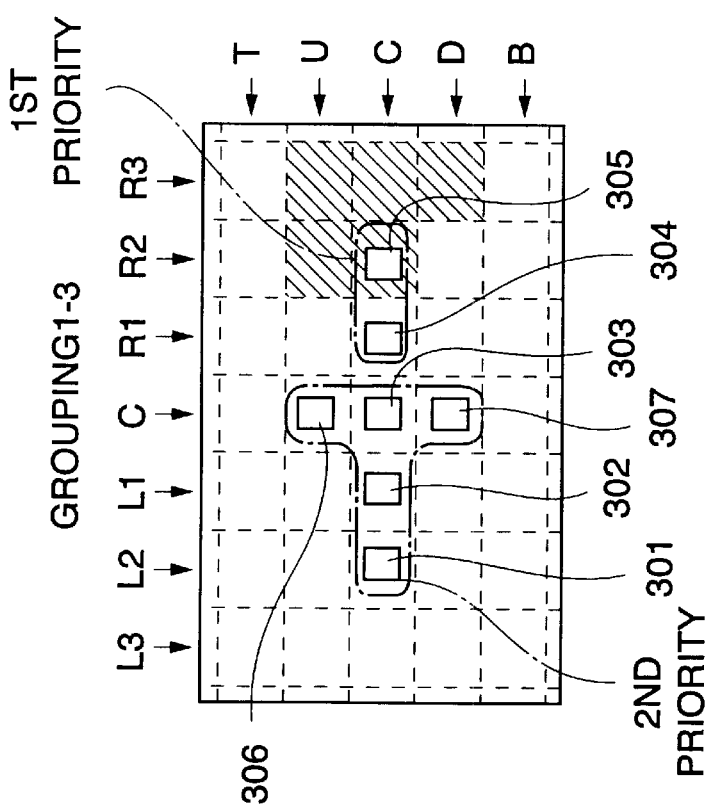

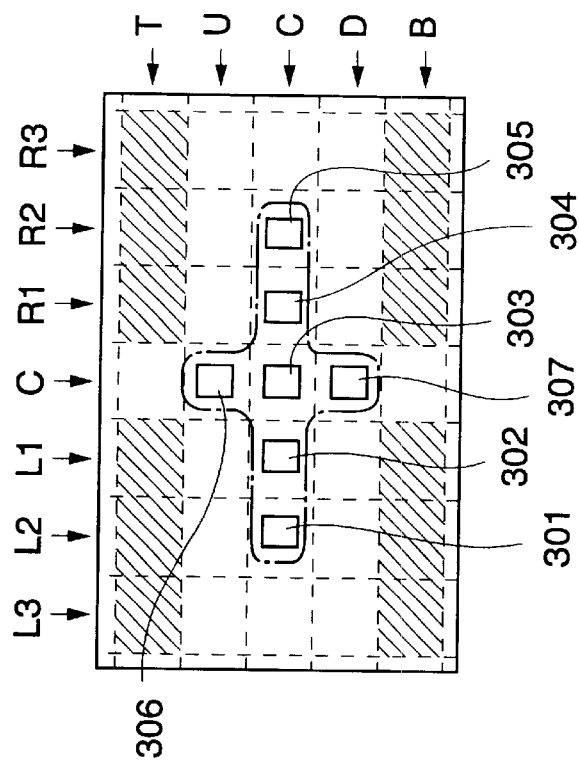
FIG.18F GROUPING1-9
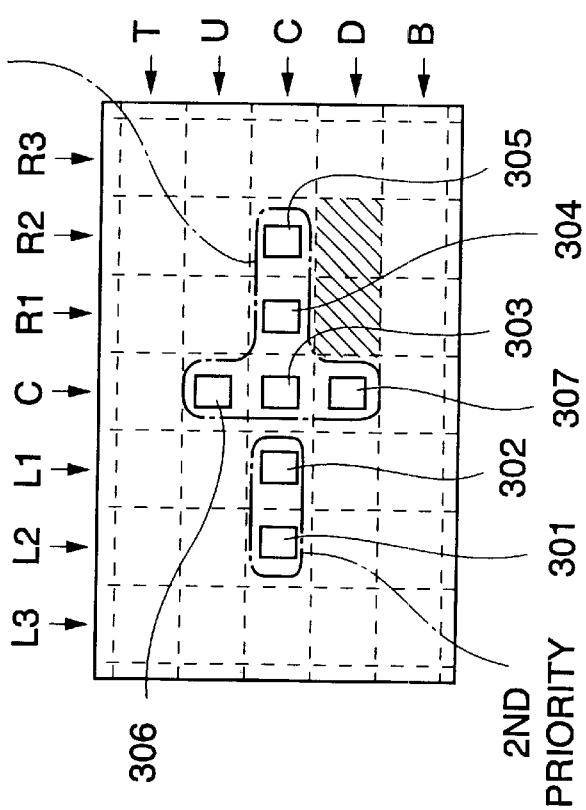
FIG.18E GROUPING1-5

GROUPING 2-1

GROUPING 2-2

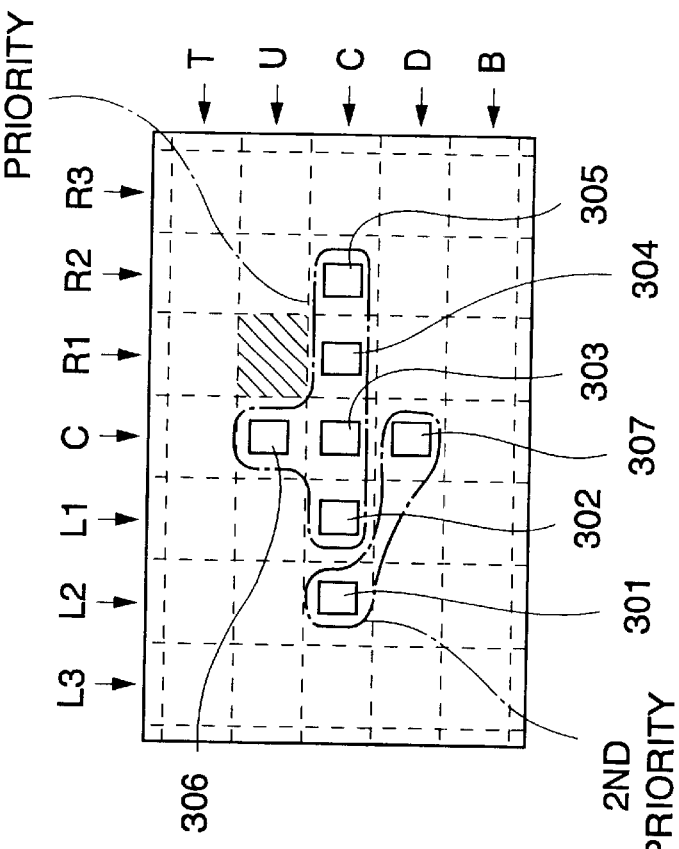
FIG. 19D GROUPING 2-4
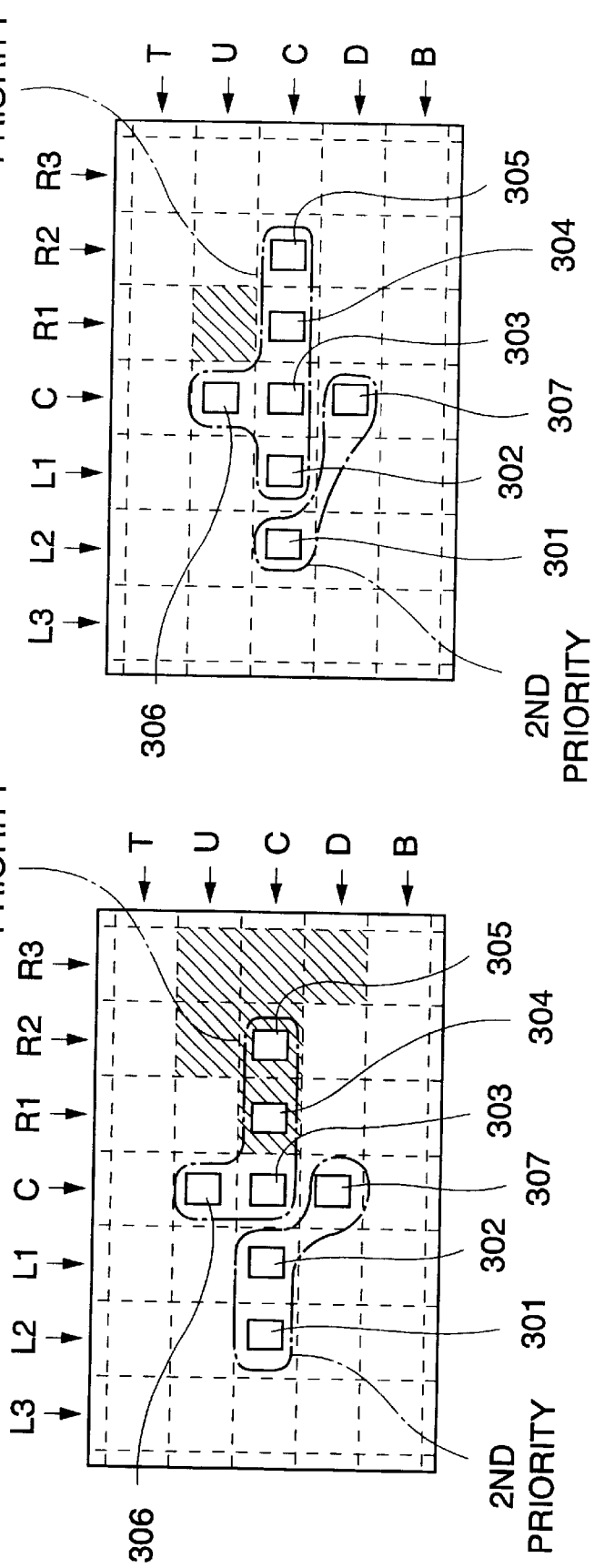
FIG. 19C GROUPING 2-3

GROUPING 2-5

GROUPING 2-9

GROUPING 3-1

GROUPING 3-2

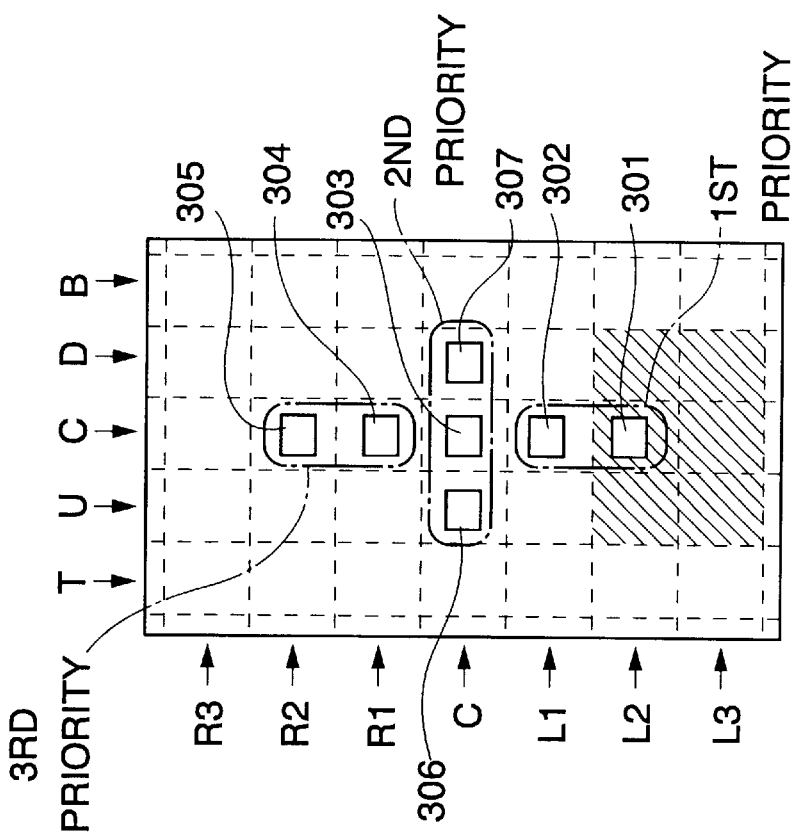
FIG. 20C GROUPING 3-3
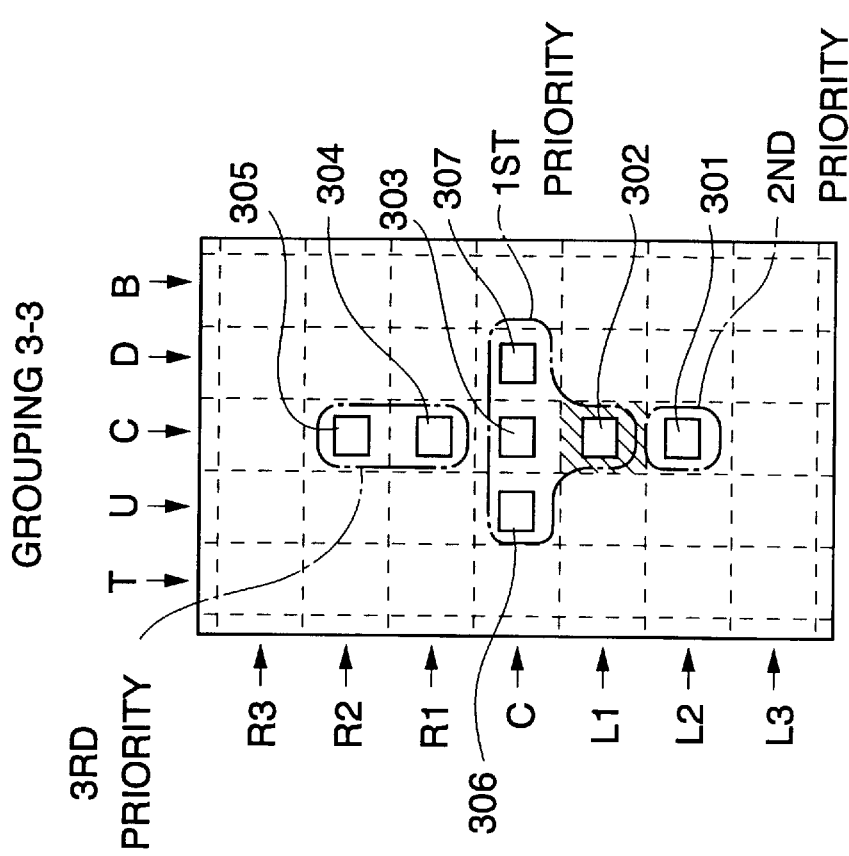
FIG. 20D GROUPING 3-4

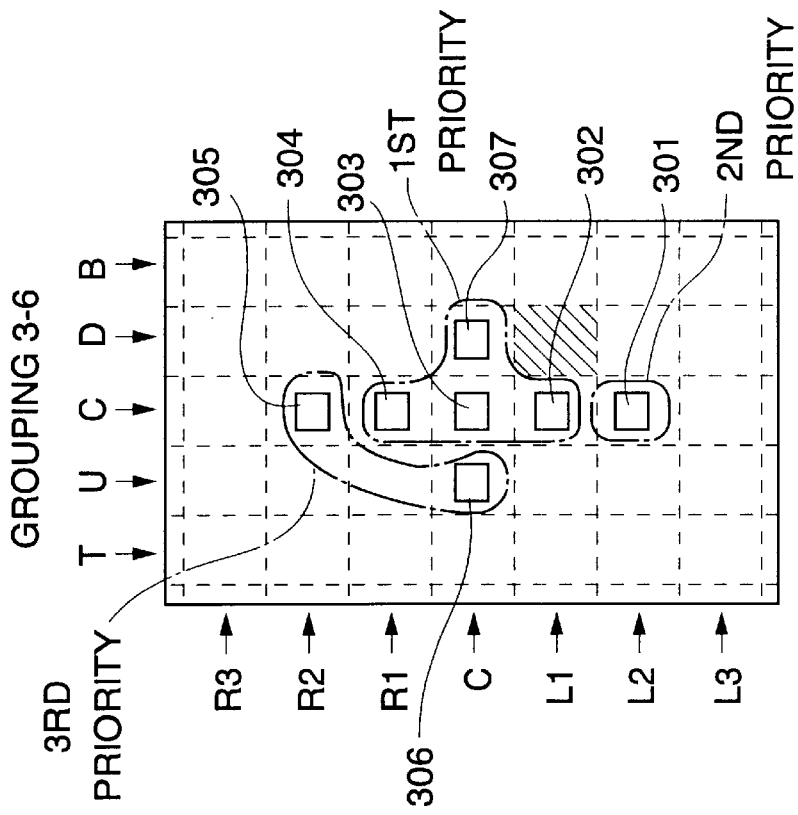
FIG. 20E GROUPING 3-5
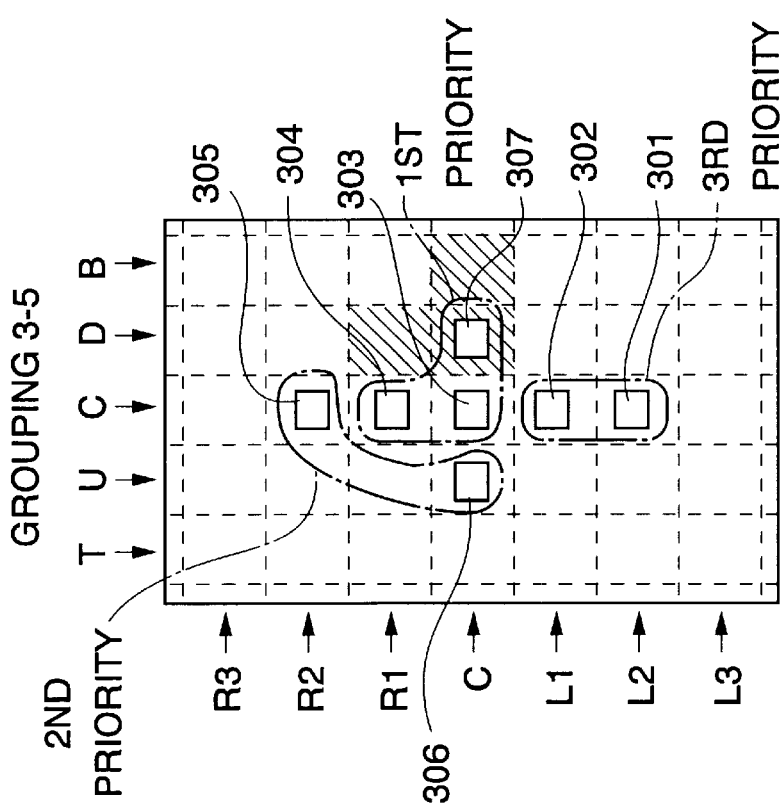
FIG. 20F GROUPING 3-6

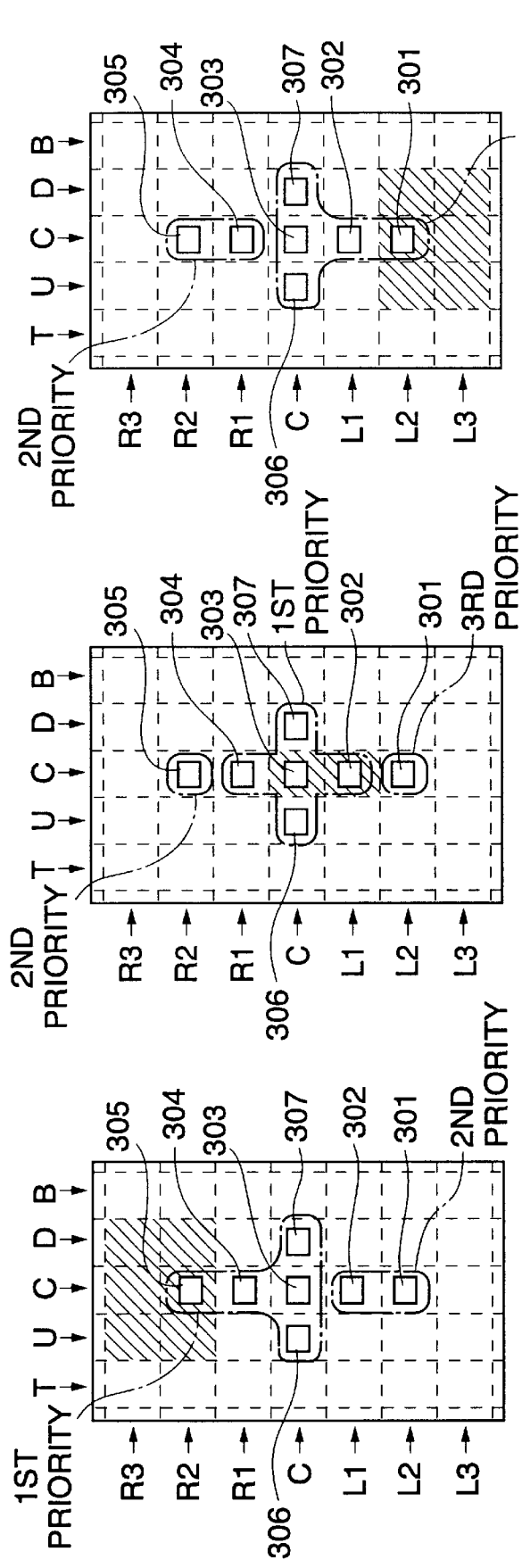

GROUPING 4-5

GROUPING 4-4

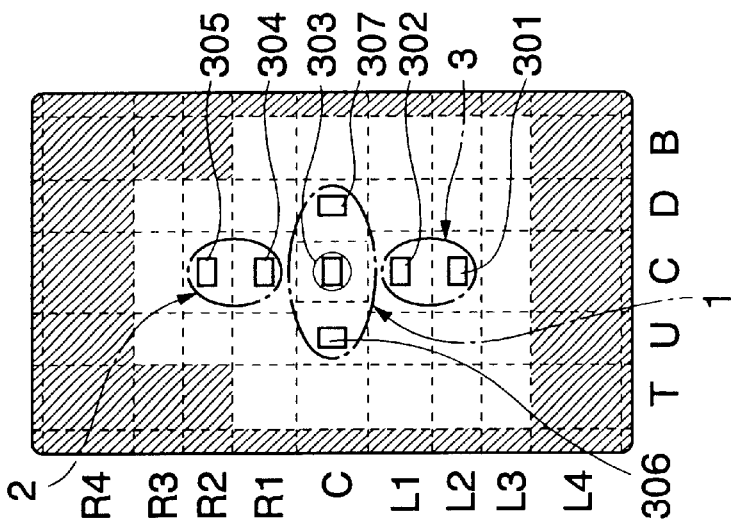
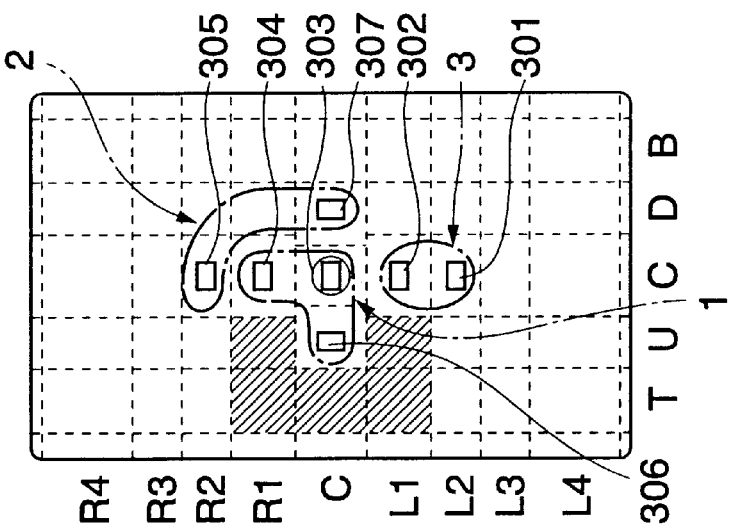
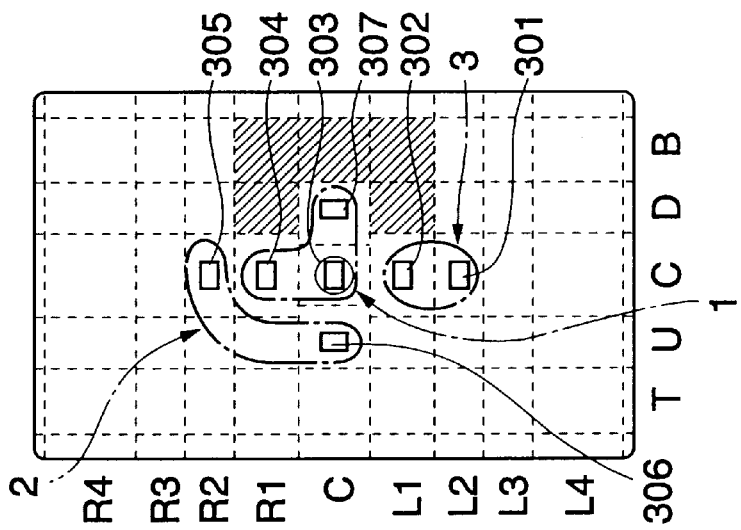

OPTICAL APPARATUS AND CAMERA PROVIDED WITH LINE-OF-SIGHT DETECTING DEVICE

BACKGROUND OF THE INVENTION

1. Field of the Invention

The present invention relates to improvements of an optical apparatus and a camera having line-of-sight detecting means for detecting a line of sight, i.e. gazing point of a user.

2. Description of the Related Art

An apparatus is known, which detects a gazing point of a photographer, that is, his line-of-sight direction from an output from a sensor for detecting an image of the photographer's eyeball. A camera having a line-of-sight detecting function has been provided, which uses the photographer's line of sight to select a focus detecting area (hereinafter referred to as "the AF point") reflecting the photographer's intention.

Apparatuses of this kind are based on the fact that a point on an observing screen that the observer (photographer) intends to observe coincides with his line of sight (the point on the screen which he is actually viewing). However, the observer's line of sight actually deviates from his intention, and for example, even if he intends to view a predetermined point, his line of sight may temporally delay in reaching the point. Further, after the observer's line of sight has coincided with the point the observer intends to view, it may be affected by a human physiological factor; the line of sight may move due to fine movement of the observer's eyeball. Moreover, the observing apparatus may tremble while being held by the photographer, to change the relative positional relationship between the observer's eyeball and the observing apparatus, thereby moving the gazing point obtained through the line-of-sight detection. These factors cause the detected line of sight to deviate from the point on the observing screen that the observer intends to observe.

Thus, the observer's line of sight does not always coincide with the point on the observing screen that he intends to observe, and the gazing point obtained through the line-of-sight detection is distributed to a certain extent with respect to the point that the observer intends to observe. That is, the detected gazing point reflects the point that the observer intends to observe, but is not always accurate.

Thus, to compensate for this, proposals have been made, which take into consideration defocus information on the AF point near the gazing point as well as the reliability of the line-of-sight detection, that is, how reliable results of the line-of-sight detection are.

According to U.S. Pat. No. 6,229,959, focusing is carried out by selecting one of a plurality of AF points near the gazing point based on defocus information on these AF points. According to U.S. Pat. No. 5,614,985, focusing is carried out by selecting one of AF points adjacent the gazing point. Further, according to Japanese Laid-Open Patent Publication (Kokai) No. 11-014897, when the camera is in a vertical position, the line-of-sight detection is not so reliable, so that focusing is carried out by selecting one of AF points vertically adjacent one selected by the line-of-sight detection.

These prior art techniques make it prerequisite that AF point is selected based on the line of sight and that the gazing point obtained from the observer's line of sight is present near the AF point, and determine the AF point near or adjacent the gazing point.

Further, a plurality of areas constituting a range of AF points which can be selected for focusing concentrate in the vicinity of the location of the gazing point or consist of areas adjacent the AF point selected based on the gazing point. Therefore, the selection range of AF points is not set to be wide.

Moreover, if a small number of AF points are arranged in one dimension, the selection range can be extended only in the one dimension. Further, there already exists a camera in which AF points are arranged in two dimensions, but the extension of the selection range and its direction must be indicated. Further, the observer's gazing point does not always lead to a high probability that a main subject is present at one of the plurality of AF points arranged on the observing screen.

According to Japanese Laid-Open Patent Publication (Kokai) No. 8-152552, each AF point is weighted based on gazing point information, the reliability thereof and also weighted based on defocus information. Then, an AF point having the highest score based on the sum of the resulting two weighted values is selected, and focusing is carried out based on defocus information obtained from the selected AF point.

The defocus information, however, must be calculated for each of the AF points, so that a long time is required after the weighting calculation based on the gazing point information and the reliability thereof has been started and before one AF point is selected. Thus, the prior art leaves room for improvement; it is desirable that a proper AF point can be selected even if the actually detected line of sight deviates significantly from the observer's intention and that the time required for selecting the AF point is reduced.

SUMMARY OF THE INVENTION

It is therefore an object of the present invention to provide an optical apparatus and a camera having line-of-sight detecting means, which are capable of selecting a proper AF point selected even if the actually detected line of sight deviates significantly from the observer's intention and capable of reducing the time required for selecting the AF point.

To attain the above object, a first aspect of the present invention provides an optical apparatus comprising a plurality of focus detecting areas provided on an observing screen and from which focus information on a subject is detected, a line-of-sight detecting device that picks up an image of an eyeball of a user to detect a location of a gazing point of the user, a grouping circuit that groups the focus detecting areas into a plurality of groups with priorities based on the detected location of the gazing point, and a selecting circuit that selects one of the groups according to the priorities and selects at least one focus detecting area from the selected group.

Preferably, the optical apparatus according to the first aspect further comprises a position detecting device that detects position information on a position of the optical apparatus, and the grouping circuit groups the focus detecting areas into the plurality of groups with priorities based on the detected location of the gazing point and the detected position information.

Preferably, the optical apparatus according to the first aspect further comprises a reliability determining circuit that determines reliability of the detected location of the gazing point, and the grouping circuit groups the focus detecting areas into the plurality of groups with priorities based on the detected location of the gazing point and a result of the determination of the reliability.

Also preferably, the grouping circuit executes the grouping according to preset tables.

In a preferred embodiment, the selecting circuit executes a process of selecting a focus detecting area from a group with a higher priority of the plurality of groups, and if the selection from this group fails, executes a process of selecting a focus detecting area from each of the remaining groups by sequentially lowering the priority of the group until the selection succeeds.

Preferably, the plurality of groups includes a group with a highest priority that contains a focus detecting area near the location of the gazing point.

Also preferably, the selecting circuit uses different selecting methods between a group with a highest priority and the other groups of the plurality of groups.

More preferably, the optical apparatus according to the first aspect further comprises a correcting circuit that corrects individual differences in eyeball characteristics of the user, and the reliability determining circuit determines the reliability of the detected location of the gazing point using a size of the user's pupil detected by the correcting circuit and a number of corrections executed by the correcting circuit.

To attain the above object, the first aspect of the present invention further provides an optical apparatus comprising a plurality of focus detecting areas provided on an observing screen and from which focus information on a subject is detected, a line-of-sight detecting device that picks up an image of an eyeball of a user to detect a location of a gazing point of the user, a storage circuit that stores tables used to group the focus detecting areas into a plurality of groups with priorities based on the detected location of the gazing point, and a selecting circuit that selects one of the groups according to the priorities and selects at least one focus detecting area from the selected group.

Preferably, the optical apparatus according to the first aspect further comprises a position detecting device that detects position information on a position of the optical apparatus and a reliability determining circuit that determines reliability of the detected location of the gazing point, and the grouping circuit groups the focus detecting areas into the plurality of groups with priorities based on the detected location of the gazing point, the detected position information, and the determined reliability.

To attain the above object the first aspect of the present invention also provides an optical apparatus comprising a plurality of ranging areas provided on an observing screen and from which information on a distance to a subject is detected, a line-of-sight detecting device that picks up an image of an eyeball of a user to detect a location of a gazing point of the user, a grouping circuit that groups the ranging areas into a plurality of groups with priorities based on the detected location of the gazing point, and a selecting circuit that selects one of the groups according to the priorities and selects at least one ranging area from the selected group.

To attain the above object, the first aspect of the present invention also provides an optical apparatus comprising a plurality of ranging areas provided on an observing screen and from which focus information on a subject is detected, a line-of-sight detecting device that picks up an image of an eyeball of a user to detect a location of a gazing point of the user, a storage circuit that stores tables used to group the ranging areas into a plurality of groups with priorities based on the detected location of the gazing point, and a selecting circuit that selects one of the groups according to the priorities and selects at least one ranging area from the selected group.

To attain the above object, a second aspect of the present invention provides an optical apparatus comprising a plurality of focus detecting areas provided on an observing screen and from which a defocus amount of a subject is detected, a focus information detecting circuit that detects a defocus amount of each of the plurality of focus detecting areas, a line-of-sight detecting device that picks up an image of an eyeball of a user to detect a location of a gazing point of the user, an area selecting circuit that selects a focus detecting area which has a defocus amount falling within a predetermined range, with reference to one of focus detecting areas from which the defocus amounts have been detected, the one of focus detecting areas being determinable to be at a shortest distance, a grouping circuit that groups the selected focus detecting area into a plurality of groups with priorities based on the detected location of the gazing point, and a selecting circuit that selects one of the groups according to the priorities and selects at least one focus detecting area from the selected group.

Preferably, the optical apparatus according to the second aspect further comprises a position detecting device that detects position information on a position of the optical apparatus, and the grouping circuit groups the focus detecting areas into the plurality of groups with priorities based on the detected location of the gazing point and the detected position information.

Preferably, the selecting circuit executes a process of selecting a focus detecting area from a group with a higher priority of the plurality of groups, and if the selection from this group fails, executes a process of selecting a focus detecting area from each of the remaining groups by sequentially lowering the priority of the group until the selection succeeds.

Also preferably, the plurality of groups includes a group with a highest priority that contains a focus detecting area near the detected location of the gazing point.

To attain the above object, the second aspect of the present invention further provides an optical apparatus comprising a plurality of ranging areas provided on an observing screen and from which a defocus amount of a subject is detected, a focus information detecting circuit that detects a defocus amount of each of the plurality of ranging areas, a line-of-sight detecting device that picks up an image of an eyeball of a user to detect a location of a gazing point of the user, an area selecting circuit that selects a ranging area which has a defocus amount falling within a predetermined range, with reference to one of ranging areas from which the defocus amounts are successfully detected, the one of ranging areas being determinable to be at a shortest distance, a grouping circuit that groups the selected ranging area selected into a plurality of groups with priorities based on the detected location of the gazing point, and a selecting circuit that selects one of the groups according to the priorities and selects at least one ranging area from the selected group.

To attain the above object, the first aspect of the present invention also provides a camera comprising a plurality of focus detecting areas provided on an observing screen and from which focus information on a subject is detected, a line-of-sight detecting device that picks up an image of an eyeball of a user to detect a location of a gazing point of the user, a grouping circuit that groups the focus detecting areas into a plurality of groups with priorities based on the detected location of the gazing point, and a selecting circuit that selects one of the groups according to the priorities and selects at least one focus detecting area from the selected group.

To attain the above object, the first aspect of the present invention also provides a camera comprising a plurality of focus detecting areas provided on an observing screen and from which focus information on a subject is detected, a line-of-sight detecting device that picks up an image of an eyeball of a user to detect a location of a gazing point of the user, a storage circuit that stores tables used to group the focus detecting areas into a plurality of groups with priorities based on the detected location of the gazing point, and a selecting circuit that selects one of the groups according to the priorities and selects at least one focus detecting area from the selected group.

To attain the above object, the first aspect of the present invention further provides a camera comprising a plurality of ranging areas provided on an observing screen and from which information on a distance to a subject is detected, a line-of-sight detecting device that picks up an image of an eyeball of a user to detect a location of a gazing point of the user, a grouping circuit that groups the ranging areas into a plurality of groups with priorities based on the detected location of the gazing point, and a selecting circuit that selects one of the groups according to the priorities and selects at least one ranging area from the selected group.

To attain the above object, the first aspect of the present invention also provides a camera comprising a plurality of ranging areas provided on an observing screen and from which focus information on a subject is detected, a line-of-sight detecting device that picks up an image of an eyeball of a user to detect a location of a gazing point of the user, a storage circuit that stores tables used to group the ranging areas into a plurality of groups with priorities based on the detected location of the gazing point, and a selecting circuit that selects one of the groups according to the priorities and selects at least one ranging area from the selected group.

To attain the above object, the second aspect of the present invention also provides a camera comprising a plurality of focus detecting areas provided on an observing screen and from which a defocus amount of a subject is detected, a focus information detecting circuit that detects a defocus amount of each of the plurality of focus detecting areas, a line-of-sight detecting device that picks up an image of an eyeball of a user to detect a location of a gazing point of the user, an area selecting circuit that selects a focus detecting area which has a defocus amount falling within a predetermined range, with reference to one of focus detecting areas from which the defocus amounts have been detected, the one of focus detecting areas being determinable to be at a shortest distance, a grouping circuit that groups the selected focus detecting area into a plurality of groups with priorities based on the detected location of the gazing point, and a selecting circuit that selects one of the groups according to the priorities and selects at least one focus detecting area from the selected group.

To attain the above object, the second aspect of the present invention also provides a camera comprising a plurality of ranging areas provided on an observing screen and from which a defocus amount of a subject is detected, a focus information detecting circuit that detects a defocus amount of each of the plurality of ranging areas, a line-of-sight detecting device that picks up an image of an eyeball of a user to detect a location of a gazing point of the user, an area selecting circuit that selects a ranging area which has a defocus amount falling within a predetermined range, with reference to one of ranging areas from which the defocus amounts are successfully detected, the one of ranging areas being determinable to be at a shortest distance, a grouping circuit that groups the selected ranging area selected into a plurality of groups with priorities based on the detected location of the gazing point, and a selecting circuit that selects one of the groups according to the priorities and selects at least one ranging area from the selected group.

According to the first aspect of the present invention, focus detecting areas or ranging (distance measuring) areas are grouped into a plurality of groups based on a detected location of a gazing point. Priorities are assigned to these groups. A focus detecting area or a ranging area in which a main subject is assumed to be present is sequentially selected from these groups starting with the group with the highest priority. The focus detecting area or the ranging area is not directly selected based on the location of the gazing point, but a group suitable for selecting the focus detecting area or the ranging area is selected based on the location of the gazing point. Thus, a proper focus detecting area or ranging area can be selected even with a deviation between the user's intention and the detected location of the gazing point.

According to the second aspect of the present invention, based on defocus amounts of the focus detecting areas or on distance information on the ranging areas, a focus detecting area or a ranging area in which the main subject is assumed to be present is identified beforehand. Then, the focus detecting areas or the ranging areas are grouped into a plurality of groups with priorities based on the location of the gazing point, and a focus detecting area or a ranging area in which the main subejct is assumed to be present is sequentially selected from these groups starting with the group with the highest priority. Thus, a proper focus detecting area or ranging area can be selected even with a deviation between the user's intention and the detected gazing point location.

BRIEF DESCRIPTION OF THE DRAWINGS

FIGS. 5A and 5B are views showing LCDs of the camera in FIG. 1, in which:

FIG. 5A shows LCDs used for monitoring, wherein all the LCDs are lighted; and

FIG. 5B shows LCDs arranged outside a finder visual field, wherein all the LCDs are lighted;

FIG. 10 is a flow chart showing the details of processing at a step #109 in FIG. 8;

FIG. 11 is a table showing the relationship between gazing point areas and corresponding AF points in the camera according to the first embodiment;

FIG. 14 is a table showing the relationship between the gazing point areas and the corresponding AF points in a case where the camera is in a regular position and the line-of-sight reliability is high, according to the first embodiment;

FIG. 15 is a table showing the relationship between the gazing point areas and the corresponding AF points in a case where the camera is in the regular position and the line-of-sight reliability is low, according to the first embodiment;

FIG. 16 is a table showing the relationship between the gazing point areas and the corresponding AF points in a case where the camera is in a vertical position and the line-of-sight reliability is high, according to the first embodiment;

FIG. 17 is a table showing the relationship between the gazing point areas and the corresponding AF points in a case where the camera is in the vertical direction and the line-of-sight reliability is low, according to the first embodiment;

FIGS. 18A to 18F are views showing a finder observing screen displaying the relationship shown in FIG. 14;

FIGS. 19A to 19F are views showing a finder observing screen displaying the relationship shown in FIG. 15;

FIGS. 20A to 20F are views showing a finder observing screen displaying the relationship shown in FIG. 16;

FIGS. 21A to 21E are views showing a finder observing screen displaying the relationship shown in FIG. 17;

FIGS. 26A to 26I are views showing a finder observing screen displaying grouping in a case where the camera is in the vertical position according to the second embodiment;

DESCRIPTION OF THE PREFERRED EMBODIMENTS

The present invention will be described below in detail with reference to the drawings showing preferred embodiments thereof.

Figure 1:
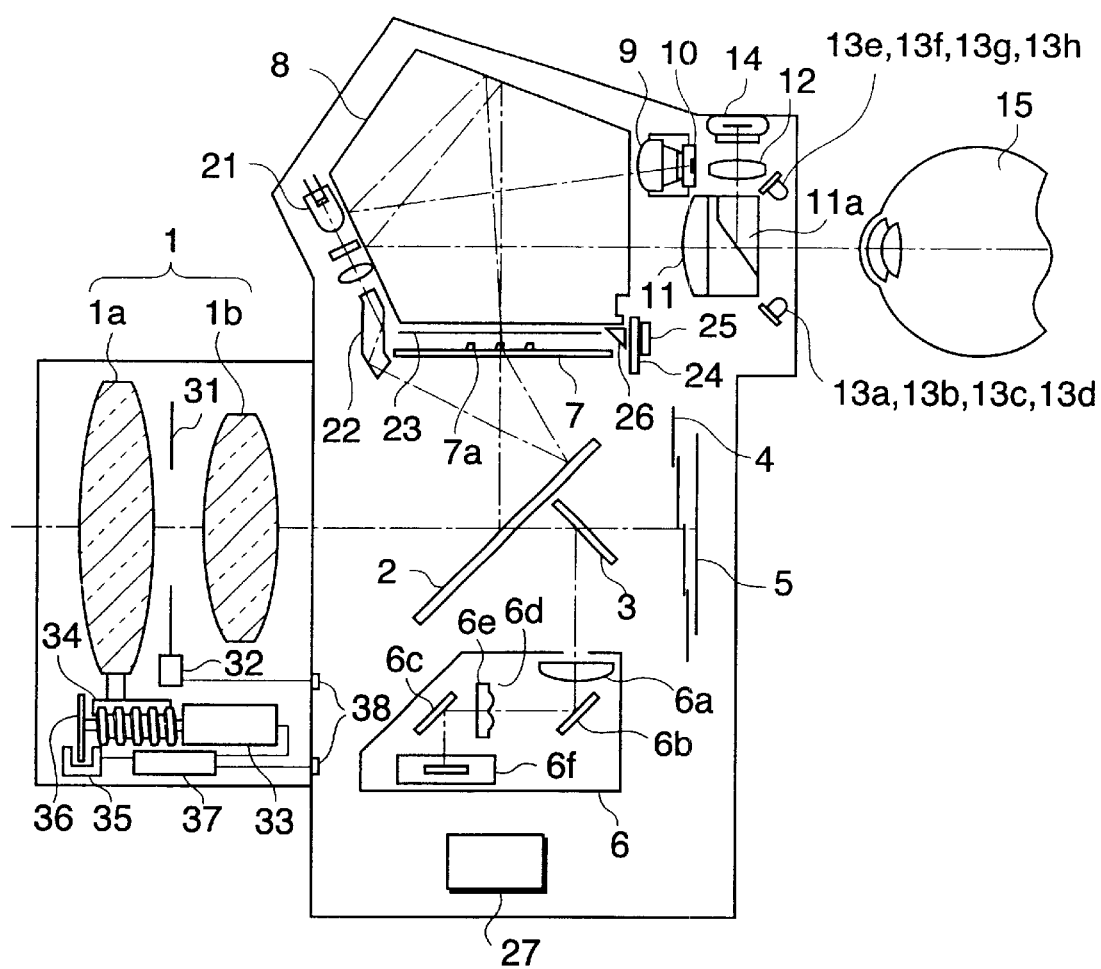
FIG. 1 is a view showing the arrangement of an optical system of a camera according to a first embodiment of the present invention.

FIG. 1 is a view showing the optical arrangement of essential parts of a single-lens reflex camera having a line-of-sight detecting function according to a first embodiment of the present invention.

In FIG. 1, reference numeral 1 denotes a taking lens. In the figure, the taking lens 1 is shown to be composed of two lenses 1a and 1b, but is actually composed of a larger number of lenses. Reference numeral 2 denotes a main mirror that is arranged obliquely in a photographic optical path or recedes therefrom, depending on whether the camera is in an observing state or a photographing state. Reference numeral 3 denotes a submirror that reflects a light beam transmitted through the main mirror 2, toward a lower part of a camera main body. Reference numeral 4 denotes a shutter. Reference numeral 5 denotes a photosensitive member composed of a silver film or a solid image pickup element such as a CCD or a MOS.

Figure 2:
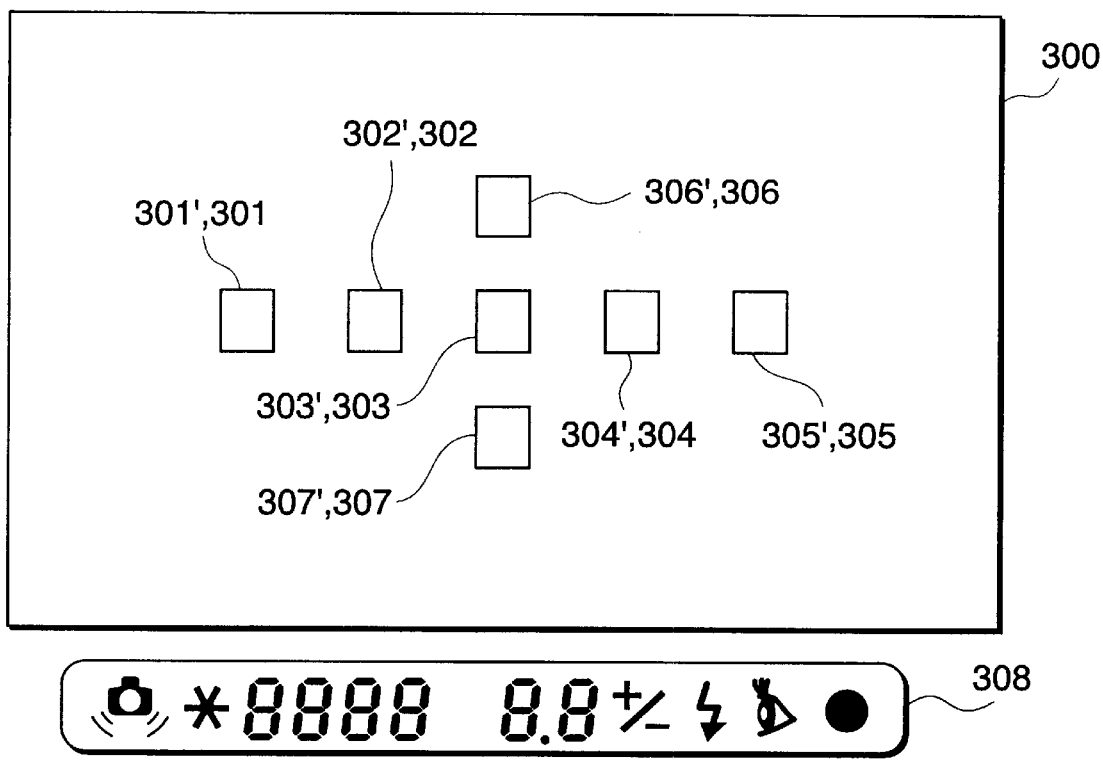
FIG. 2 is a view showing AF point marks and AF points shown in a finder of the camera in FIG. 1.

Reference numeral 6 denotes a focus detecting device arranged near an image forming plane and comprised of a field lens 6a, reflecting mirrors 6b and 6c, a secondary image forming lens 6d, a diaphragm 6e, and a line sensor 6f composed of a plurality of CCDs. The focus detecting device 6 employs a well-known phase difference method. The focus detecting device 6 has seven AF points at locations corresponding respectively to seven AF point marks 301' to 307' displayed on a finder observing screen 300 (see FIG. 2). Defocus information can be obtained from these AF points. The AF point marks 301' to 307' align with the AF points as viewed through the finder observing screen 300. Thus, for convenience, these AF points will be hereinafter shown as 301 to 307 in the finder observing screen 300, as shown in FIG. 2.

Reference numeral 7 denotes a focusing plate arranged at an expected image forming plane. Reference numeral 8 denotes a penta prism for changing a finder optical path. Reference numerals 9 and 10 denote an image forming lens and a photometric sensor for measuring the luminance of a subject in the observing screen, respectively. The image forming lens 9 conjugately associate the focusing plate 7 and the photometric sensor 10 with each other via a reflecting optical path in the penta prism 8.

Reference numeral 11 denotes an eyepiece arranged behind an emitting surface of the penta prism 8 and provided with an optical divider 11a. The eyepiece 11 is used to observe the focusing plate 7 by a photographer's eye. The optical divider 11a is comprised of, for example, a dichroic mirror that allows a visible ray to pass therethrough, while reflecting an infrared ray and a visible ray (red light) closer to the infrared ray. Reference numeral 14 denotes an image sensor having an array of photoelectric elements such as CCDs arranged in two dimensions in such a manner as to conjugate, with respect to a light receiving lens 12, with a neighborhood of the iris of the photographer's eye 15 resting at a predetermined location. The image sensor 14 and the light receiving lens 12 constitute an element of light receiving means. Reference numerals 13a to 13d and 13e to 13h denote eight infrared light emitting diodes (in FIG. 1, only two of them are shown) as illuminating light sources for the photographers eye 15. The infrared light emitting diodes 13a to 13d and 13e to 13h are arranged around the eyepiece 11.

Reference numeral 21 denotes a superimposing LED of a high luminance which permits even a bright subject to be viewed. Light emitted from the superimposing LED 21 is reflected by the main mirror 2 via a floodlighting prism 22 and is then bent in a vertical direction by an array of fine prisms 7a provided on a display section of the focusing plate 7. The light then passes through the penta prism 8 and the eyepiece 11 to the photographer's eye 15.

Figure 7A:
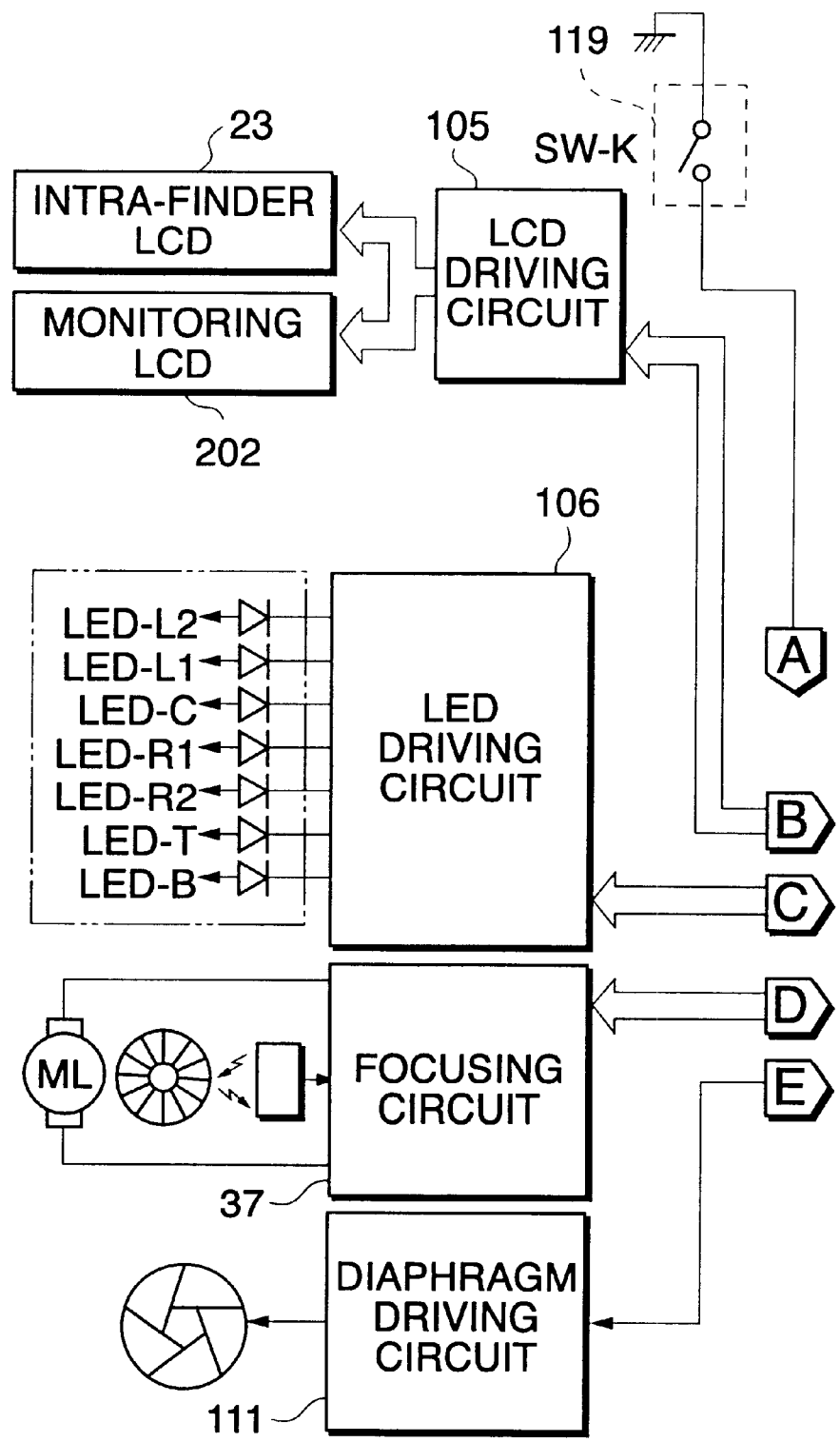
FIG. 7 is a block diagram showing the electric configuration of the camera in FIG. 1.
Figure 7B:
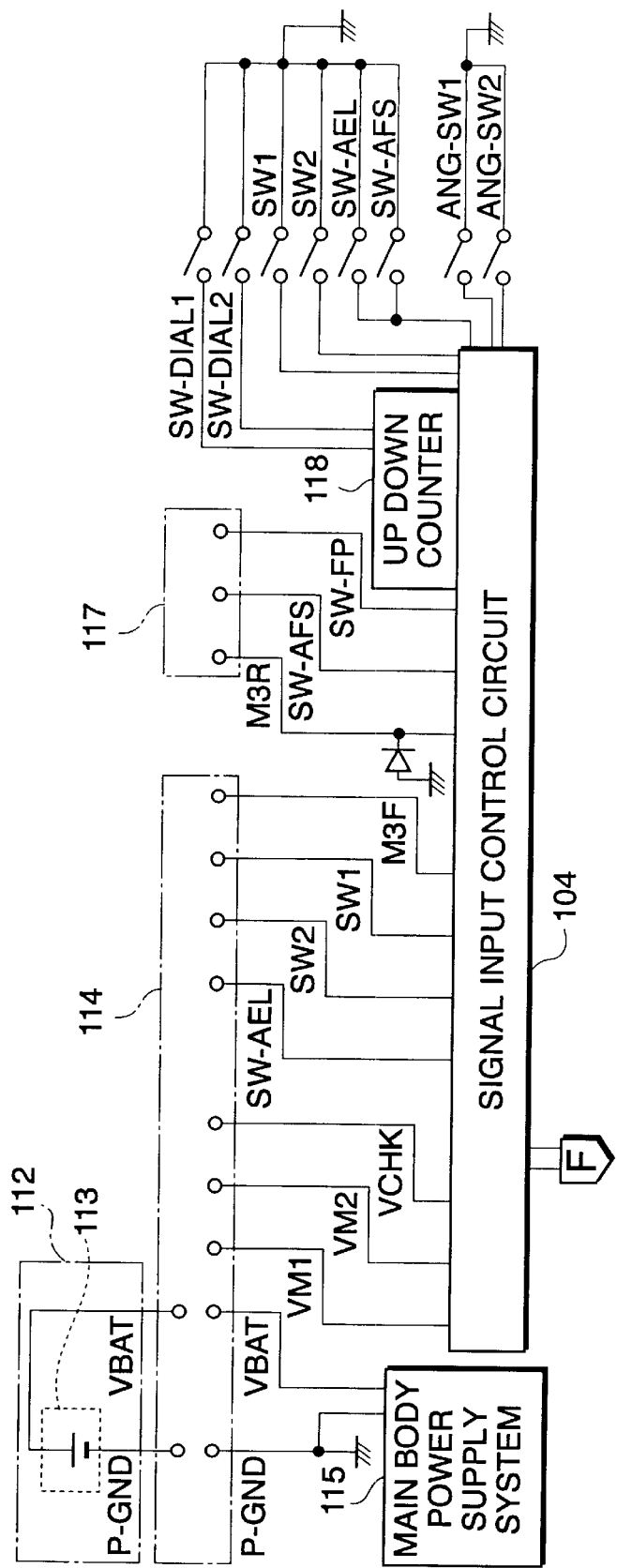
Figure 7C:
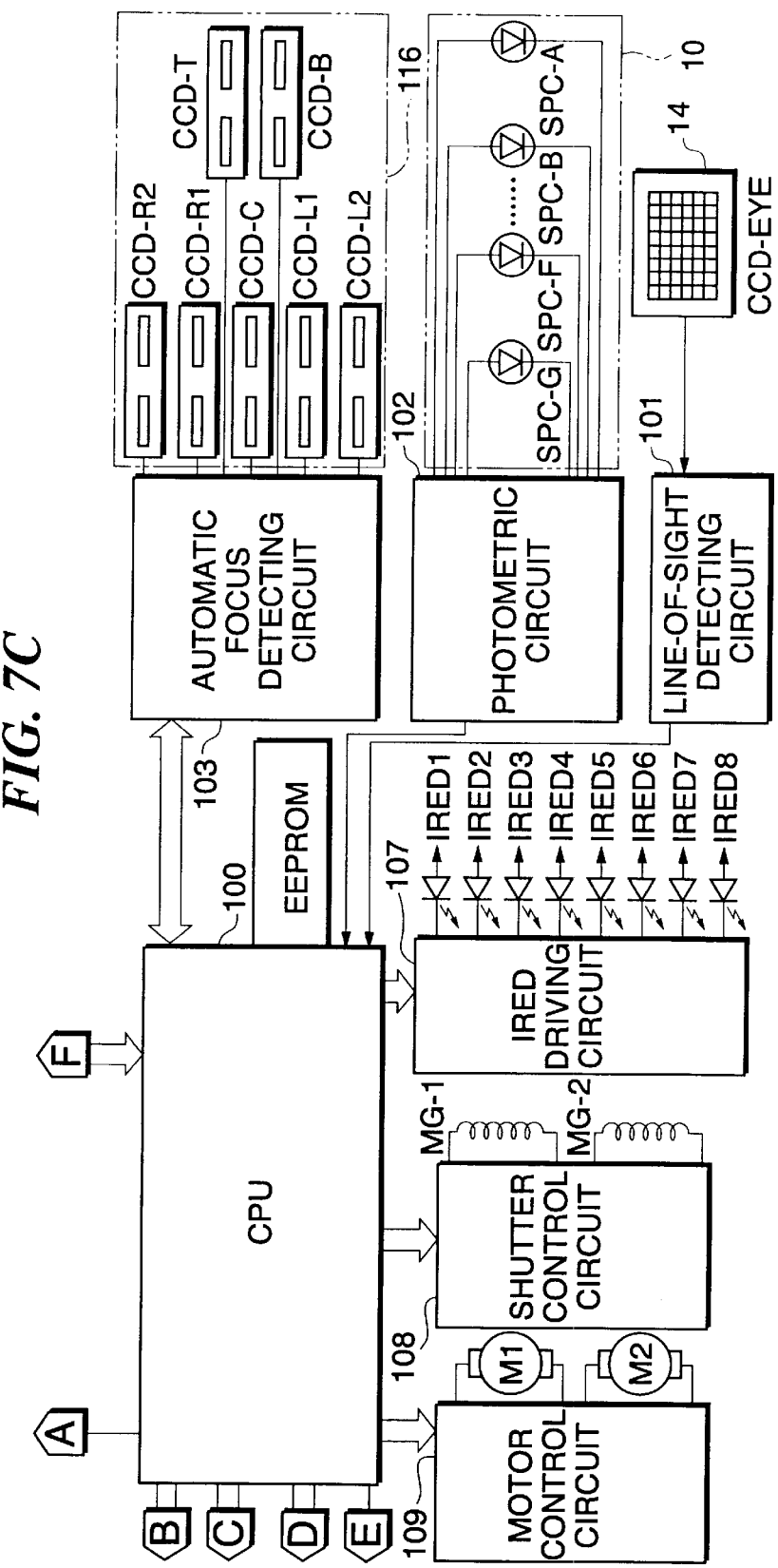

The array of fine prisms 7a are formed on a frame of the focusing plate 7 at locations corresponding respectively to the plurality of AF points 301 to 307 as described above. The array of fine prisms 7a are illuminated by seven respective corresponding LEDs 21 (referred to as LED-L1, LED-L2, LED-C, LED-R1, LED-R2, LED-T, and LED-B as shown in FIG. 7, described later) to light the AF point marks 301', 302', 303', 304', 305', 306', and 307' in the finder observing screen 300. Thus, the photographer can observe, in the photographic screen, the relationship between the subject and the AF points 301 to 307, from which defocus information can be obtained.

Referring again to FIG. 1, reference numeral 23 denotes a visual-field mask forming a finder observing visual field. Reference numeral 24 denotes an intra-finder LCD for displaying photographic information outside the finder visual field. A illuminating LED (F-LED) 25 is lighted to apply light, which is then transmitted through the LCD 24 and guided into the finder by a triangular prism 26, whereby the light is displayed on an extra-finder-visual-field display section 308 in FIG. 2. Thus, the photographer can observe this photographic information. Reference numeral 27 denotes a position detecting device for detecting the position of the camera.

Reference numeral 31 denotes a diaphragm provided in the taking lens 1. Reference numeral 32 denotes a diaphragm driving device including a diaphragm driving circuit 111, described later. Reference numeral 33 denotes a lens driving motor, and 34 a lens driving member composed of a driving gear or the like. Reference numeral 35 denotes a photocoupler for detecting rotation of a pulse plate 36 linked with the lens driving member 34 and transmitting the rotation to a lens focusing circuit 37. Based on this information and information on the amount of movement by which the lens is to be driven, the lens focusing circuit 37 drives the lens driving motor 33 by a predetermined amount of movement to move the focusing lens 1a in the taking lens 1 into a focusing position. Reference numeral 38 denotes mount contacts as a known interface between the camera main body and the exchangeable taking lens 1.

Figure 3:
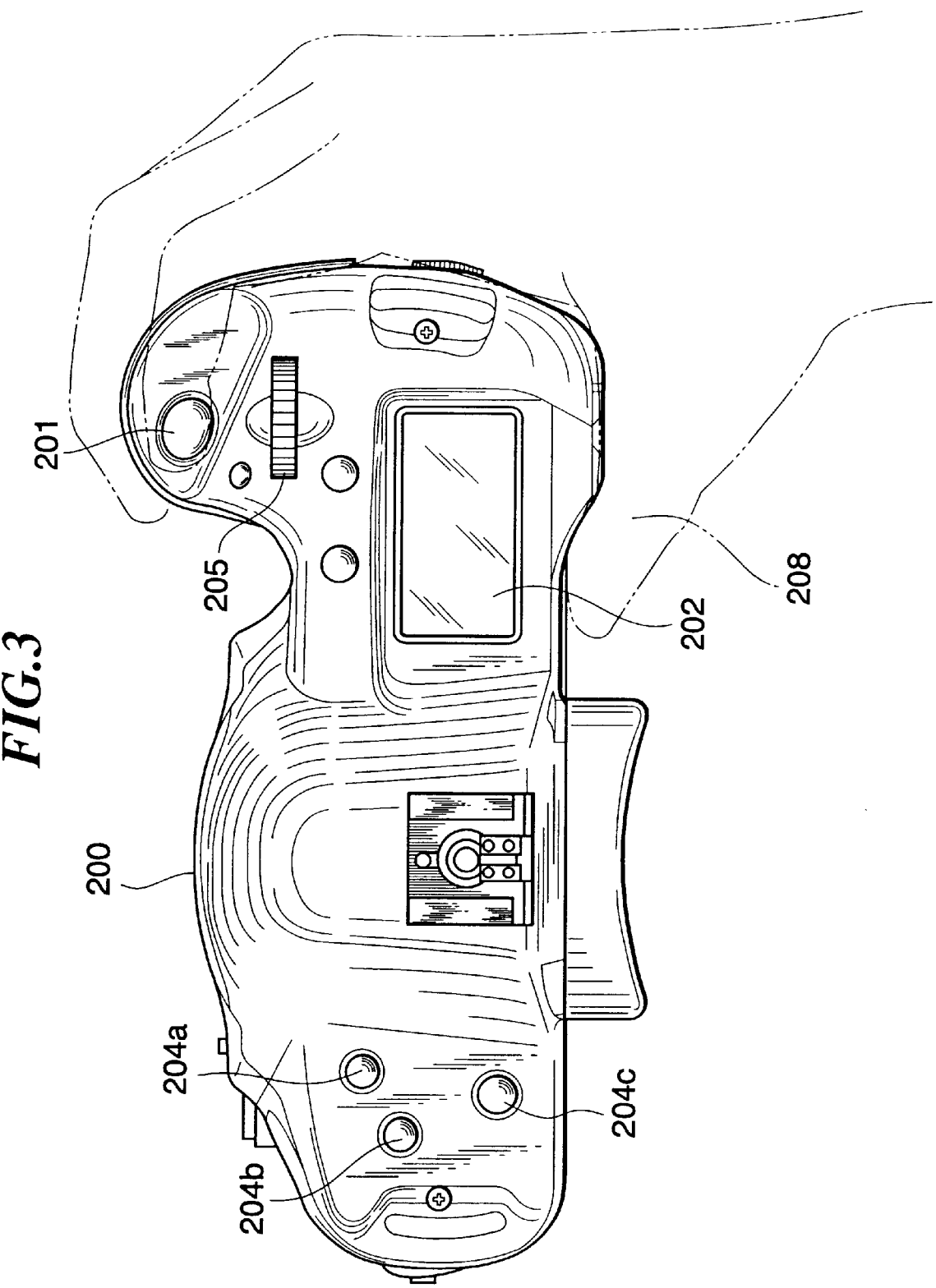
FIG. 3 is a top view showing the appearance of a camera main body according to the first embodiment.
Figure 4:
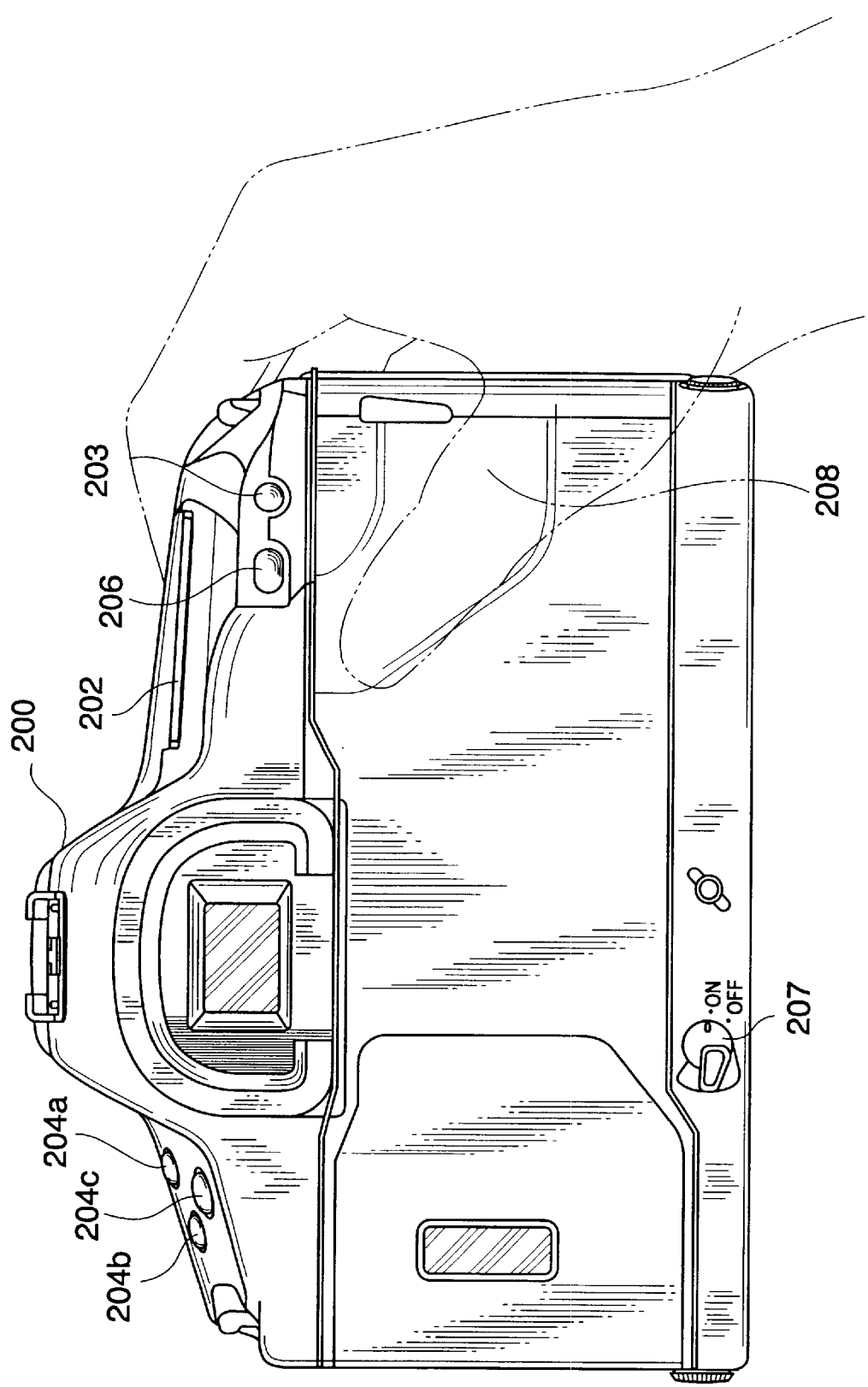
FIG. 4 is a rear view showing the appearance of the camera main body according to the first embodiment.

FIG. 3 is a top view showing the appearance of the camera main body constructed as described above (the exchangeable taking lens 1, shown in FIG. 1, is not shown in FIG. 3), and FIG. 4 is a rear view thereof.

Figure 5A:
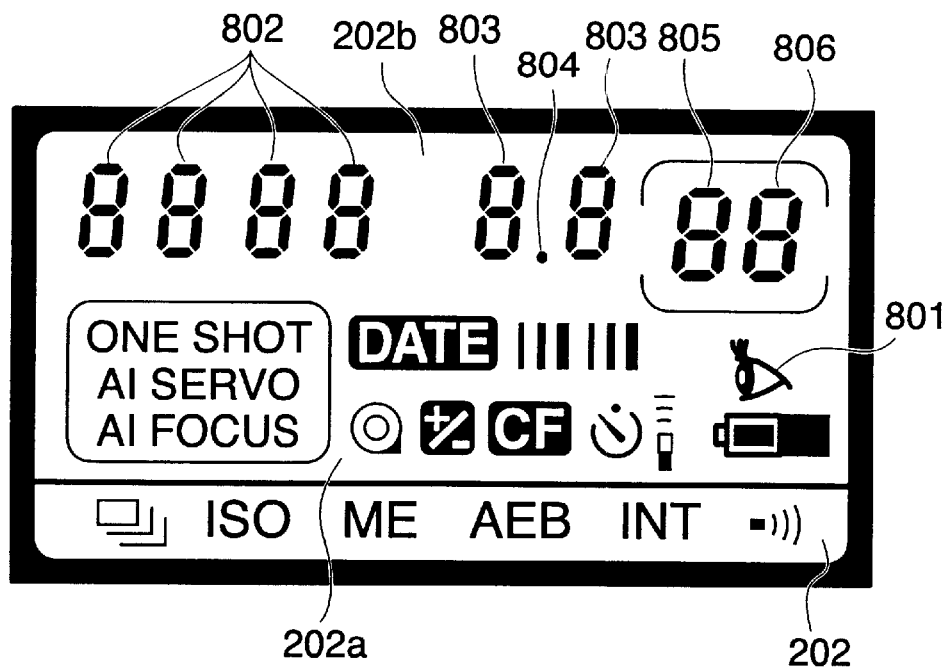

In these figures, reference numeral 200 denotes the camera main body, and 201 a release button. Reference numeral 202 denotes a monitoring LCD as an external monitor display device. The monitoring LCD 202 is comprised of a fixed segment display section 202a for displaying predetermined patterns, and a seven-segment display section 202b for displaying variable numerical values, as shown in FIG. 5A (the details of the monitoring LCD 202 will be described later). Reference numeral 203 denotes an AE lock button for holding a photometric value. Reference numerals 204a, 204b, and 204c denote mode buttons for selecting a photographic mode and the like. Specifically, when the mode buttons 204b and 204c are simultaneously depressed, the camera is brought into a calibration mode for executing the above described calibration.

In this case, the AF point marks 301', 305', 306', and 307', located at left, right, top, and bottom ends of the screen in FIG. 2, are also used in the calibration mode, set by simultaneously depressing the mode buttons 204b and 204c. As is known, individual-difference correcting information (line-of-sight correcting coefficients) such as a deviation between the ocular axis of the eyeball and the optical axis and the sensitivity of rotation of the eyeball can be obtained based on line-of-sight information obtained when the photographer sequentially gazes the blinking AF point marks 301', 305', 306', and 307' and taking the diameter of the photographer's pupil into consideration. With the camera of the present embodiment, whenever the photographer repeats the calibration, the resulting data is accumulated, and a predetermined averaging operation is performed to calculate the individual-difference correcting information.

Referring again to FIGS. 3 and 4, reference numeral 205 denotes an electronic dial. Rotating the electronic dial 205 to generate click pulses makes it possible to select modes that can be further set in addition to the modes which have been selected using the mode buttons 204a, 204b, and 204c, and select set values. For example, if the mode button 204a is depressed, and then the electronic dial 205 is operated to select a shutter-preferred photographic mode, then the intra-finder LCD 24 and the monitoring LCD 202 display the currently set mode and shutter speed. Furthermore, if the photographer releases the mode button 204a and then rotates the electronic dial 205, the shutter speed is sequentially varied depending on the direction of the rotation, starting with the currently set value. In this manner, the photographer can set any photographic mode such as a program AE, a shutter-preferred AE, a diaphragm-preferred AE, a subject depth-preferred AE, and a manual exposure, and contents of photographing.

Reference numeral 206 denotes an AF point selecting mode button, and 207 a camera power switch. Turning on the camera power switch 207 actuates the camera, whereas turning off this switch brings the camera into a lock position where it is inoperative. Reference numeral 208, shown by a dotted line, denotes the photographer's right hand at the time when he holds the camera.

Figure 5B:
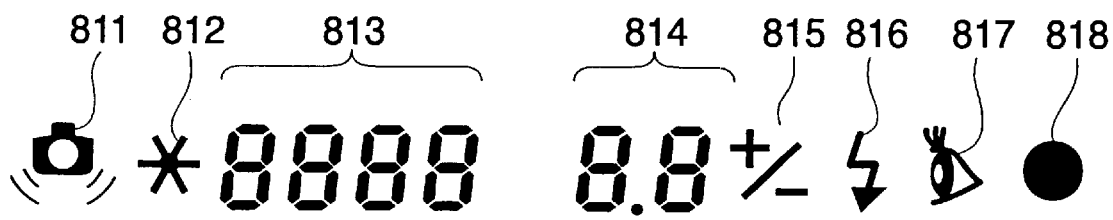

FIGS. 5A and 5B are views showing the contents of all display segments in the monitoring LCD 202 and in the extra-finder-visual-field display section 308 in FIG. 2 as the intra-finder LCD 24.

In FIG. 5A, the monitoring LCD 202 is comprised of the fixed-segment display section 202a for displaying the predetermined patterns, and the seven-segment display section 202b for displaying the variable numerical values, as described previously. The fixed-segment display section 202a has a portion in which not only the photographic mode is displayed, as is known, but a photographic operation such as a camera AF operation or a photographic-mode selecting operation is also displayed. Further, the seven-segment display section 202b for displaying the variable numerical values is comprised of 4-digit seven segments for displaying shutter speed time per second, 2-digit seven segments 803 and a decimal-point display section 804 for displaying a diaphragm value, a limited-numerical-value display segment 805 and 1-digit seven segments 806 for displaying the number of film frames.

In FIG. 5B, reference numeral 811 denotes an unsteady-holding warning mark, and 812 an AE lock mark. Reference numerals 813 and 814 denote the same display sections as the segments 802 for displaying shutter speed time per second, the segments 803 for displaying the diaphragm value, and the decimal-point display section 804, which are described previously. Reference numeral 815 denotes an exposure correction setting mark, and 816 an electronic flash charge completing mark. Further, reference numeral 817 denotes a line-of-sight input mark indicative of a line-of-sight input state. The line-of-sight input mark 817 is similar to the section (display section 801 in FIG. 5A) indicative of a line-of-sight detecting mode. Reference numeral 818 denotes a focusing mark indicative of whether the taking lens 1 is focused.

In this case, the camera of the present embodiment has the following three modes as AF point selecting modes for selecting at least one of the seven AF points 301 to 307, shown in FIG. 2.

1) a "line-of-sight input mode" for selecting the AF point using a line-of-sight detecting device for detecting a rotational angle of the ocular axis of the photographer's eyeball and calculating the photographer's line of sight from the rotational angle, 2) an "arbitrary AF point selecting mode" that allows the photographer to select an arbitrary AF point, and 3) an "automatic AF point selecting mode" in which the camera itself automatically extracts and selects an AF point using a predetermined algorithm (in the present embodiment, a nearest-point priority algorithm) based on defocus information corresponding to all the results of focus detection obtained from the seven AF points 301 to 307.

As described later, if the line-of-sight input mode is not selected during the automatic AF point selecting mode, the AF point is selected according to the automatic AF point selecting mode. If, however, the line-of-sight input mode is set during the automatic AF point selecting mode, the AF point is automatically selected based on the location of the gazing point as obtained from the line of sight (this will be referred to as the "line-of-sight/automatic selecting mode).

Now, a description will be given of the above described AF point selecting modes, manners of setting these modes, and displays appearing during the setting.

1) The "line-of-sight input mode" can be set by depressing the mode button 204b, rotatively operating the electronic dial 205, and stopping the rotative operation when the display section 801 and the line-of-sight input mark 817, shown in FIG. 5, are displayed.

2) The "arbitrary AF point selecting mode" can be set by depressing the AF point selecting mode button 206 in FIG. 4. In this state, by rotatively operating the electronic dial 205, the AF point can be switched from a lighted one to another.

Figure 6A:
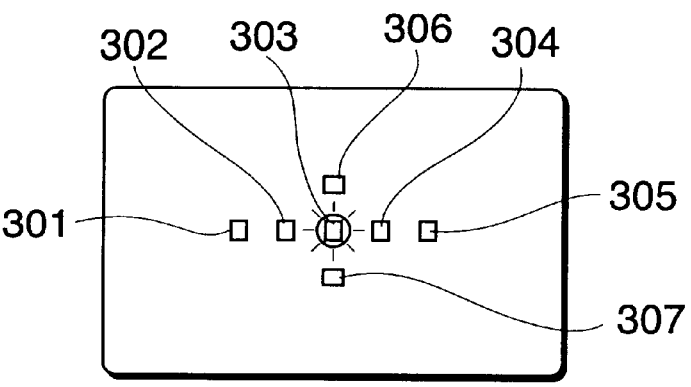
FIGS. 6A to 6D are views showing how the AF point and an AF point selecting mode are switched in the camera in FIG. 1.
Figure 6B:
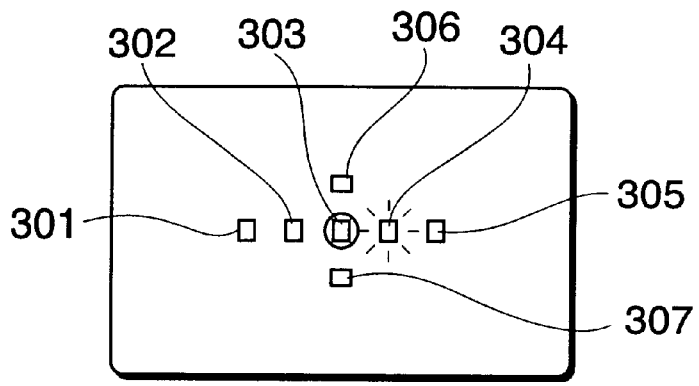
Figure 6C:
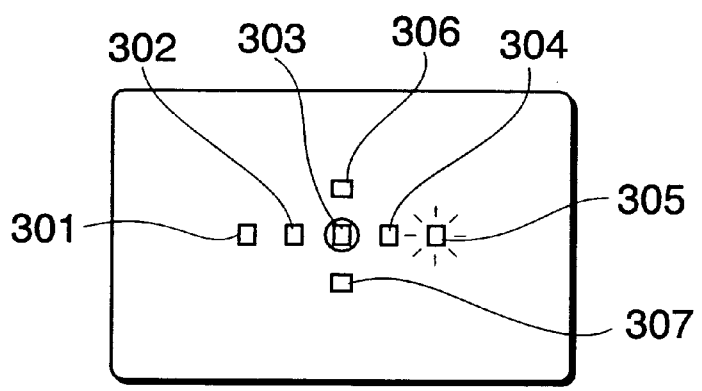

In the arbitrary AF point selecting mode, when, for example, the AF point mark 303', shown in FIG. 2, is lighted as shown in FIG. 6A, if the electronic dial 205 is rotatively operated, the display moves from the AF point mark 303' to the AF point mark 304' synchronously with the direction of the rotation, as shown in FIG. 6B. If the electronic dial 205 is further rotatively operated, the display moves to the AF point mark 305' as shown in FIG. 6C. Thus, the AF point mark selected as a result of the movement is lighted, and the photographer can recognize the AF point he has selected. Further, by rotatively operating the electronic dial 205 in the reverse direction, the AF point mark 302' or 301' can be selected. Moreover, for example, when the AF point mark is displayed as shown in FIG. 6B, if a button, not shown, is depressed, the AF point mark 306' can be selected. If the button, not shown, is depressed again, the AF point mark 307' can be selected.

Figure 6D:
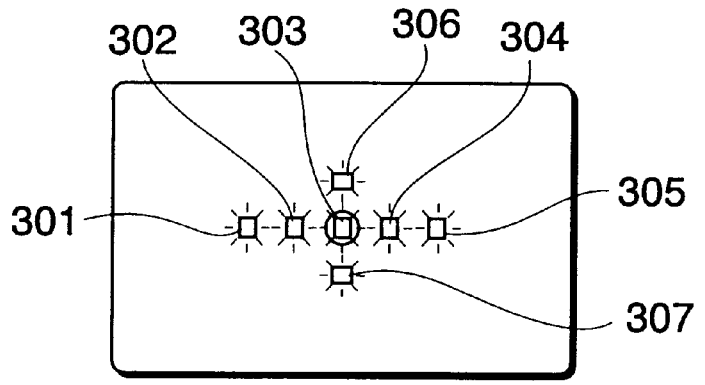

3) In the state shown in FIG. 6C, if the electronic dial 205 is further rotated in the same direction, all the AF point marks 301' to 307' are simultaneously lighted for a predetermined time period as shown in FIG. 6D. That is, the camera is brought into the "automatic AF point selecting mode". In this mode, the camera itself automatically selects, for example, the nearest AF point based on the defocus information obtained from each of the AF points 301 to 307. Thus, since the AF points marks 301' to 307' are simultaneously lighted, the photographer can realize that the AF point selecting mode has been switched to the "automatic AF point selecting mode".

FIG. 7 is a block diagram showing the configuration of essential parts of an electric circuit incorporated in the camera constructed as described above. The same parts as those in the above described figures are designated by the same reference numerals.

Connected to a central processing unit (hereinafter referred to as "the CPU") 100 of a microcomputer incorporated in the camera main body are a line-of-sight detecting circuit 101, a photometric circuit 102, an automatic focus detecting circuit 103, a signal input control circuit 104, an LCD driving circuit 105, a back light LED driving circuit 106, an IRED driving circuit 107 for driving eight infrared light emitting diodes IRED1 to IRED8 corresponding to the infrared light emitting diodes 13a to 13g in FIG. 1, a shutter control circuit 108, and a motor control circuit 109. Further, the CPU transmits signals to the focusing circuit 37 and the diaphragm driving circuit 111, arranged in the taking lens 1, via the mount contacts 38, shown in FIG. 1.

The CPU 100 incorporates a RAM, not shown, and has a function of storing the individual-difference correcting information obtained by the calibration, in the RAM. When the camera is brought into the above-mentioned calibration mode, the individual-difference correcting information (hereinafter also referred to as "the calibration data") can be obtained, which is used to correct individual differences in line of sight. The electronic dial 205 can be used to select the calibration data and turning-off of the calibration.

The line-of-sight detecting circuit 101 subjects an output of an image of the eyeball from the image sensor 14 (CCD-EYE), to A/D conversion, and transmits the resulting image information to the CPU 100. Then, the CPU 100 extracts characteristic points of the eyeball image which are required for known line-of-sight detection, according to a predetermined algorithm, and calculates the photographer's line of sight based on the locations of the characteristic points, as described later. The CPU 100, the line-of-sight detecting circuit 101, and the image sensor 14 each constitute one element of the line-of-sight detecting device.

The photometric circuit 102 amplifies an output from the photometric sensor 10, then subjects it to logarithmic compression and A/D conversion, and then transmits the resulting information to the CPU 100 as luminance information from each sensor. The photometric sensor 10 is comprised of seven photo diodes SPC-A to SPC-G for measuring radiation from areas corresponding respectively to the AF point marks 301' to 307' (that is, the AF points 301 to 307), shown in FIG. 2.

A line sensor 116 (corresponding to the line sensor 6f) provided in the focus detecting device 6 is a known CCD line sensor comprised of seven line sensors CCD-C, CCD-R1, CCD-R2, CCD-L1, CCD-L2, CCD-T, and CCD-B arranged at locations corresponding respectively to the above described seven AF point marks 301' to 307'. These seven line sensors also correspond to the AF points 301 to 307, shown in FIG. 2. The automatic focus detecting device 103 also included in the above described focus detecting device 6 subjects voltages obtained from these line sensors 116 to A/D conversion, and transmits the conversion result to the CPU 100.

Reference character SW1 denotes a photometric switch that is turned on in response to a first stroke of the release button 201 to start a photometric or light measurement, AF, and line-of-sight detecting operations. Reference character SW2 denotes a release switch that is turned on in response to a second stroke of the release button 201. Reference characters ANG-SW1 and ANG-SW2 denote position detecting switches constituting the position detecting device 27. Reference character SW-AEL denotes an AE lock switch that is turned on when the AE lock button 203 is depressed. Reference character SW-AFS denotes an AF point selecting mode switch that is turned on by depressing the AF point selecting mode button 206. Reference characters SW-DIAL1 and SW-DIAL2 denote dial switches provided in the electronic dial 205, described before. Signals generated by these dial switches SW-DIAL1 and SW-DIAL2 are input to an up down counter 118 of the signal input control circuit 104 to count the rotation quick amount of the electronic dial 205. Incidentally, the mode buttons 204a, 204b, and 204c are not shown in FIG. 2.

When signals indicative of the states of the above described switches are input to the signal input control circuit 104, they are transmitted to the CPU 100 via a data bus.

The above described LCD driving circuit 105 is a known circuit for driving the intra-finder LCD 23 and the monitoring LCD 202 to provide displays. The LCD driving circuit 105 cause the both LCDs to simultaneously display the diaphragm value, shutter speed time per second, and set photographic mode in response to signals from the CPU 100. The LED driving circuit 106 controls the light emitting diodes LED21 (LED-L1, LED-L2, LED-C, LED-R1, LED-R2, LED-T, and LED-B) to light or blink. Furthermore, during the lighting, the LED driving circuit 106 varies the luminance in response to a signal calculated by the CPU 100 based on a signal from the photometric circuit 102, thereby allowing the display of the AF point marks to be recognized easily based on the brightness in the finder.

The shutter control circuit 108 controls a magnet MG-1 for driving a front screen and a magnet MG-1 for driving a rear screen by energizing these magnets, so that the photosensitive member 5 is exposed to a predetermined quantity of light. The motor control circuit 109 controls a motor M1 for winding a film and a motor M2 for charging the main mirror 2 and the shutter 4 and rewinding the film. The shutter control circuit 108 and the motor control circuit 109 execute a series of shutter release operations.

A battery 113 is housed in a grip and battery chamber 112 located at the photographer's right hand as he holds the camera as shown by the dotted line 108 in FIG. 3 and is mechanically and electrically connected to terminals P-GND and VBAT of a connector 114 to supply power to a main body power supply system 115.

The terminals of the connector 114 other than the terminals P-GND and VBAT and terminals of a connector 117 are used for attachment of accessories. When the grip and battery chamber 112 is mounted in the camera, since the chamber 112 has no terminals to be connected to the above terminals, the latter are not in a connected state. A switch 119 is used to allow the photographer to realize that the grip and battery chamber 112 and the accessories have been mounted. In a mounted state, the switch 119 is disconnected from a terminal D-GND and thus turned off.

A control flow, which is the gist of the present invention, will be described below with reference to first and second embodiments of the present invention.

(First Embodiment)

A series of operations of the camera according to the first embodiment will be described with reference to a flow chart shown in FIGS. 8 and 9.

When the power switch 207, shown in FIG. 4, is rotated into an ON position, power is applied to the camera, which has been inoperative, to actuate it. This occurs at a step #100. When power is thus supplied, the process proceeds from the step #100 to a step #101, where the CPU 100 resets variables so as to bring the camera into a predetermined state. At the next step #102, the CPU 100 determines whether or not the release button 201 has been depressed to turn the switch SW1 on. If the switch SW1 is off, the process waits until it is turned on.

Subsequently, when the CPU 100 detects via the signal input control circuit 104 that the release button 201 has been depressed to turn the switch SW1 on, the process proceeds to a step #103, where the CPU 100 actuates various sections and detects and checks their states.

At the next step #104, the CPU 100 causes the position detecting device 27 to check the position of the camera. Specifically, the CPU 100 checks whether the camera is in the regular position, a vertical position where the photographer's right hand, shown by the dotted line 208 in FIG. 4, faces upward, or a vertical position where the photographer's right hand faces downward. Then, at the next step #105, the CPU 100 checks whether the current AF point selecting mode is the automatic AF point selecting mode. If it is not is the automatic AF point selecting mode, the automatic selection is inhibited. Accordingly, the process proceeds to a step #105a, where the CPU 100 checks whether or not the camera is in the line-of-sight input mode. If the camera is not in this mode, the process proceeds to a step #105b, where the CPU 100 executes the arbitrary AF point selecting mode. On the other hand, if the camera is in the line-of-sight input mode, the process proceeds to a step #105c, where the CPU 100 selects the AF point using only a line of sight input.

Further, at the step #105, if the CPU 100 determines that the camera is in the automatic AF point selecting mode, the process proceeds to a step #106, where the CPU 100 also checks whether the camera is in the line-of-sight input mode. If the camera is not in this mode, the process proceeds to a step #106a, where the CPU 100 executes the automatic AF point selecting mode. That is, the camera itself selects the AF point according to the predetermined algorithm (nearest-point priority) based on results of focus detection at the seven AF points 301 to 307, corresponding to the seven AF point marks 301' to 307', without using any line-of-sight information. Further, if the automatic AF point selecting mode or the arbitrary AF point selecting mode is selected, the CPU 100 puts out the line-of-sight input mark 817 of the intra-finder LCD 24 via the LCD driving circuit 105 to allow the photographer to ascertain through the extra-finder-screen display section 308 that the camera will not detect the line of sight. Furthermore, the CPU 100 causes the seven segments 817 to display the set shutter speed time per second.

If the line-of-sight input mode is selected at the step #106, then the line-of-sight/automatic selecting mode is selected. The process proceeds to a step #107, where the CPU 100 drives the line-of-sight detecting circuit 101 and the image sensor 14 (CCD-EYE) to detect the photographer's line of sight. At this time, the CPU 100 causes the LED driving circuit 106 to light the illuminating LED 25 and causes the LCD driving circuit 105 to light the line-of-sight input mark 817 (see FIG. 5B) of the intra-finder LCD 24. Consequently, the photographer can ascertain through the extra-finder-screen display section 308 that the camera is detecting his line of sight.

At the next step #108, the CPU corrects the detected line of sight of the photographer based on the individual-difference correction information (calibration data) including the deviation of the ocular axis of the eyeballfrom the line of sight (visual axis), and the sensitivity of the rotational angle of the eyeball, which are obtained taking the diameter of the photographer's pupil into consideration. The corrected line of sight is converted into coordinates on the focusing plate 7 as the photographer's gazing point. At the next step #109, the CPU 100 determines how the coordinates of the gazing point coincide with the photographer's line of sight, that is, the reliability of the location of the gazing point. The information on the pupil diameter and the calibration data being used for the calculations at the steps #107 and #108 are used to determine the reliability of the line-of-sight detection according to two-level evaluation.

In this reliability determination, checking is made as to the number of calibrations executed by the photographer and whether or not the pupil diameter obtained through the line-of-sight detection falls between the maximum and minimum diameters, inclusive, obtained by the calibrations. If the pupil diameter is outside this range, the CPU 100 determines how far it is from the maximum or minimum value, based on the dimensionless sum of the reliability.

The details of an operation performed for this reliability determination will be described with reference to a flow chart shown in FIG. 10.

The calibration is executed at a step #601 separately from the photographic operation. That is, it is executed before the switch SW1 is turned on (before an affirmative result is detected at the step #102 in FIG. 8). At a step #602, a number-of-calibrations constant is calculated based on data obtained through the calibration (step #601). Specifically, if only one calibration has so far been executed, the number-of-calibrations constant is set to "1". If two or more calibrations have so far been executed, the number-of- calibrations constant is set to "2". In the present embodiment, the calibration data is accumulated each time the photographer repeats the calibration. Once the accumulation is executed a predetermined number of times, the accumulated data is subjected to a predetermined averaging operation. The information on the characteristics of the observer's eyeball becomes more reliable until the number of times that the calibration is repeated exceeds the predetermined value (in the present embodiment, this value is two, but it goes without saying that the accuracy of the data increases with the number of times that the calibration is repeated). Further, it is assumed that the calculation of the maximum and minimum values of the detected pupil diameter during the above described calibration has already been executed at a step #603.

Thus, here, the operation is started at a step #604 in FIG. 10. First, at the step #604, the diameter Rpp of the photographer's pupil is taken out, which has been obtained during the line-of-sight detection executed at the step #107 of the above described FIG. 8. Then, at the next step #605, a pupil diameter comparison constant is determined. Specifically, if the diameter Rpp of the photographer's pupil obtained at the step #604 falls between the maximum and minimum values, inclusive, obtained through the calibration, the pupil diameter comparison constant is set to "3". If the pupil diameter Rpp obtained through the line-of-sight detection is outside this range but is larger or smaller than the maximum or minimum value, respectively, by only 0.5 mm or less, the pupil diameter comparison constant is set to "2". If the pupil diameter Rpp is larger or smaller than the maximum or minimum value, respectively, by 1.0 mm or more, the pupil diameter comparison constant is set to "1".

At the next step #606, the sum of the number-of-calibrations constant obtained at the step #602 and the pupil diameter comparison constant obtained at the step #605 is determined as the reliability of the line-of-sight detection. If the sum is three or more, the process proceeds to a step #607, where it is determined that the line-of-sight detection is very reliable. On the other hand, if the sum is two or less, the process proceeds to a step #608, where it is determined that the line-of-sight detection is not so reliable.

Referring again to FIG. 8, the process proceeds to the step #110, where the CPU 100 selects an AF point corresponding to the location of the gazing point. Specifically, the CPU 100 selects one of the seven AF points 301 to 307 in FIG. 2 as an AF point based on the coordinates of the gazing point and according to correspondences shown in FIG. 11. The selected AF point is lighted and displayed in the finder observing screen 300.

The above correspondences will be described with reference to FIGS. 11 to 13.

The image sensor 14, which constitutes a part of the line-of-sight detecting device, corresponds to locations on the focusing plate 7 and to locations on the finder observing screen 300, through which the photographer observes the focusing plate 7. The focusing plate 7 and the finder observing screen 300 are each comprised of a plurality of gazing point areas defined by seven columns L3, L2, L, C, R1, R2, and R3 in a vertical direction and by five rows T, U, C, D, and B in a horizontal direction, as shown in FIG. 12. Each of the gazing point areas is represented as a vertical column name and a horizontal row name. For example, the area at the upper left end is represented as L3·T, and the area at the lower right end is represented as R3·B.

At the above described step #108, the detected line of sight is converted into the coordinates of the gazing point on the focusing plate 7. It is determined which of the gazing point areas contains the gazing point, and one of the AF points 301 to 307 is selected according to the correspondences in FIG. 11.

Figure 13:
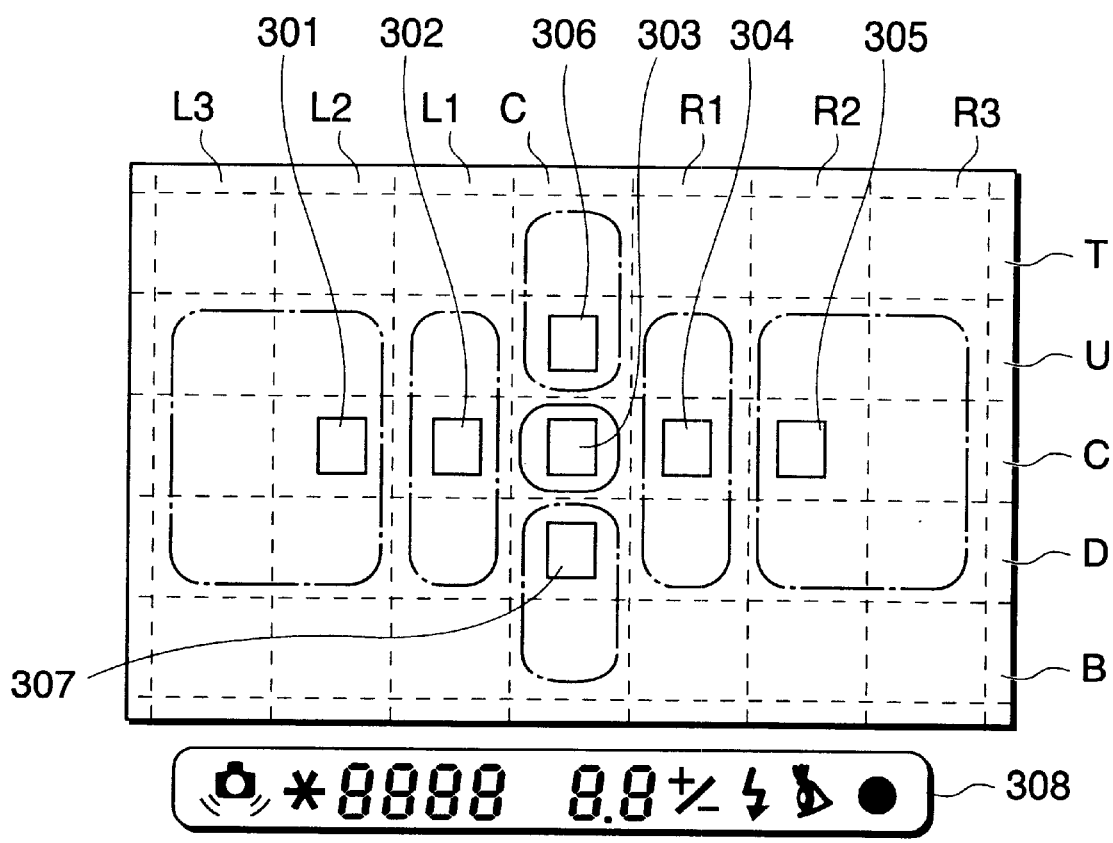
FIG. 13 is a view showing an example of grouping for the camera according to the first embodiment.

Specifically, as is apparent from FIG. 13, if the gazing point is located in one of the plurality of gazing point areas enclosed by frame lines, except the AF point 303, then the AF point in the one of the gazing point areas enclosed by the frame lines is in principle regarded as the corresponding AF point. However, those gazing point areas in two outermost rows and in two outermost columns which are each formed by only three other gazing point areas contain no corresponding AF points. In this state, in the line-of-sight input mode (step #105*c*), in which the AF point is selected using only the gazing point, the line-of-sight input mark 817 in FIG. 5B blinks as a warning display.

Referring again to FIG. 8, the process then proceeds to a step #111, where the CPU 100 groups the AF points based on the locations of the gazing point. FIGS. 14 to 17 show grouping tables. The grouping tables are stored in a memory of the camera. These grouping tables are provided according to different combinations of the result of camera position detection obtained at the step #104 and the result of line-of-sight reliability obtained at the step #109. These grouping tables specify groupings previously prepared based on the gazing point areas in which the coordinates of the photographer's gazing point are present, and priorities for the process of determining one of the AF points contained in groups obtained by the grouping. At the next step #112, the CPU 100 determines one of the AF points according to the process priorities for these groups. The AF point is often determined from a first priority group.

FIG. 14 is a grouping table 1 showing a case where the camera is in the regular position and the line-of-sight detection is very reliable. FIG. 15 is a grouping table 2 showing a case where the camera is in the regular position and the line-of-sight detection is not so reliable. Further, FIG. 16 is a grouping table 3 showing a case where the camera is in the vertical position and the line-of-sight detection is very reliable when the camera is held with the grip positioned upward. FIG. 17 is a grouping table 4 showing a case where the camera is in the vertical position and the line-of-sight detection is not so reliable when the camera is held with the grip positioned downward.

A grouping table showing a case where the camera is in the vertical position and the camera is held with the grip positioned downward is in a vertically symmetrical relationship with the grouping tables 3 and 4, and detailed description thereof is thus omitted.

As shown in the above described FIGS. 14 to 17, each table contains the names of the grouping, the results of the line-of-sight detection, the gazing point areas indicating which areas contain the photographer's gazing point, and the AF points corresponding to these gazing point areas. As the order of the process of determining one AF point, the tables contain a first priority group of AF points which are processed first, a second priority group of AF points which are processed second if the AF point cannot be determined using the first priority group of AF points due to a failure to detect the focus or the like, and a third priority group of AF points which are processed third when the camera is in the vertical position.

Now, based on the finder observing screen 300 in FIG. 12, the grouping table 1 (1-1 to 1-5, 1-9), showing the case where the camera is in the regular position and the line-of-sight detection is very reliable, will be described with reference to FIGS. 18A to 18F, and the grouping table 2 (2-1 to 2-5, 2-9), showing the case where the camera is in the regular position and the line-of-sight detection is not so reliable, will be described with reference to FIGS. 19A to 19F.

In any grouping table, the first priority group is defined taking into consideration the high probability of the presence of a main subject based on the location of the gazing point when the camera is in the regular position. Furthermore, a distribution of variation of the gazing point is taken into consideration based on the reliability of the line-of-sight detection such that if the line-of-sight detection is not so reliable, the variation distribution is extended in a predetermined direction (upward or horizontal direction). Thus, if the line-of-sight detection is not so reliable, the range of the first priority group of AF points is extended in the predetermined direction, and the number of AF points contained in the group is increased in the above direction, compared to a case where the line-of-sight detection is very reliable. The first priority group of AF points contains the AF points corresponding to the gazing point areas based on the location of the gazing point shown in FIG. 11.

Figure 18A:
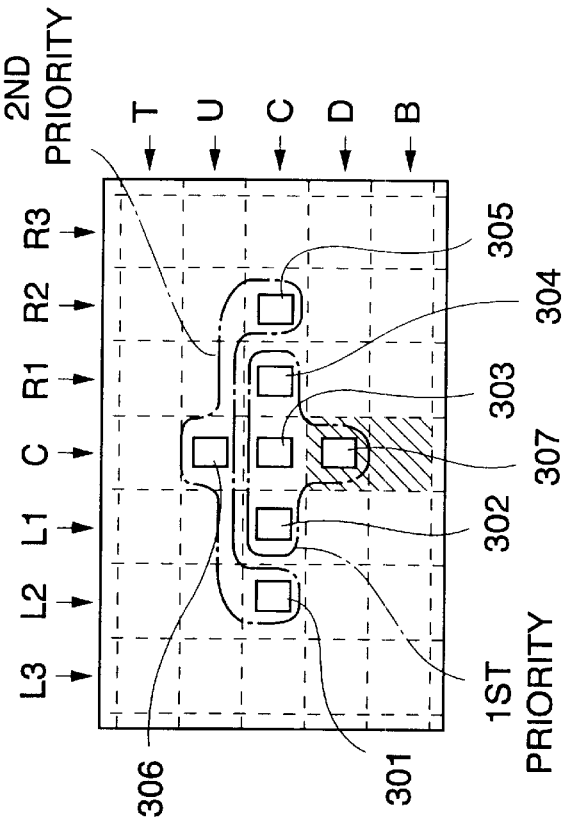
Figure 18B:
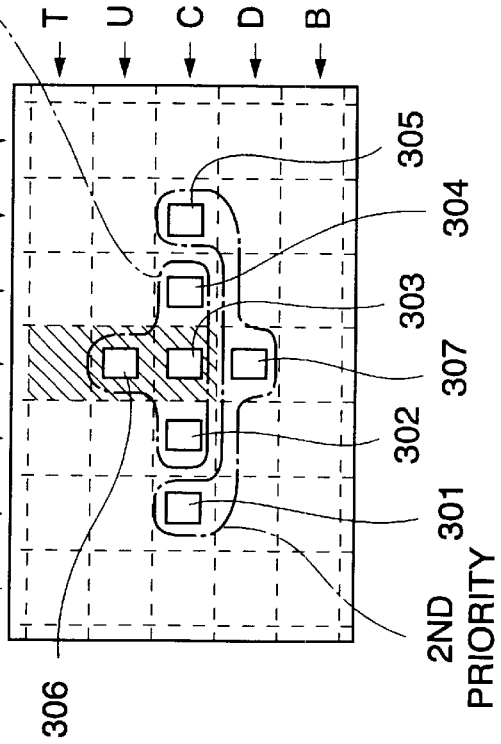

FIG. 18A corresponds to the grouping 1-1 shown in FIG. 14. Likewise, FIGS. 18B, 18C, 18D, and 18E correspond to the groupings 1-2, 1-3, 1-4, and 1-5 in FIG. 14, respectively.

The grouping 1-6 is symmetrical in form with the grouping 1-3. Similarly, the groupings 1-7 and 1-8 are symmetrical in form with the groupings 1-4 and 1-5, respectively, and are thus not shown in these figures.

FIG. 18F corresponds to the grouping 1-9 in FIG. 14. In this case, the AF point is selected using the normal automatic selecting mode in which the AF point is selected, as the nearest point, from the defocus amounts of all the AF points.

Figure 19A:
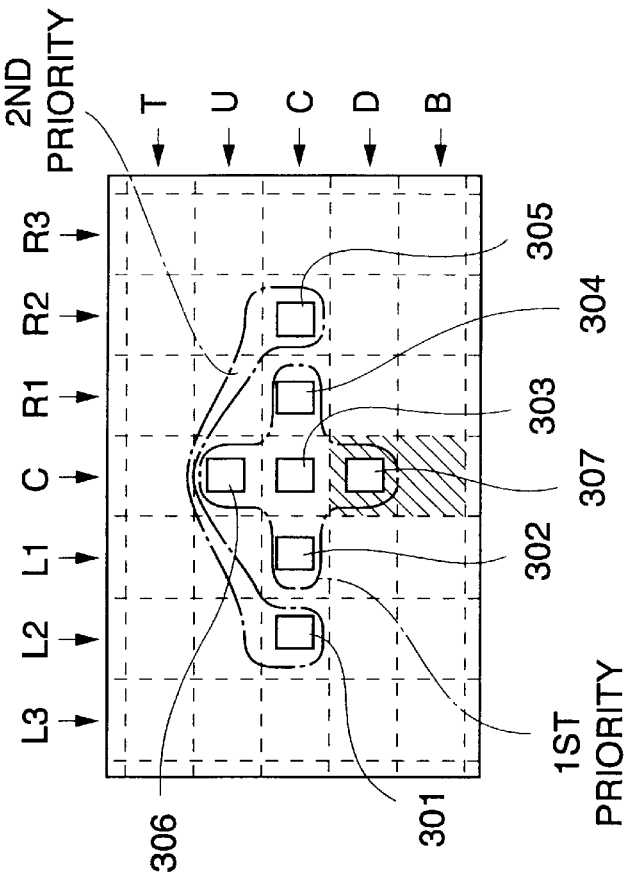
Figure 19B:
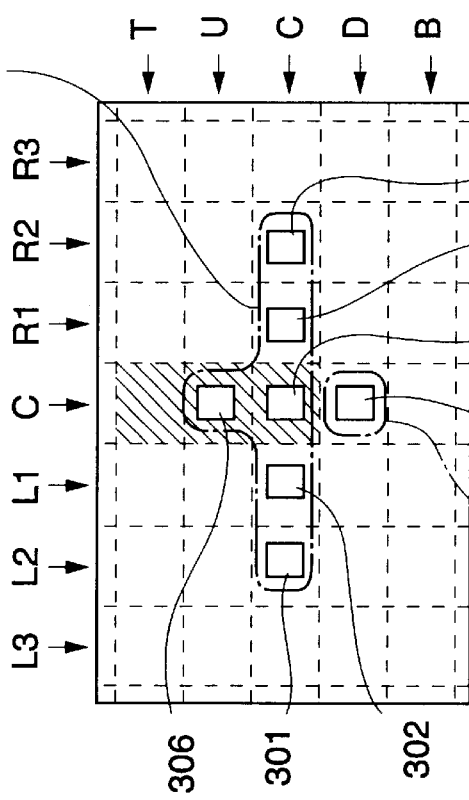
Figure 19E:
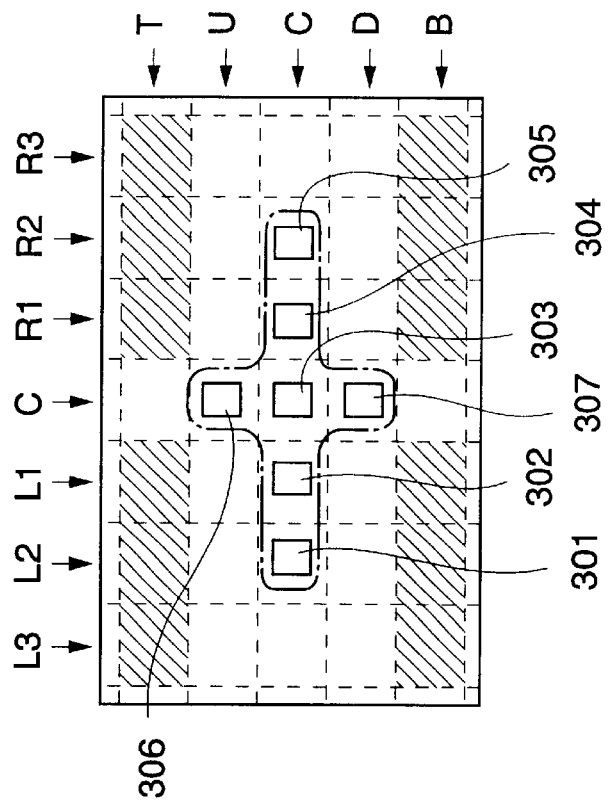

FIG. 19A corresponds to the grouping 2-1 in FIG. 15. Similarly, FIGS. 19B, 19C, 19D, and 19E correspond to the groupings 2-2, 2-3, 2-4, and 2-5 in FIG. 15, respectively.

The grouping 2-6 is symmetrical in form with the grouping 2-3. Similarly, the groupings 2-7 and 2-8 are symmetrical in form with the groupings 2-4 and 2-5, respectively, and are thus not shown in these figures.

Figure 19F:
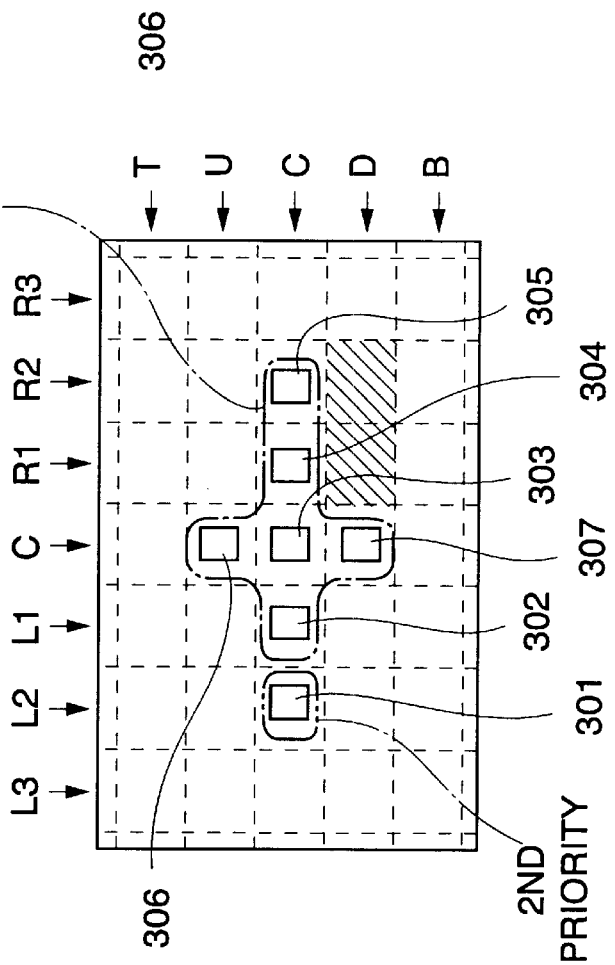

FIG. 19F corresponds to the grouping 2-9 in FIG. 15. In this case, the photographer' line of sight completely deviates from the subject. Thus, the AF point is selected using the normal automatic selecting mode, in which the AF point is selected, as the nearest point, from the defocus amounts of all the AF points.

As is apparent from FIGS. 18C, 18D, 18E, 19C, 19D, and 19E, neither the gazing point areas nor the grouping is symmetrical in the vertical direction of the finder observing screen, and the first priority group is extended upward. This is because the probability that the main subject is present near the bottom of the screen is low.

Figure 22:
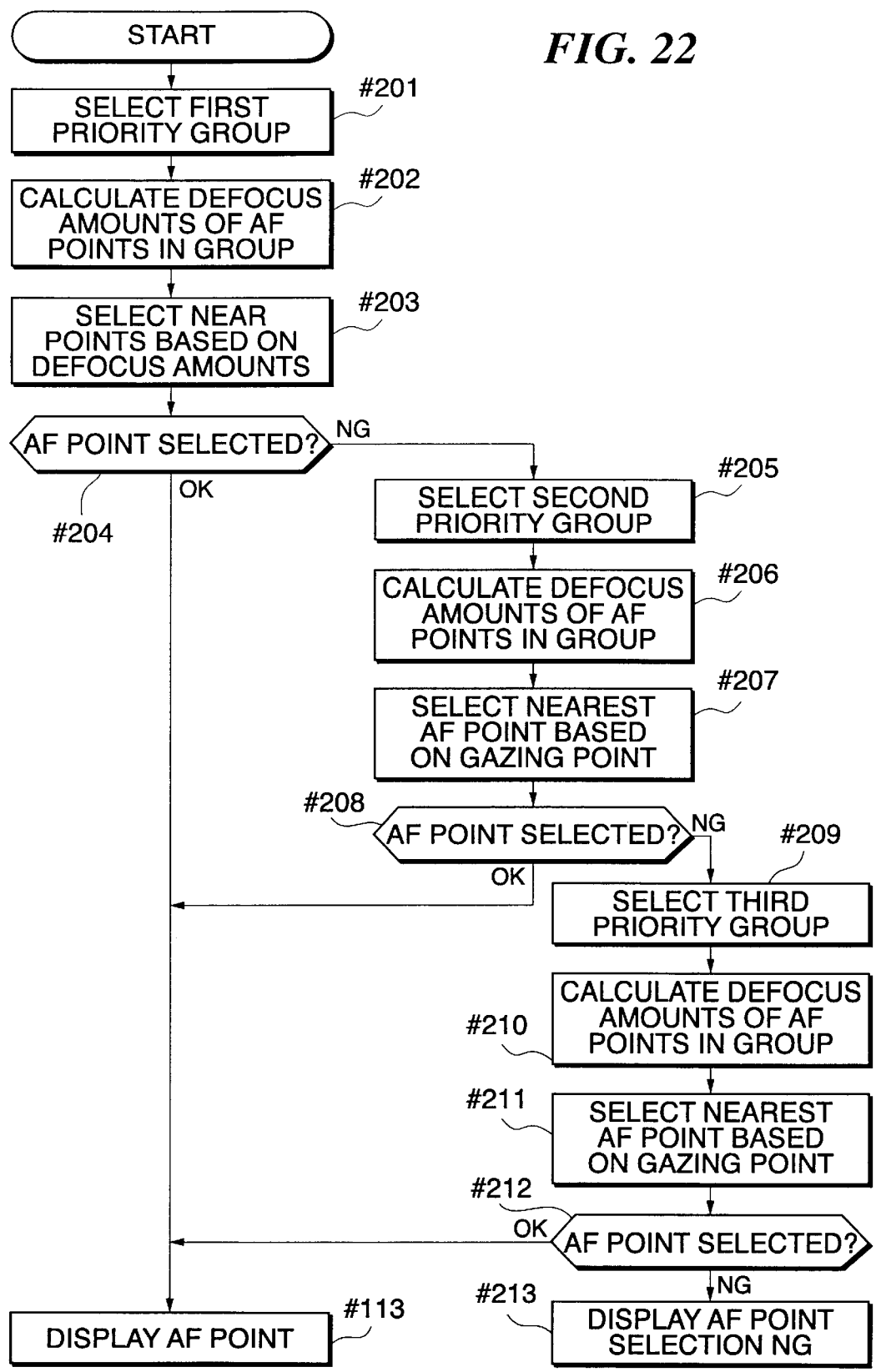
FIG. 22 is a flow chart showing the details of processing at a step #112 in FIG. 8.

The selection of the AF point (step #112 in FIG. 8) in FIGS. 18A to 18F and 19A to 19F will be described with reference to a flow chart in FIG. 22.

At a step #201, AF points contained in the first priority group are selected. At the next step #202, the defocus amounts of these AF points are calculated. At a subsequent step #203, an attempt is made to select one of the AF points according to the nearest-point priority algorithm. If there are a plurality of near points, one of these points which is nearest to the AF point corresponding to the above described gazing point area is selected. At the next step #204, it is determined whether or not focus can be detected at the selected AF point. If focus can be detected, the process proceeds to a step #113 in FIG. 9.

On the other hand, if no AF point at which focus can be detected cannot be selected from the first priority group at the step #204, the process proceeds to a step #205. At this step, AF points contained in the second priority group are selected. At the next step #206, the defocus amounts of these AF points are calculated. At a subsequent step #207, an attempt is made to select one of the AF points at which focus can be detected and which is near the gazing point area. If a plurality of AF points are located at an equal distance from the gazing point area, one of the AF points is selected according to the nearest-point priority algorithm based on the defocus information obtained from the AF points. Then, at the next step #208, it is determined whether or not focus can be detected at the selected AF point. If focus can be detected, the process proceeds to the step #113 in FIG. 9.

On the other hand, if no AF point at which focus can be detected can be selected from the second priority group at the step #208, the third priority group is processed at steps #209 to #211. In this case, however, the third priority group is not present, so that it is determined at the next step #212 that the selection of the AF point has failed. Then, the process proceeds to a step #123 to display a corresponding warning, that is, blink the focusing mark 818 shown in FIG. 5B.

Next, the grouping table 3 (3-1 to 3-6), showing the case where the camera is in the vertical position and the line-of-sight detection is very reliable, will be described with reference to FIGS. 20A to 20F, and the grouping table 4 (4-1 to 4-5), showing the case where the camera is in the vertical position and the line-of-sight detection is not so reliable, will be described with reference to FIGS. 21A to 21E.

Also in this case, the first priority group is defined taking into consideration the probability of the presence of the main subject when the camera is in the vertical position. In contrast to the above described case of the regular position, the third priority group is provided on a vertical extension. Furthermore, as is the same with the regular position, the variation distribution of the gazing point is taken into consideration based on the reliability of the line-of-sight detection. If the line-of-sight detection is not so reliable, the variation distribution is extended in a predetermined direction (upward or horizontal direction), and in particular, the range of the first priority group of AF points is extended in the predetermined direction, and the number of AF points contained in the group is increased in the same direction.

The first priority group of AF points contains AF points corresponding to the gazing point areas based on the location of the gazing point shown in FIGS. 18A to 18F. The two groupings in FIGS. 21A to 21E, i.e., the groupings 4-5, however, contain no corresponding AF points in the first priority group.

Further, the groupings 4-5 contain no AF points corresponding to the gazing point areas based on the location of the gazing point shown in FIGS. 18A to 18F, that is, the gazing point area L1·B in the grouping 4-5. This is because a greater importance is attached to the location of the gazing point, that is, the gazing point areas than to the AF points with respect to the grouping and process priorities based on the probability of the presence of the main subject. The first priority group of AF points, however, contains AF points near the gazing point areas.

Also in FIGS. 20A to 20F and 21A to 21E, the gazing point areas are hatched. Further, the corresponding AF points are shown by squares of bold solid lines. The grouping ranges are shown by bold solid lines enclosing AF points, and each grouping is shown with a priority as the order of the process of determining one AF point.

Figure 20A:
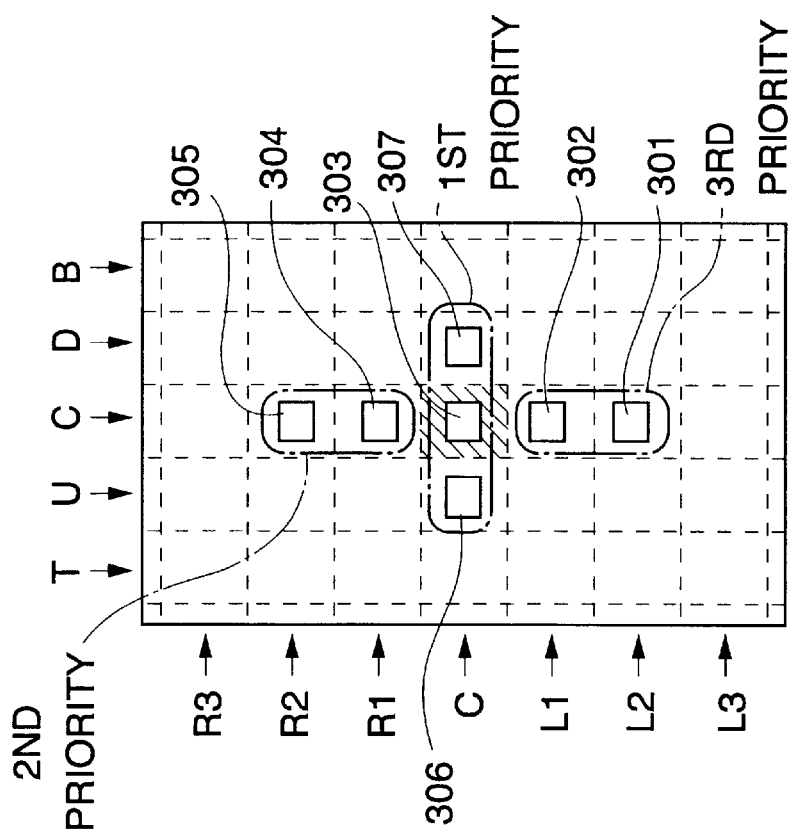
Figure 20B:
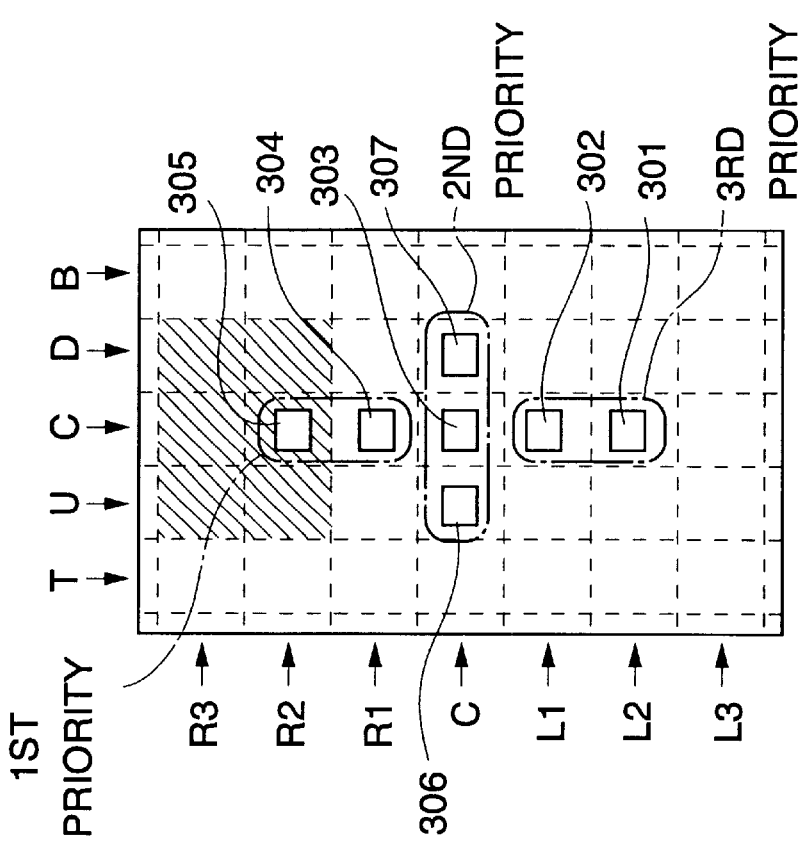

FIG. 20A corresponds to the grouping 3-1 in FIG. 16. Similarly, FIGS. 20B, 20C, 20D, 20E, and 20F correspond to the groupings 3-2, 3-3, 3-4, 3-5, and 3-6 in FIG. 16, respectively.

The grouping 3-7 is symmetrical in form with the grouping 3-5. Similarly, the grouping 3-8 is symmetrical in form with the grouping 3-6, and the groupings 3-7 and 3-8 are thus not shown in these figures. Further, the grouping 3-9 is not shown because it is automatically selected.

Figure 21E:
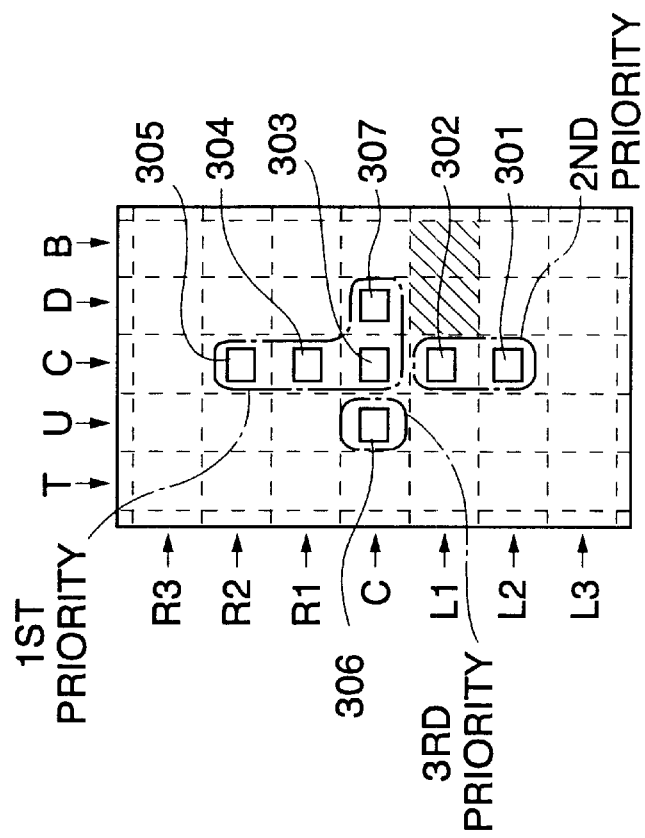
Figure 21D:
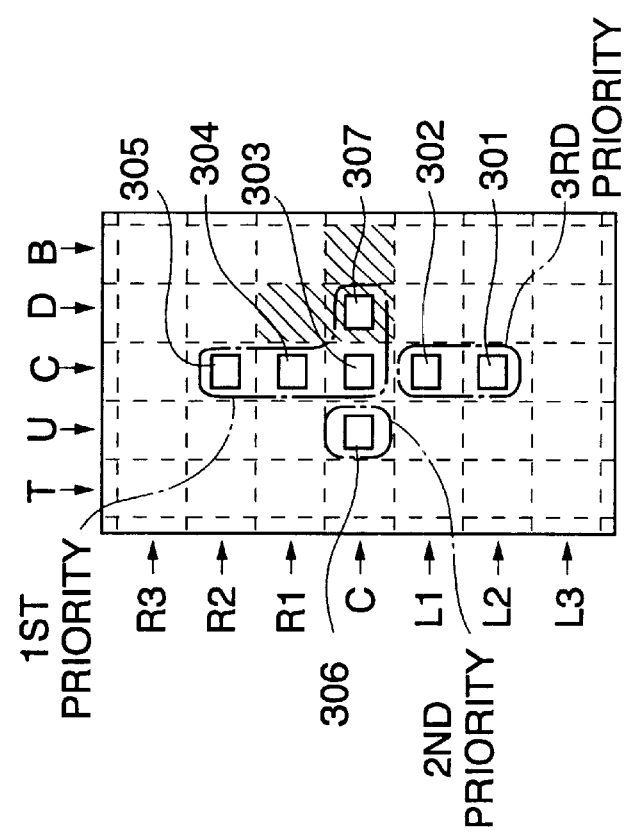

Moreover, FIG. 21A corresponds to the grouping 4-1 in FIG. 17. Similarly, FIGS. 21B, 21C, 21D, and 21E correspond to the groupings 4-2, 4-3, 4-4, and 4-5 in FIG. 17, respectively.

Also in FIGS. 20A to 20F and 21A to 21E, neither the gazing point areas nor the grouping is symmetrical in the vertical direction of the finder observing screen, and the first priority group is extended upward. This is because the probability that the main subject is present near the bottom of the screen is low.

The selection of the AF point (step #112 in FIG. 8) in FIGS. 20A to 20F and 21A to 21E will be described with reference to the flow chart in FIG. 22. The defocus amount is detected by the seven line sensors CCD-C, CCD-R1, CCD-R2, CCD-L1, CCD-L2, CCD-T, and CCD-B constituting the line sensor 116 in the focus detecting device 6, i.e., at the AF points 301 to 307.

At the step #201, AF points contained in the first priority group are selected. At the next step #202, the defocus amounts of these AF points are calculated. At the subsequent step #203, an attempt is made to select one of the AF points according to the nearest-point priority algorithm. If there are a plurality of near points, one of these points which is nearest to the AF point corresponding to the above described gazing point area is selected. At the next step #204, it is determined whether or not focus can be detected at the selected AF point. If focus can be detected, the process proceeds to the step #113 in FIG. 9.

On the other hand, if no AF point from which focus can be detected can be selected from the first priority group at the step #204, the process proceeds to the step #205. At this step, AF points contained in the second priority group are selected. At the next step #206, the defocus amounts of these AF points are calculated. At the subsequent step #207, an attempt is made to select one of the AF points from which focus can be detected and which is near the gazing point area. If a plurality of AF points are located at an equal distance from the gazing point area, one of the AF points is selected according to the nearest-point priority algorithm based on the defocus information obtained from the AF points. Then, at the next step #208, it is determined whether or not focus can be detected from the selected AF point. If focus can be detected, the process proceeds to the step #113 in FIG. 9.

On the other hand, if no AF point at which focus can be detected can be selected from the second priority group at the step #208, the process proceeds to the step S209. At this step, AF points contained in the third priority group are selected. At the next step #210, the defocus amounts at these AF points are calculated. At the subsequent step #211, an attempt is made to select one of the AF points at which focus can be detected and which is near the gazing point area. If a plurality of AF points are located at an equal distance from the gazing point area, one of the AF points is selected according to the nearest-point priority algorithm based on the defocus information obtained from the AF points. Then, at the next step #212, it is determined whether or not focus can be detected at the selected AF point. If focus can be detected, the process proceeds to the step #113 in FIG. 9. On the other hand, if the AF point cannot be selected at the step #212, the process proceeds to the step #213 to display a corresponding warning, that is, blink the focusing mark 818 shown in FIG. 5B.

Figure 8:
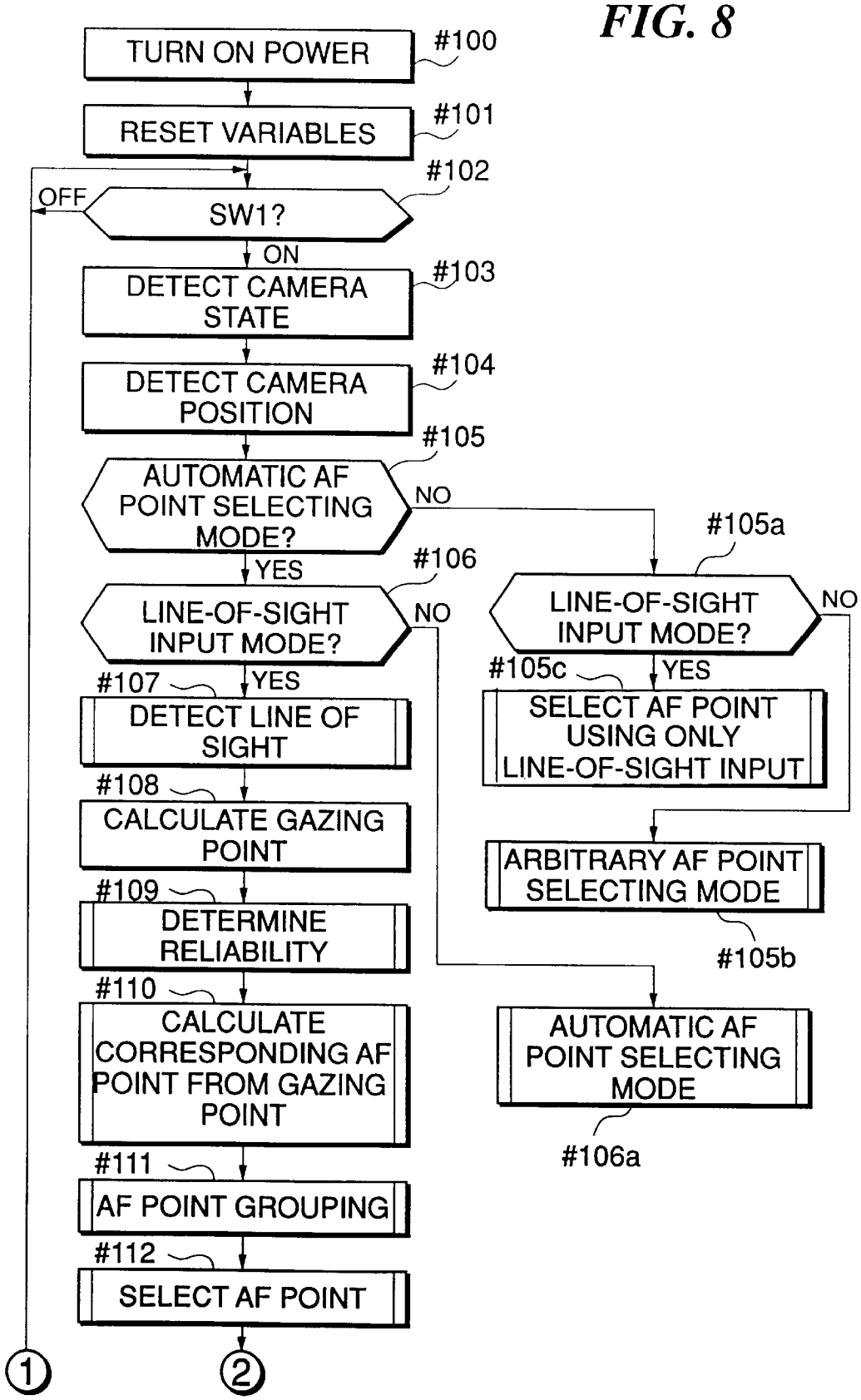
FIG. 8 is a flow chart showing a part of a photographic operation of the camera according to the first embodiment.

Then, referring again to FIG. 9, showing a continued part of the operation shown in FIG. 8, after the CPU 100 has completed the operation at the above step #113, the process proceeds to a step #114. Then, if the photographer views the display of the AF point mark, realizes that that AF point is incorrect, releases the release button 201, and then turns off the switch SW1, the process returns to the step #102 in FIG. 8.

On the other hand, if the photographer continues depressing the release button 201 after viewing the displayed selected AF point mark, to keep the switch SW1 on, the process proceeds to a step #115. At this step, a focus detecting operation is performed on the selected AF point. Then, at the next step #116, it is determined whether or not focus can be detected at this AF point. If focus can be detected, the process proceeds to a step #117. At this step, it is determined whether or not the focusing lens 1a in the taking lens is focused. If the focusing lens 1a is not focused, the process proceeds to a step #118. At this step, the CPU 100 transmits a signal to the lens focusing circuit 110 to drive the lens 1a by a predetermined amount. Subsequently, the process returns to the step #115 to cause the automatic focus detecting circuit 103 to detect the focus again. The process then proceeds to a step #117 through a step #116 to determine again whether or not the taking lens 1 is focused.

Further, if focus cannot be detected at the step #116, the process proceeds to a step #120 to blink the focusing mark 818 shown in FIG. 5B, thereby indicating that focus cannot be detected. At a subsequent step #121, it is determined whether or not the switch SW1 is on. If the switch SW1 is on, the process returns to the step #117 to continue blinking the focusing mark 818. On the other hand, if the switch SW1 is off, the process returns to the step #102 in FIG. 8 to wait for the switch SW1 to be turned on again.

If the taking lens 1 is focused at the AF point selected as described previously, the process proceeds from the step #117 to a step #119. At this step, the CPU 100 transmits a signal to the LCD driving circuit 105 to light the focusing mark 818 in the intra-finder LCD 24, while also transmitting a signal to the IRED driving circuit 107 to display the AF point mark corresponding to the AF point at which the lens is focused, to indicate that the lens is focused. Then, if the photographer views the display of that AF point mark, realizes that the AF point is incorrect, releases the release button 201, and then turns off the switch SW1, the process returns from a step #122 to the step #102 in FIG. 8. On the other hand, if the photographer continues depressing the release button 201 after viewing the displayed selected AF point mark, to keep the switch SW1 on, the process proceeds to a step #123. At this step, the CPU 100 transmits a signal to the photometric circuit 102 to cause it to perform a photometric operation. In this case, one of the seven photometric areas (processed by the photo diodes SPC-A to SPC-G) which contains the AF point at which the lens is focused is selected, and a weighted exposure value is calculated. That is, in the present embodiment, known photometric calculations are executed by weighting the photometric areas around the one containing the selected AF point. Then, a diaphragm value (for example, F5.6) as a result of the above calculations is displayed using the seven segments 803 and decimal-point display section 804 of the monitoring LCD 202 and the segment 814 of the extra-finder-visual-field display section 308.

At the next step #124, it is determined whether or not the release button has been depressed to turn the switch SW2 on. If the switch SW2 is not on, the process returns to the step #122 to determine the state of the switch SW1. On the other hand, if the switch SW2 is on, the process proceeds to a step #125. At this step, the CPU 100 transmits different signals to the shutter control circuit 108, the motor control circuit 109, and the diaphragm driving circuit 111 to perform a shutter release operation.

Specifically, the magnet MG-2 is energized so that the main mirror 2 is brought up and the diaphragm 31 is stopped down. Subsequently, the magnet MG-1 is energized so that the front screen of the shutter 4 is opened. The diaphragm value of the diaphragm 31 and the shutter speed of the shutter 4 are determined from the exposure value detected by the photometric circuit 102 and from the sensitivity of the photosensitive member 5 if it is a film. After the determined shutter speed time per second (for example, ¹⁄₂₅₀ seconds) have elapsed, the magnet MG-2 is energized again so that the mirror is brought down and charged. Simultaneously, the magnet MG-1 is energized so that the film is passed to a next frame, thus completing the series of shutter release operations. Subsequently, the process returns to the step #102 in FIG. 8 to wait for the switch SW1 to be turned on.

The configuration of the above described first embodiment will be described below.

1) The gazing point, that is, information on the photographer's line of sight, is not used as information for directly selecting the AF point present near the center of the finder observing screen 300. Instead, the AF points are grouped all over the observing screen 300 according to the locations of the gazing points. In the prior art, selection areas contain AF points adjacent or close to the location of the gazing point, and one of these AF points is selected. In the present embodiment, selection areas from which the AF point is to be selected are grouped all over the observing screen according to the locations of the gazing points and based on the possibility of the presence of the main subject so that at least one AF point can be selected from these groups.

2) The ranges of the groupings and the priorities for the process of selecting them are provided beforehand as tables. Thus, it is unnecessary to calculate the defocus information on all the AF points followed by carrying out calculations based upon each other. It is only necessary to calculate the defocus amounts of the AF points contained in the first priority group for calculations based upon each other.

3) Further, the manner of selection of one AF point from the group is changed between groups such that the nearest-point priority algorithm is used for the first priority group, while AF points nearer to the location of the gazing point are sequentially selected starting with one nearest thereto, for the second and subsequent priority groups. Thus, the calculations can be promptly executed for the first priority group, and if the second priority group is processed, the calculations can be sequentially executed for the AF points nearer to the location of the gazing point, starting with one nearest thereto. Therefore, it is very rare that the defocus amounts of all the AF points must be calculated for calculations based upon each other. Furthermore, since the AF points nearer to the location of the gazing point are selected first, the information on the photographer's line of sight can be taken into consideration.

In most cases, the first priority group contains AF points corresponding to the location of the gazing point or the gazing point areas shown in FIG. 11. However, the relationship between the photographer's gazing point and the probability of the presence of the main subject is important. Thus, the first priority group need not necessarily contain AF points corresponding to the gazing point areas, as in the grouping 4-5 in FIGS. 17 and 21E.

4) The grouping is varied depending on whether the camera is in the regular or vertical position. Thus, the relationship between the photographer's gazing point and the probability of the presence of the main subject, which relationship may vary according to the status of the photographic screen, can be reflected in the grouping for selecting one AF point.

5) Further, the grouping is varied according to the reliability of the detection of the photographer's line of sight. Consequently, the grouping can be achieved depending on the variation distribution of the photographer's gazing point.

6) Moreover, the reliability of the line-of-sight detection is determined by comparing the diameter of the photographer's pupil at the time of photographing based on the number of calibrations and on the relevant information on the pupil diameter. This reliability is reflected in the grouping corresponding to the location of the gazing point, particularly in the extension of the first priority group of AF points. Furthermore, the grouping reflects the above described position information and the group extending direction.

(Second Embodiment)

The construction of the single-lens reflex camera according to the present embodiment is the same as that in FIGS. 1 to 7, showing the first embodiment, but the control flow is partly different.

A series of operations performed by the camera of the present invention will be described with reference to a flow chart in FIG. 23.

The steps #100 to #106 are the same as those in FIG. 8, showing the first embodiment, and description thereof is thus omitted.

When the line-of-sight/automatic selecting mode has been selected, the process proceeds from the step #106 to a step #707. At this step, an automatic selecting process is executed based on the defocus amounts obtained from the focus detecting device 6f and corresponding to the AF points 301, 302, 303, 304, 305, 306, and 307.

Figure 24A:
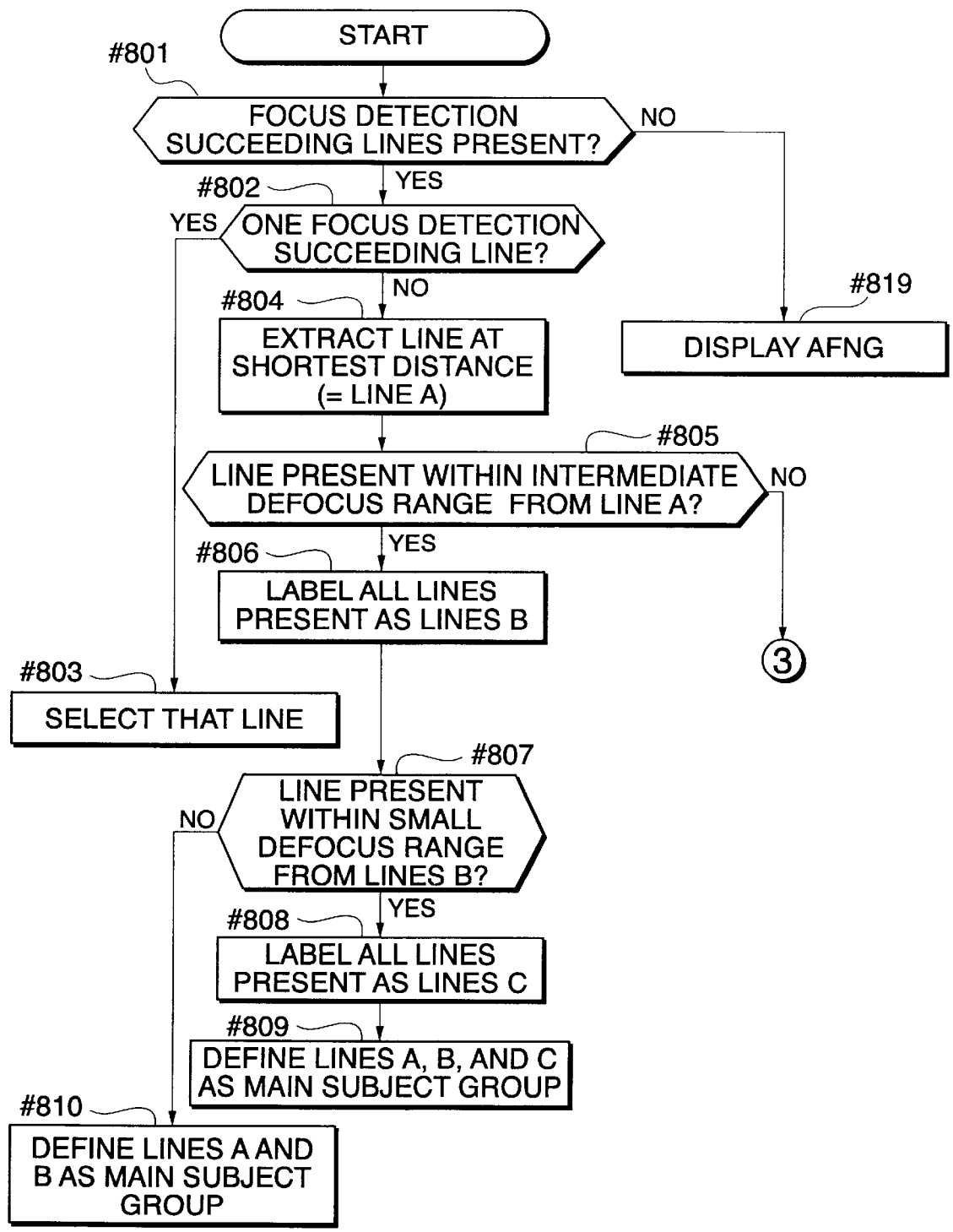
FIG. 24 is a flow chart showing the details of processing at a step #709 in FIG. 23.
Figure 24B:
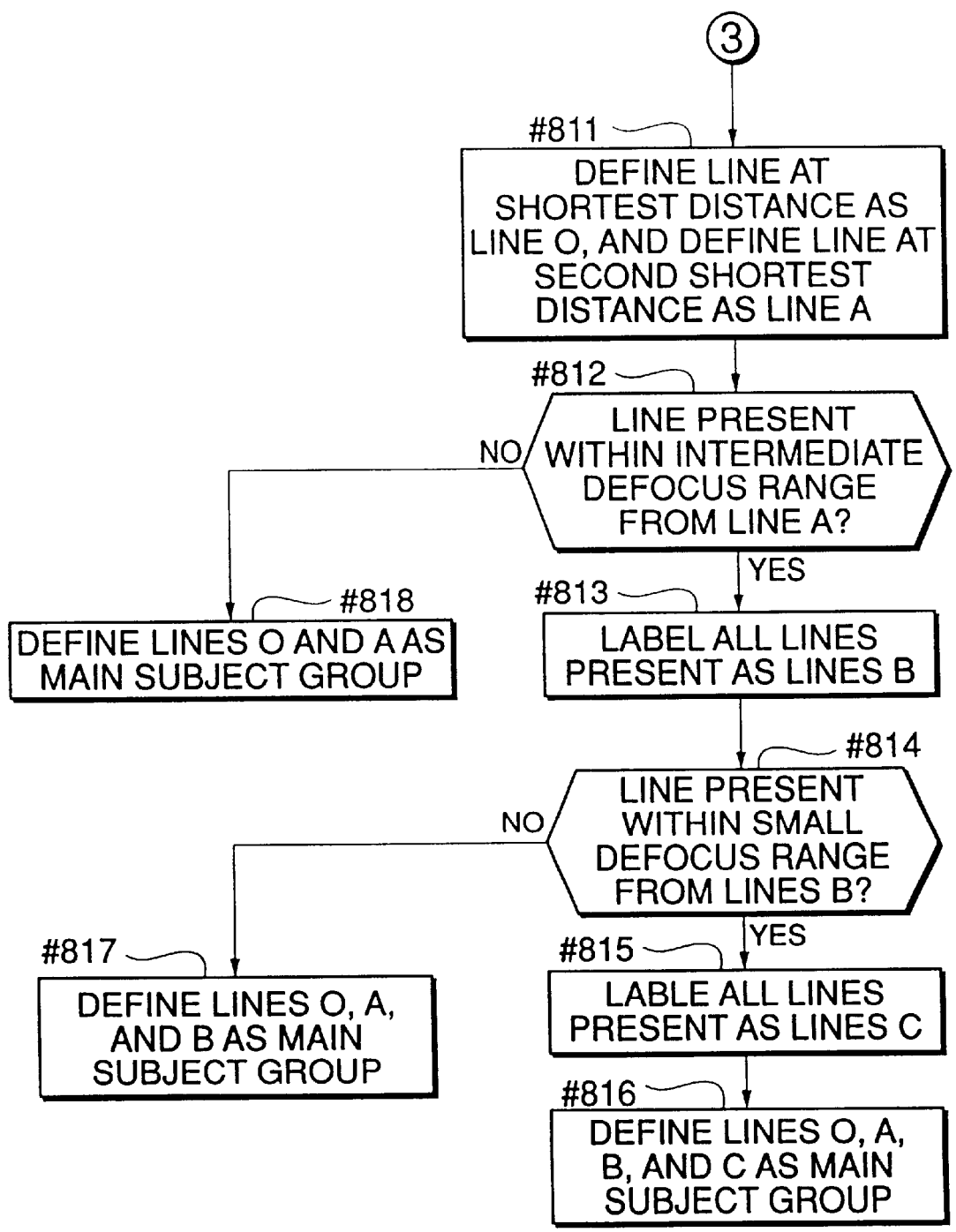

This automatic selecting process will be described with reference to a flow chart in FIG. 24.

First, at a step #801, focus is detected using the seven line sensors CCD-C, CCD-R1, CCD-R2, CCD-L1, CCD-L2, CCD-T, and CCD-B corresponding to the seven AF points 301 to 307. Then, a luminance distribution is extracted from a subject area corresponding to each AF point. At this time, if any subject area contains no luminance distribution, an output from that AF point results in an error. If the luminance distribution is successfully extracted from any AF point, that is, the defocus amount can be obtained therefrom, and the focus is successfully detected therefrom, then that AF point is considered to be a line, and the number of such lines is counted. If the number of lines from which the focus has been successfully detected is zero, the process proceeds to a step #819 to indicate that the focus detection has failed (AFNG).

In contrast, if the number of lines is not zero, the process proceeds to a step #802. At this step, it is determined whether or not focus has been successfully detected from only one line, with outputs from the remaining six AF points resulting in errors. If this is the case, the process proceeds to a step #803.

At the step #803, the AF point corresponding to this line is determined as one from which is to be obtained the defocus amount required for the taking lens 1 to perform the focus detecting operation.

If it is determined at the step #802 that focus has been successfully detected from a plurality of lines, the process proceeds to a step #804. At this step, of the plurality of lines from which focus has been successfully detected, one that can be determined, based on the detected defocus amount, to have the shortest distance from the camera to the corresponding subject is labeled as "the line A".

Figure 23:
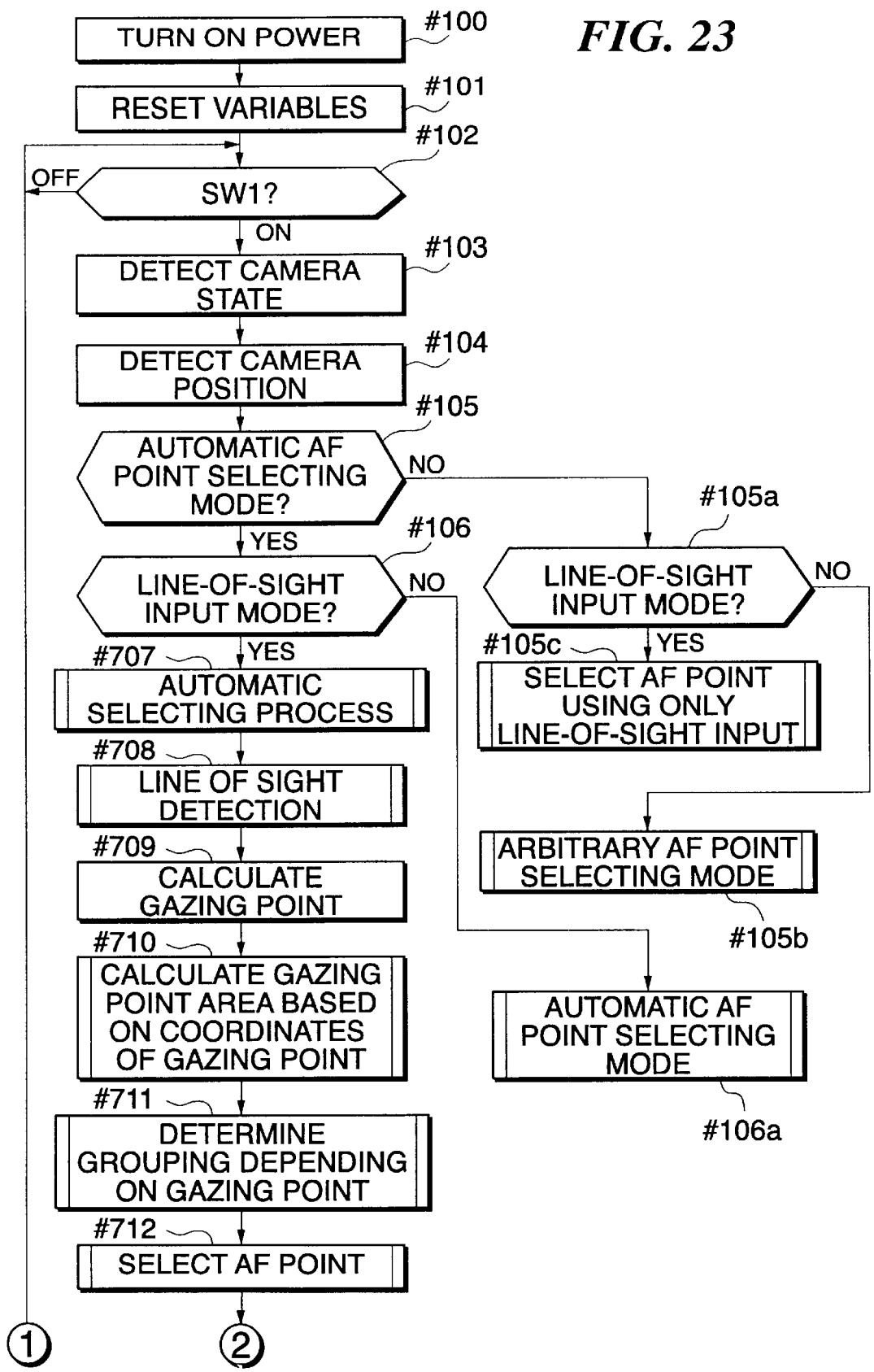
FIG. 23 is a flow chart showing a part of a photographic operation according to a second embodiment of the present invention.
Figure 27:
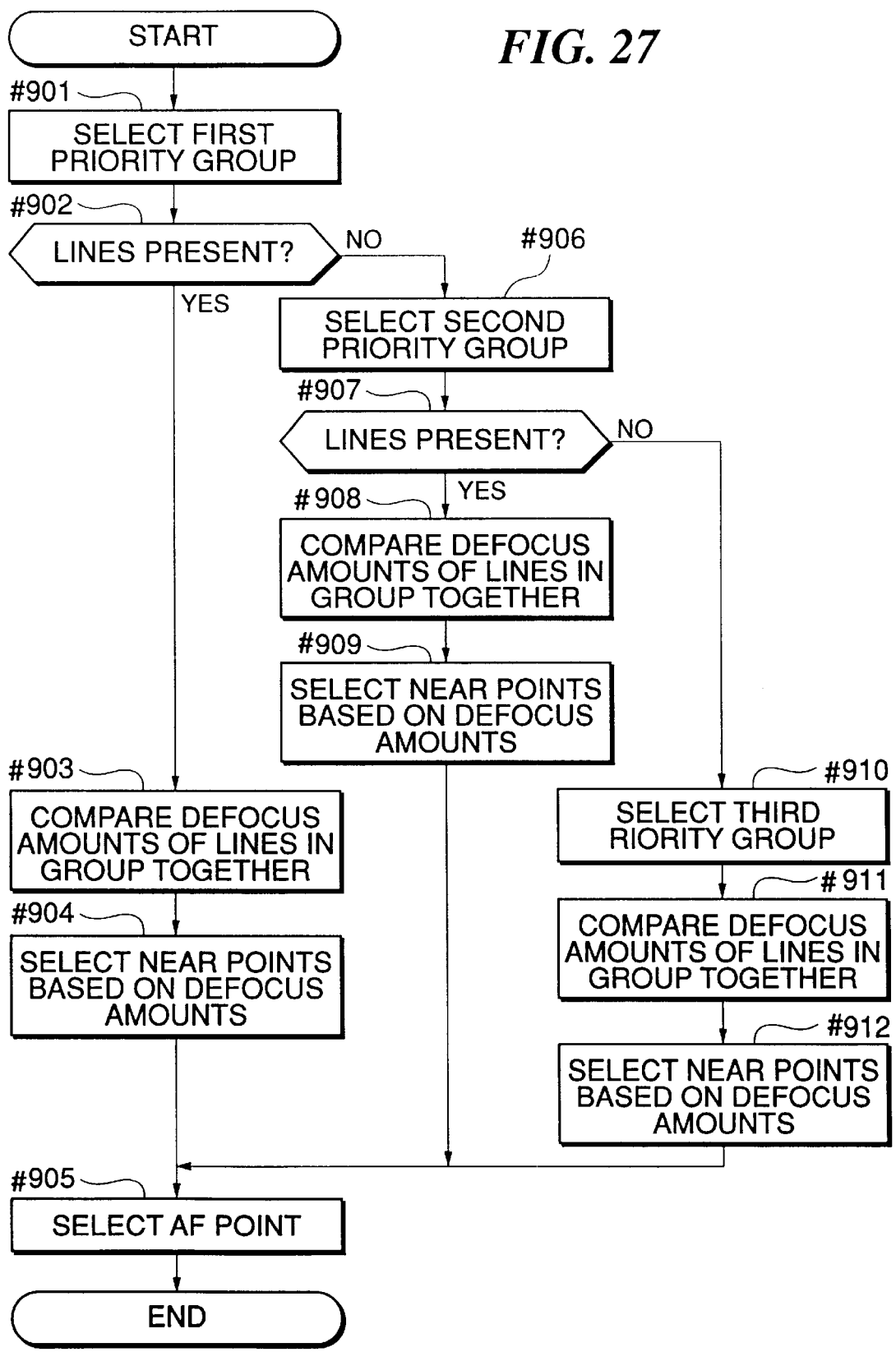
FIG. 27 is a flow chart showing the details of processing at a step #712 in FIG. 23.

In the automatic AF point selecting mode (step #106a) shown in FIG. 23, the process is executed up to the step #804 shown in FIG. 27, to determine the line A as the AF point. If the automatic AF point selecting mode (step #106a) has been selected due to a low line-of-sight detection reliability output, there may be a large deviation between the photographer's line of sight and the gazing point as the result of the line-of-sight detection. Consequently, it is difficult to predict the photographer's line of sight from the gazing point. Thus, the AF point is selected using the defocus information on a plurality of AF points. At the next step #805, it is checked whether or not a line from which focus can be detected is present within an intermediate defocus range from the line A on an infinity side of the camera. This intermediate defocus range represents a defocus amount of a (mm) in terms of an out-of-focus amount in the direction of the optical axis in the neighborhood of the photosensitive member 5 in FIG. 1. That is, when the focal distance of the taking lens 1 is defined as f (mm), and the distance from the photosensitive member 5 in FIG. 1 to a subject nearest to the camera is defined as L (mm), a subject is be selected, which is present substantially within the following range on the infinity side of the subject nearest to the camera:

$$\{(L-f)^2 \cdot f^2\} \times a \text{ (mm)}$$

According to the present embodiment, a=2 (mm). For example, when a taking lens of 50 mm focal distance is mounted in the camera, if the subject nearest to the camera is present 2.55 m away from the image forming plane, a subject is selected, which is present within 5 m from that position in the infinity direction.

If any lines from which focus has been successfully detected are present within this intermediate defocus range, the process proceeds from the step #805 to a step #806. Then, all such lines present are labeled as "the lines B". At the next step #807, it is determined whether or not any line is present within a small defocus range from one of the lines B which captures a subject farthest from the camera. This small defocus range represents a defocus amount of b (mm) in terms of an out-of-focus amount in the direction of the ocular axis in the neighborhood of the photosensitive member 5 in FIG. 1. However, a>b. If any lines are present within the small defocus range, the process proceeds from the step #807 to a step #808. Then, all such lines are labeled as "the lines C". That is, if any subject is present within the intermediate defocus range from the subject nearest to the camera, then the selection range is extended a little further. In the present embodiment, b=0.2 mm. If any line C is present, the process proceeds to a step #809 to define the lines A, B and C as a group containing the main subject.

On the other hand, if it is determined at the step #807 that if no line from which focus has been successfully detected is present within the small defocus range, that is, no line C is present, the process proceeds to a step #810. At this step, the lines A and B are defined as the group containing the main subject.

Further, if it is determined at the step #805 that no line from which focus has been successfully detected (hereinafter referred to as "focus detecting line") is present within the intermediate defocus range, the process proceeds to a step #811. At this step, the line A is relabeled as "the line O", and a focus detecting line that captures a subject second nearest from the camera is labeled as "the line A". At a subsequent step #812, as in the step #805, it is checked whether or not a focus detecting line is present within the intermediate defocus range from the line A on the infinity side of the camera. If any such lines are present, the process proceeds to a step #813. At this step, all the focus detecting lines which are present within the intermediate defocus range are labeled as "the lines B". The process then proceeds to a step #814.

At the step #814, as in the above step #807, it is checked whether or not the lines B include one or more lines which are present within the small defocus range from a line which captures the subject farthest from the camera. If any such lines are present, the process proceeds to a step #815 to label all of them as "the lines C". Then, at the next step #816, the lines O, A, B, and C are defined as the group containing the main subject. On the other hand, if it is determined at the step #814 that no line is present within the small defocus range, the process proceeds to a step #817. In this case, the lines O, A, and B are defined as the group containing the main subject.

Further, if it is determined at the step #812 that no line is present within the intermediate defocus range, the process proceeds to a step #818. In this case, the lines O and A are defined as the group containing the main subject.

As described above, based on a plurality of defocus amounts, the group containing the main subject is defined with reference to the subject nearest to the camera. That is, the range within which the main subject is very likely to be present is determined according to the status of the group of subjects.

Referring again to FIG. 23, after the group containing the main subject has been defined as described above, the process proceeds to a step #708 to detect the photographer's line of sight. At the next step #709, the result of the line-of-sight detection is corrected using the calibration data, and the photographer's gazing point is converted into coordinates on the focusing plate 7. At a subsequent step #711, it is determined which gazing point area corresponds to the coordinates of the gazing point.

Figure 12:
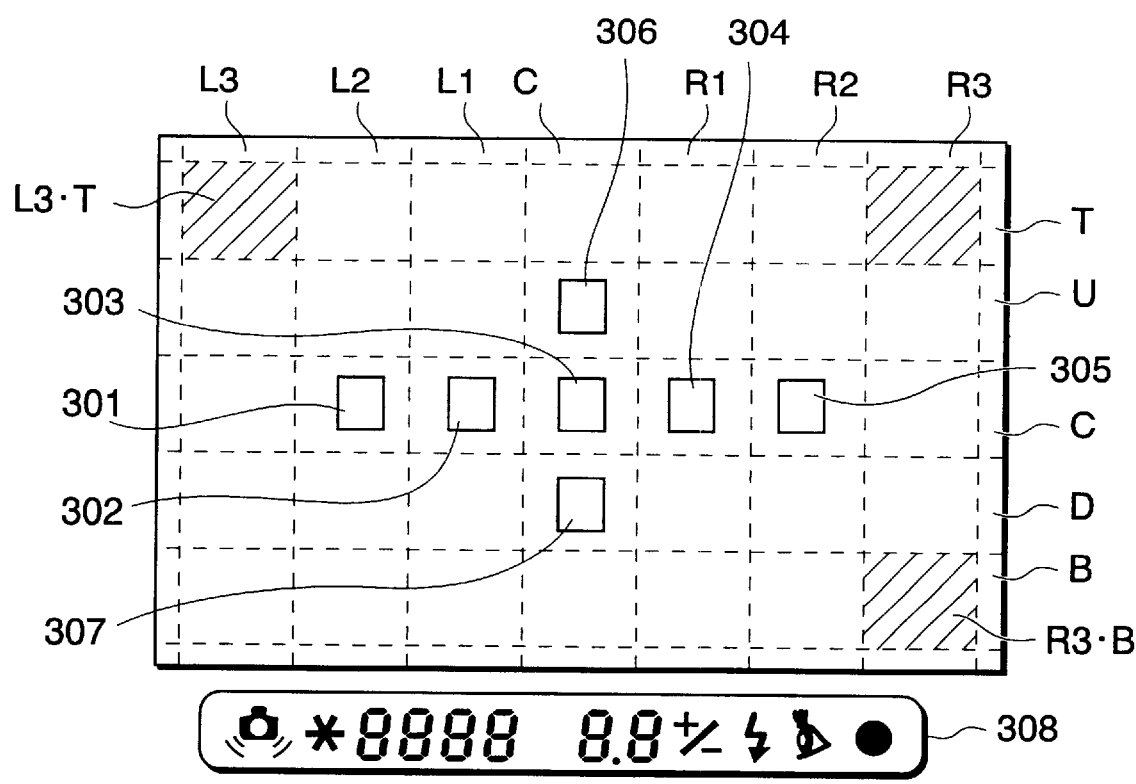
FIG. 12 is a view showing the relationship between the AF points and gazing point areas provided in the camera of the first embodiment.

Here, the correspondence between the coordinates of the gazing point and the gazing point areas is the same as that in FIG. 12 according to the first embodiment.

In the line-of-sight input mode in which one of the seven AF points is selected using only the gazing point, if the coordinates of the gazing point are present in any of the gazing point areas L2·C, L1·C, C·C, R1·C, R2·C. C·U, and C·D each containing a corresponding one of the seven AF points, then the AF point contained in this gazing point area is selected and then lighted and displayed. On the other hand, if no AF point is present in the gazing point area in which the coordinates of the gazing point are present, the camera is brought into the automatic AF point selecting mode. In this case, the CPU 100 causes the line-of-sight input mark 817 in FIG. 5B to blink as a warning display so that the photographer can realize that the camera is not in the line-of-sight input mode in which the AF mode is selected using only the gazing point.

Referring again to FIG. 23, at the next step #711, the seven AF points are grouped with respect to the gazing point area in which the coordinates of the gazing point are present. This grouping has already been provided based on the result of the camera position detection at the step #104 and. on the gazing point area in which the coordinates of the photographer's gazing point are present. Furthermore, the priorities as the order of the process of determining one AF point has also already been provided for the plurality of groups obtained by the grouping.

FIGS. 25A to 25J and 26A to 26I show the finder observing screen 300, on which are shown the gazing point areas, the grouping of the seven AF points, and the process priorities for the groups obtained by the grouping.

When the coordinates of the photographer's gazing point are present in the hatched gazing point area, the seven AF points are grouped as shown by frame lines. In this case, a grouping ① corresponds to the first priority group, which is first processed to determine one AF point. A grouping ② corresponds to the second priority group, which is processed next to determine one AF point if no AF point could be selected by processing the first priority group. A grouping ③ corresponds to the third priority group, which is processed next to determine one AF point if no AF point could be selected by processing the second priority group.

More specifically, FIGS. 25A to 25J show relationships corresponding to the grouping table for the regular position of the camera. FIGS. 25A to 25J show ten grouping tables depending on the gazing point area. Further, FIGS. 26A to 26I show relationships corresponding to the grouping table for the vertical position of the camera with the photographer's right hand 108 in FIG. 2 positioned upward. FIGS. 26A to 26I show nine grouping tables depending on the gazing point area.

For the grouping table for the vertical position of the camera with the photographer's right hand 108 positioned downward, the correspondence between the gazing point area and the seven AF points is in a vertically symmetrical relationship with that in FIGS. 26A to 26I. Thus, illustration thereof is omitted.

In either grouping table, the first, second, and third priority groups are defined with respect to the location of the gazing point for the regular or vertical position of the camera, taking into consideration the probability of the presence of the main subject and the variation distribution of the gazing point. Accordingly, the number of groupings and the number and arrangement of the AF points contained in each of the groupings ①, ②, and ③ are varied depending on the location of the gazing point.

Figure 25A:
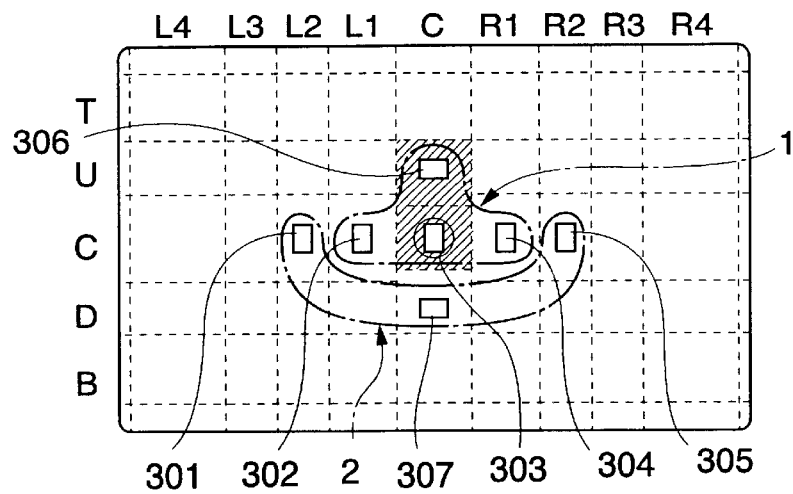
FIGS. 25A to 25J are views showing a finder observing screen displaying grouping in a case where the camera is in a horizontal position according to the second embodiment.
Figure 25B:
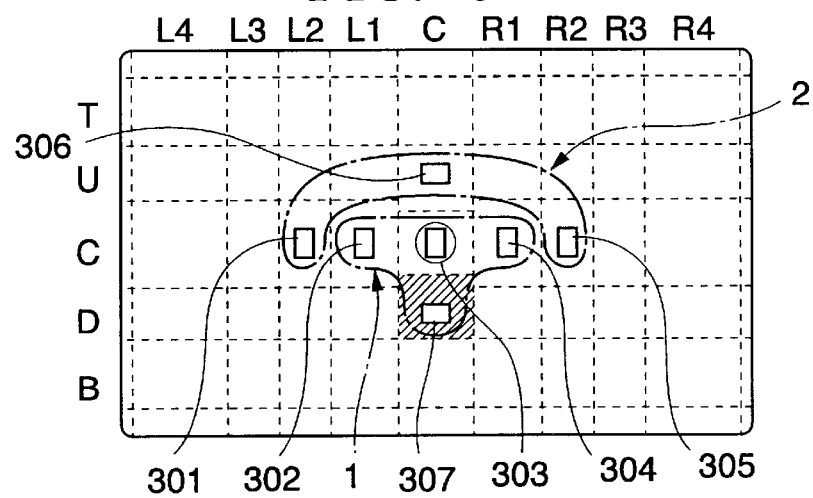
Figure 25C:
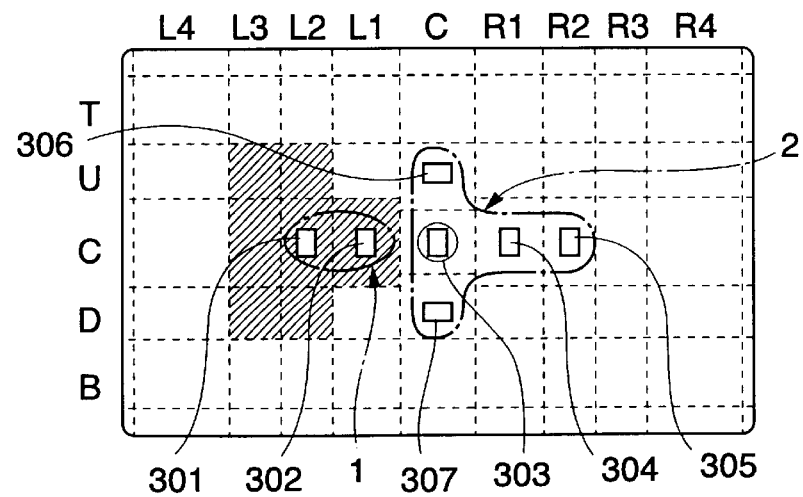
Figure 25D:
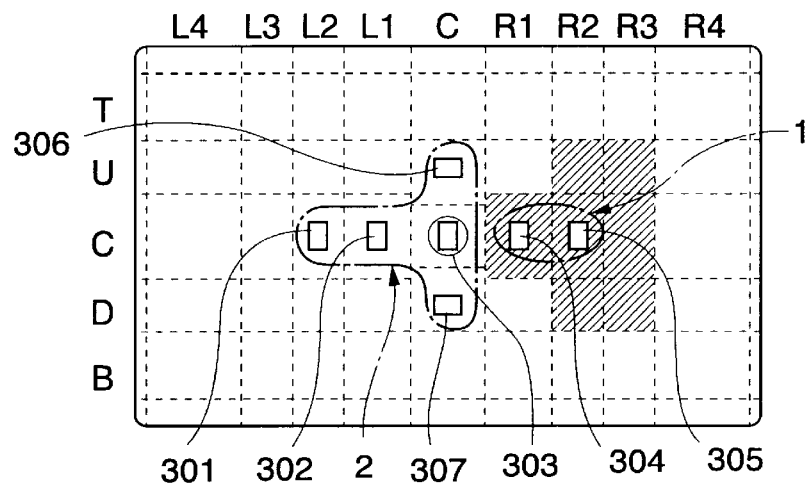
Figure 25E:
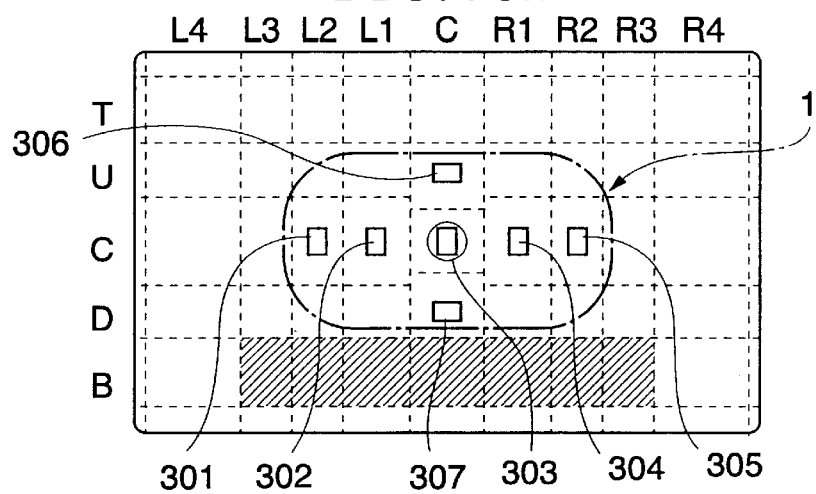
Figure 25F:
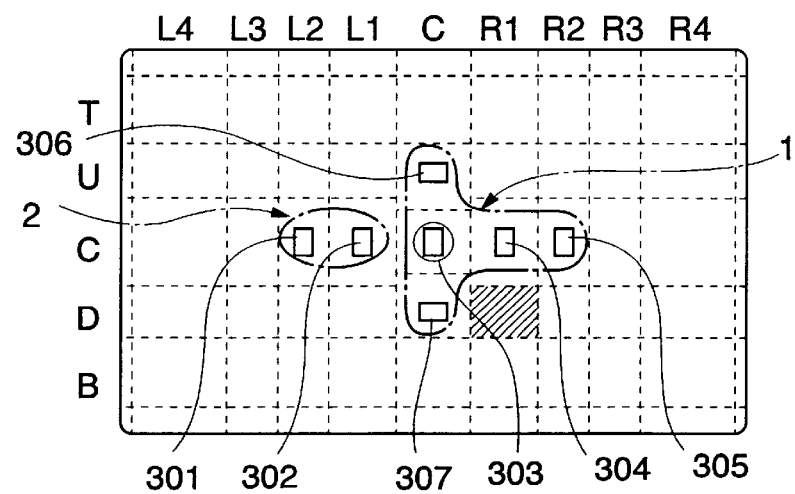
Figure 25G:
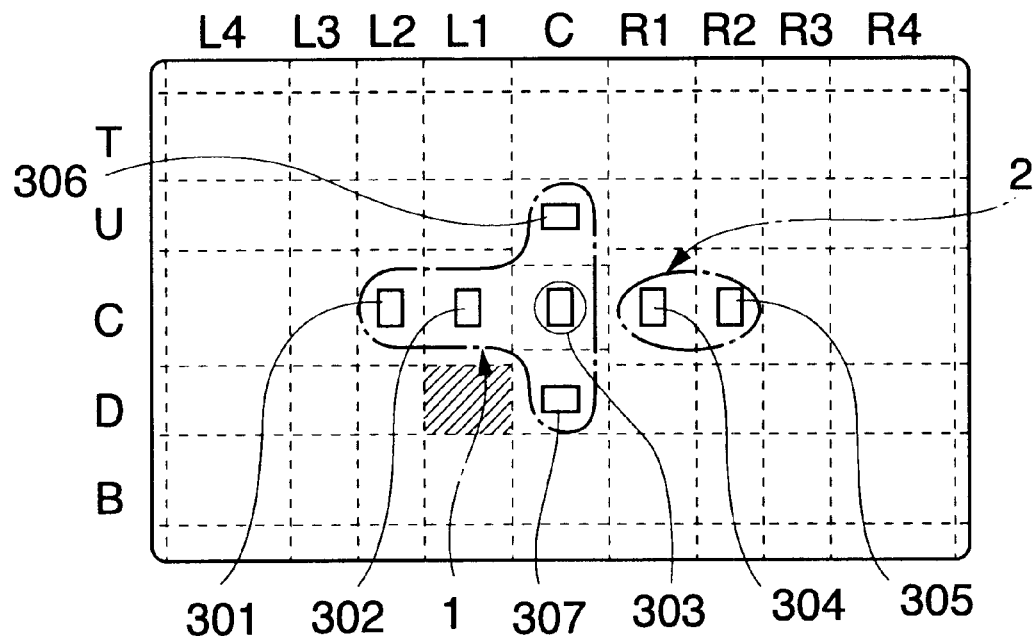
Figure 25H:
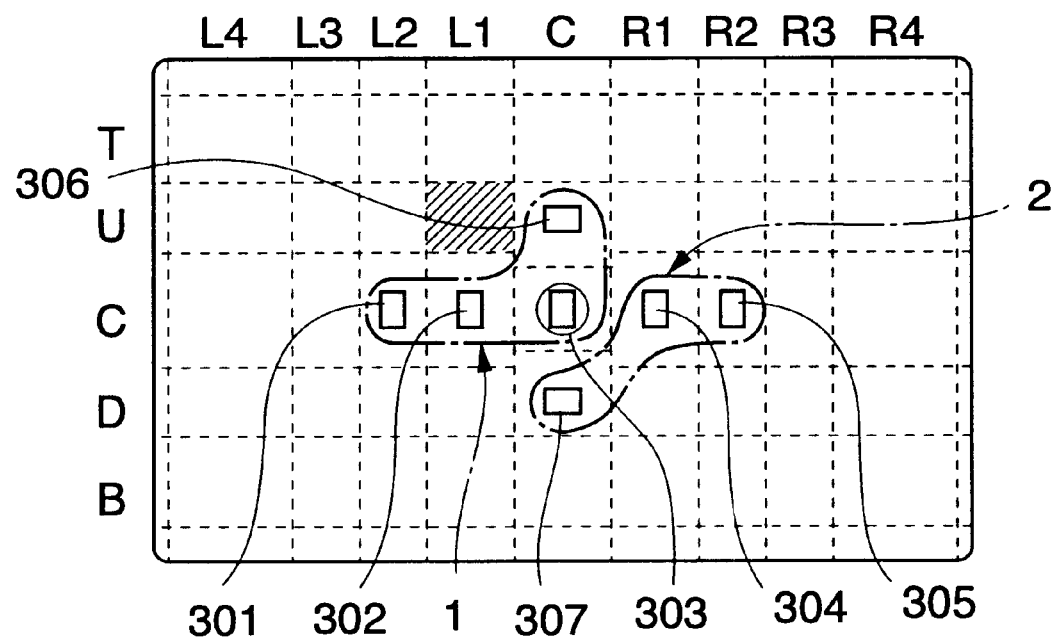
Figure 25I:
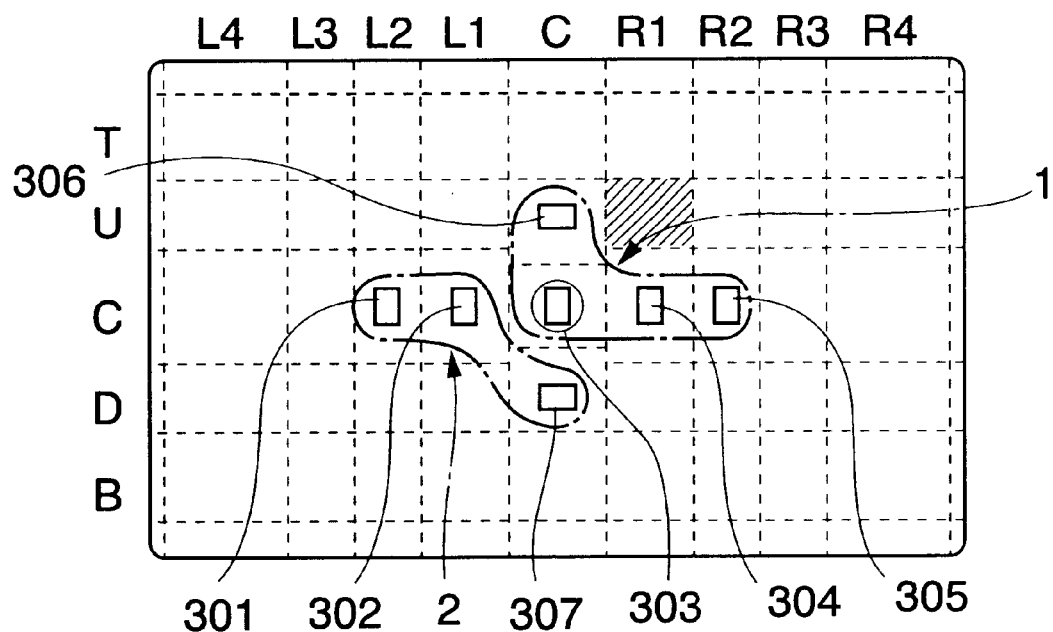
Figure 25J:
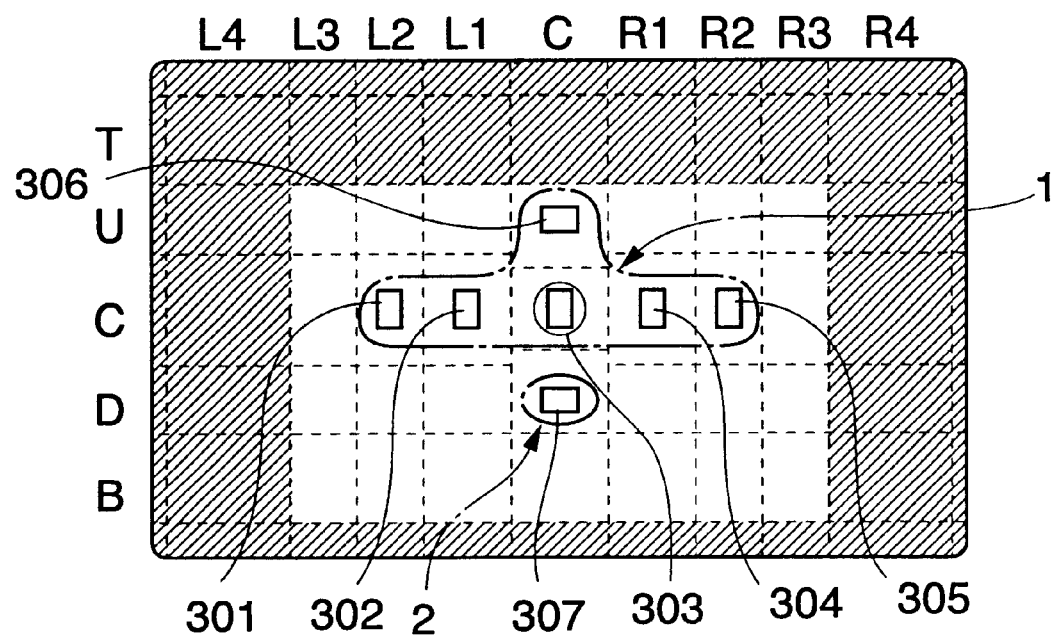
Figure 26A:
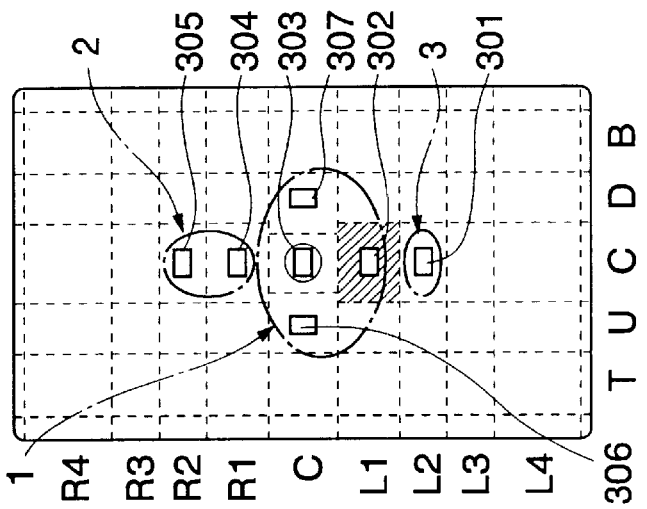
Figure 26B:
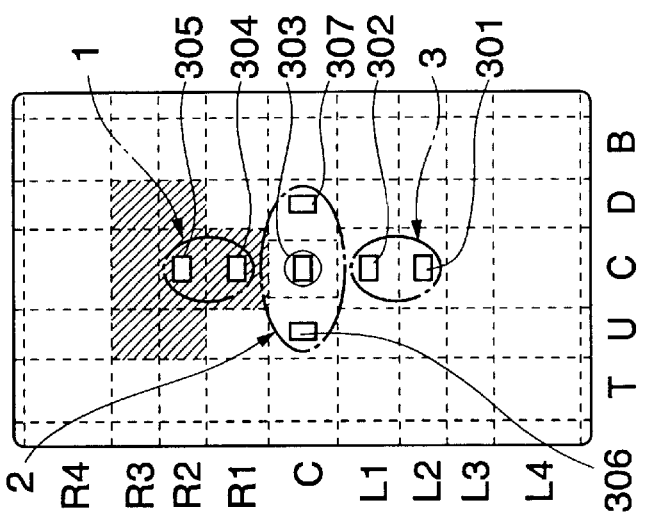
Figure 26C:
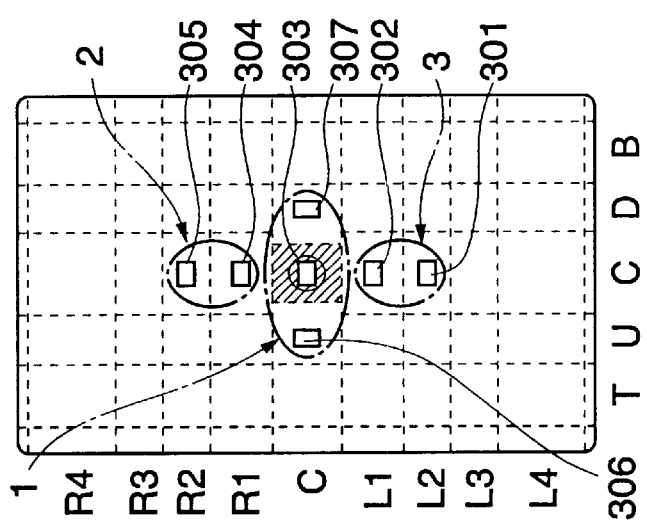
Figure 26D:
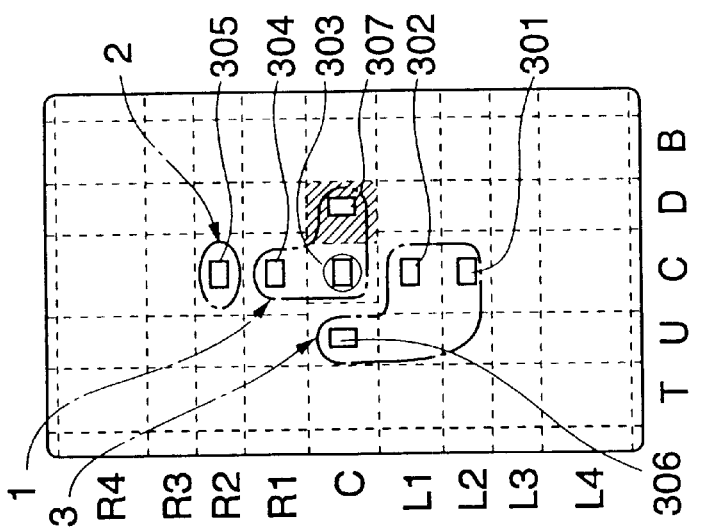
Figure 26E:
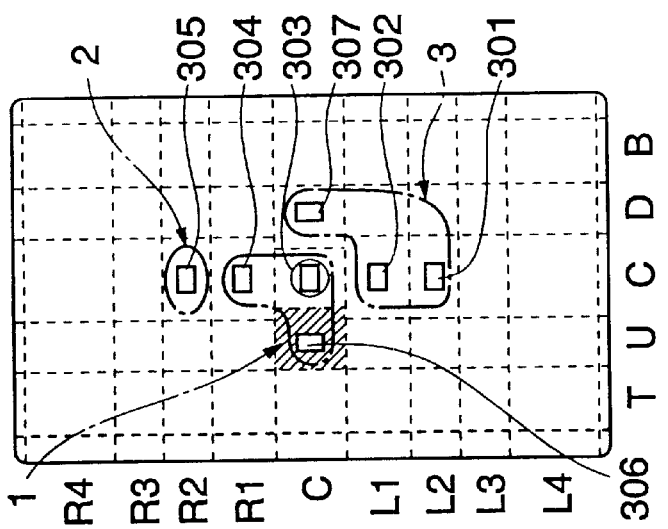
Figure 26F:
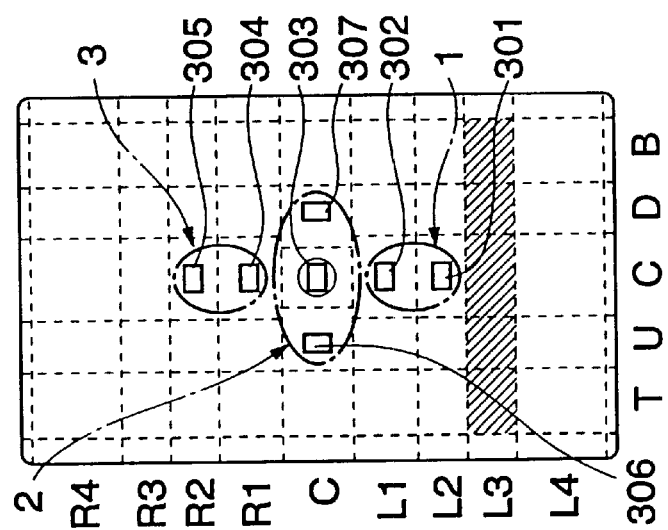

In FIGS. 25J and 26I, the photographer does not gaze any subject, so that the first, second, and third priority groups are defined based only on the probability of the presence of the main subject with respect to the position of the camera. Further, as is apparent from FIG. 26C, neither the gazing point area nor the grouping is symmetrical in the vertical direction of the observing screen, and the first priority group is extended upward. This is because the probability that the main subject is present near the bottom of the screen is low.

Referring again to FIG. 23, as described above, based on the defocus information on the seven AF points, at least two lines are selected with reference to the subject nearest to the camera as an AF point group containing the main subject (step#709), and the AF points are grouped according to the gazing area based on the coordinates of the photographer's gazing point (steps#710 and #711). Then, the process proceeds to a step #712 to select one AF point.

The selection of one AF point will be described below with reference to a flow chart in FIG. 27.

At a step #901, the CPU 100 selects the grouping ① as the first priority group. At the next step #902, the CPU 100 checks whether or not any lines constituting AF points are present within the grouping ①. If any such lines are present, the process proceeds to a step #903. At this step, the CPU 100 selects one of the lines within the grouping ① which can be determined to correspond to the subject nearest to the camera, by comparing the defocus amounts of the lines together. At the next step #905, that line is selected as the one AF point, thus completing the AF point selection.

On the other hand, if it is determined at the step #902 that if no line is present within the grouping ①, the process proceeds to a step #906. At this step, the CPU 100 selects the grouping ② as the second priority group. At the next step #907, the CPU 100 checks whether or not any lines constituting AF points are present within the grouping ②. If any such lines are present, the process proceeds to a step #908. At this step, the CPU 100 selects one of the lines within the grouping ② which can be determined to correspond to the subject nearest to the camera. At the next step #905, that line is selected as the one AF point, thus completing the AF point selection.

On the other hand, at the step #907, if no line is present within the grouping ②, the process proceeds to a step #909. At this step, the CPU 100 selects the grouping ③ as the third priority group. At the next step #910, the CPU 100 selects one of the lines within the grouping ③ which can be determined to correspond to the subject nearest to the camera. At the next step #905, that line is selected as the one AF point, thus completing the AF point selection.

In this manner, one AF point is determined according to the group process priorities for determining the one AF point. Since at least two lines are selected as the AF point group at the above described step #709 (specifically, the steps #810, #809, #816, #817, and #818 in FIG. 24), one AF point can always be selected.

Figure 9:
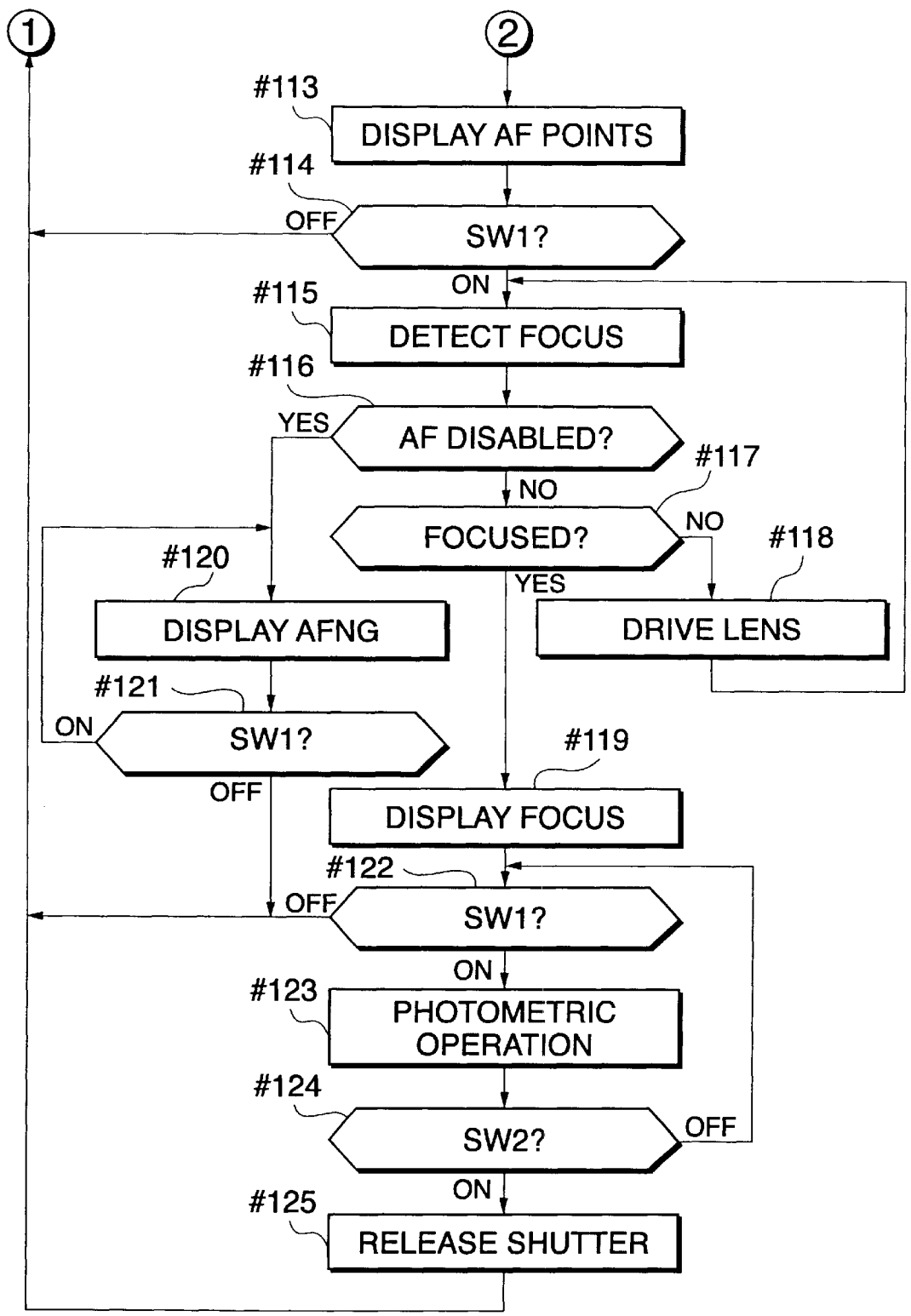
FIG. 9 is a flow chart showing a continued part of the operation shown in FIG. 8.

After the AF point selection has been completed, the process proceeds to the step #113 in FIG. 9, showing the continued part of the operation shown in FIG. 23. The steps #113 to #125 are the same as those in the first embodiment, and description thereof is omitted.

Now, a description will be given of an actual example of photographing with reference to FIGS. 28A and 28B and according to a flow chart in FIG . 24.

Figure 28A:
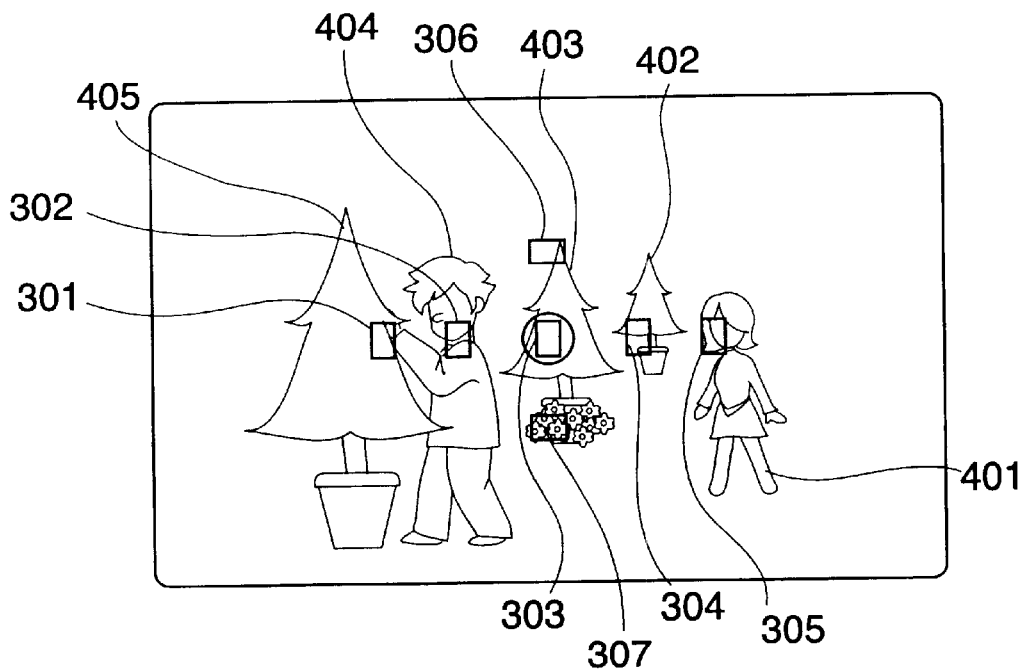
FIGS. 28A and 28B are views showing an example of selection of the AF point according to the second embodiment.

FIG. 28A shows subjects 401, 402, 403, 404, and 405 as viewed by the photographer through the finder observing screen 300 in FIG. 2 when a taking lens of 50 mm focal distance is mounted in the camera. In this case, the main subject, which the photographer gazes to focus the lens on, is shown at 401.

In the illustrated subject arrangement, it is difficult for the photographer to be conscious of the subjects 404 and 405 located away from the main subject 401 gazed by the photographer.

In FIG. 28A, the main subject 401, which the photographer gazes to focus the lens on, is captured by the AF point A305. The subject 402 is captured by the AF point 304. The subject 403 is captured by the AF points 303 and 307. The subjects 404 and 405 are captured by the AF points 302 and 301, respectively.

The subject 405, lying nearest to the camera, is located 2.55 m away from the image forming plane. The subject 404, lying second nearest to the camera, is located 3.00 mm away from the image forming plane. The subject 401, lying third nearest to the camera, is located 4.00 mm away from the image forming plane. The subject 403, lying fourth nearest to the camera, is located 7.00 mm away from the image forming plane. The latter three subjects are present within 5 m from the subject 405 nearest to the camera, in the infinity direction, i.e. within the intermediate defocus range according to the present embodiment. Only the subject 402 is present 10.00 m away from the image forming plane. The subject 402 is not present within 5 m from the subject nearest to the camera, in the infinity direction nor within the small defocus range according to the present embodiment.

Under these photographic conditions, when the automatic selecting process (step #707) shown in FIG. 23 is executed, an output from the line constituting the AF point 306, in which no subject is present, results in an error. A luminance distribution is successfully extracted from the other lines constituting the other AF points 301, 302, 303, 304, 305, and 307, that is, defocus amounts can be obtained therefrom. In other words, focus is successfully detected from these lines.

Subsequently, since focus has been successfully detected from the plurality of lines, the process proceeds from the step #802 in FIG. 24 to the step #804. At this step, as a line at the shortest distance, the line constituting the AF point 301, capturing the nearest subject 405, is extracted as the line A.

Here, if the automatic AF point selecting mode (step #105c) has been selected, the line constituting the AF point 301, capturing the nearest subject 405, is selected as the AF point. That is, the line constituting the AF point 305 is not selected, which AF point partly overlaps the main subject 401, which the photographer gazes to focus the lens on.

At the next steps #805 and 806, the line constituting the AF point 305, capturing the main subject 401, which is present within the intermediate defocus range, and the lines constituting the AF points 303, 307, 302, and 301, capturing the subjects 403, 404, and 405, respectively, are extracted as the lines B. At the next step #807, since no subject is present within the small defocus range, the process proceeds to the step #810, where the AF points 301, 302, 303, 305, and 307, constituting the lines A and B, are defined as the AF point group containing the main subject.

As described above, the effects of the above operations will be described below.

1) The AF point group containing the main subject is comprised only of AF points from which the defocus information could be obtained and focus could be successfully obtained. As long as the AF point is selected from this group, the latter is formed only of AF points on which a focusing operation can subsequently be performed by driving the lens. Accordingly, the camera can be focused on all AF points subsequently selected from the AF point group containing the main subject.

2) Further, the main subject 402 is present outside the predetermined range from the subject nearest to the camera in the infinity direction. Thus, the line constituting the AF point 304, capturing the subject 402, is not selected to be included in the AF point group.

Thus, the automatic selecting process (step #707), shown in FIG. 23, takes into consideration the probability of the presence of the main subject within the predetermined range from the subject nearest to the camera in the infinity direction.

Now, subsequent operations will be described below with reference to FIG. 28B.

Figure 28B:
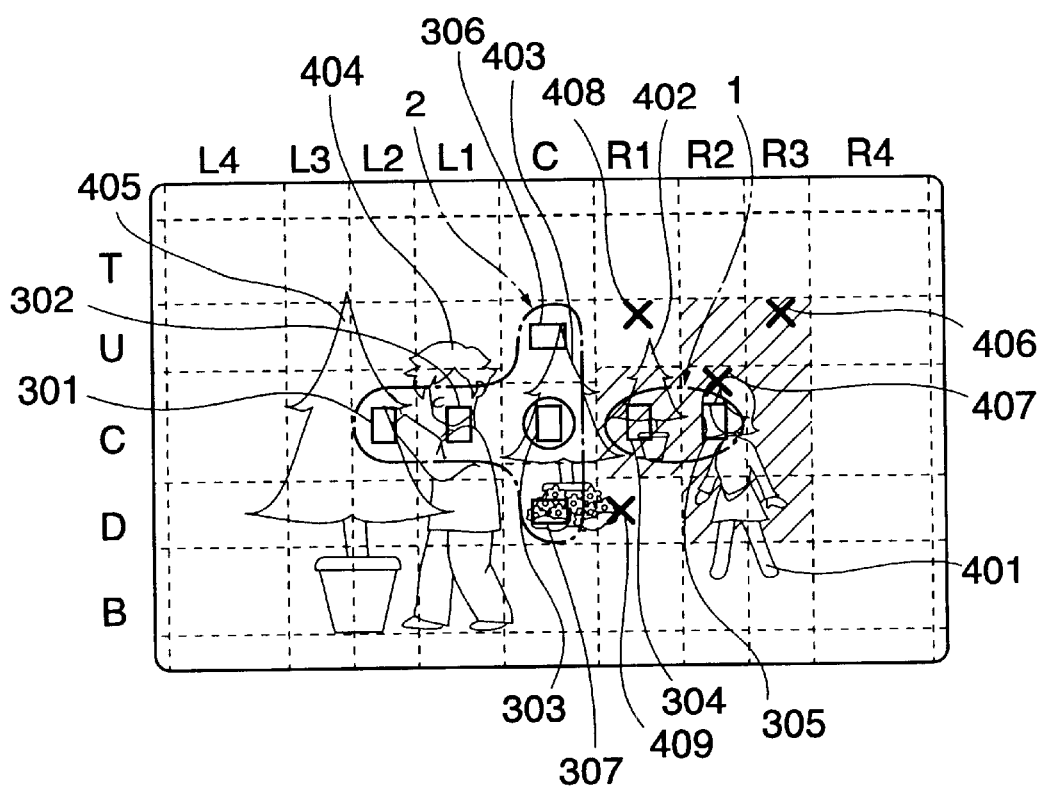

FIG. 28B is a similar view to FIG. 28A, with additional illustration of the photographer's gazing points 406, 407, 408, and 409 calculated at the step #709 after the line-of-sight detection (step #708) following the automatic selecting process (step #707), shown in FIG. 23. Furthermore, FIG. 28B has FIG. 25D superposed thereon, which shows the grouping table corresponding to the gazing points 406 and 407.

If the calculated photographer's gazing point is 407 which is located near the AF point 305, capturing the main subject 401, on which the photographer desires to focus, then even in the line-of-sight input mode (step #105c) shown in FIG. 23, the main subject can be captured by the AF point 305 within the gazing point area R2·C, in which the coordinates of the gazing point are located.

If, however, the photographer's gazing point calculated as a result of the line-of-sight detection is 406 which is deviates slightly from his intention, then the camera is brought into the automatic AF point selecting mode (step #105c) because in the line-of-sight input mode (step #105c) shown in FIG. 23, the AF point 305 is not present in the gazing point area R3·U, in which the coordinates of the gazing point 406 are located. In this case, as described previously, the line or AF point constituting the AF point 301, capturing the nearest subject 405 is selected. That is, the AF point 305 is not selected, which constitutes a part of the main subject 401, on which the photographer gazes to focus the camera.

In this manner, in the mode (step #105c) shown in FIG. 23 and in which the AF point is selected using line-of-sight inputs, if the result of the detection of the photographer's line of sight deviates slightly from his intention and is unclear, then the AF point 305 cannot be selected, which captures the main subject 401, on which the photographer desires to focus the camera.

Then, a grouping table corresponding to the probability of the presence of the main subject is determined based on the gazing point 406 (step #711), calculated at the step #709 after the line-of-sight detection (step #708) following the automatic selecting process (step #707), shown in FIG. 23. In this case, the grouping table in FIG. 25B is selected, and the AF point selection is then carried out (step #712). Then, it is checked whether or not the line constituting the AF points 304 and 305 is present within the grouping ①, the first priority group for the AF point selection (step #903). In this case, the grouping ① contains the line constituting the AF points 304 and 305. Since, however, the AF point 304 is determined to be absent from the group containing the main subject as a result of the above described automatic selecting process (step #707), the AF point 305 is selected, which captures the main subject 401, on which the photographer desires to focus the camera.

On the other hand, the photographer's gazing point, that is, the result of the line-of-sight detection deviates slightly from his intention and is 408, then the grouping table in FIG. 25I is determined to be used at the step #711. If the gazing point is 409, the grouping table in FIG. 25F is determined to be used at the step #711. With either grouping table, however, the AF point selection (step #712) results in the selection of the AF point 305, capturing the main subject 401, on which the photographer desires to focus the camera, as described previously.

The second and subsequent groups for the AF point selection (step #712) are located farther from the photographer's gazing point than the first priority group. That is, the photographer's gazing point deviates significantly from his intention, so that the probability of the presence of the main subject is low. Thus, the AF point is often selected from the grouping ① for the first priority group.

As described above, even if the photographer's gazing point, that is, the result of the line-of-sight detection deviates slightly from his intention and is unclear, the operations of determining the grouping table and selecting the AF point are performed taking into consideration the probability of the presence of the main subject based on the location of the photographer's gazing point. Consequently, the main subject 401, on which the photographer desires to focus the lens, can be captured by the AF point 305, capturing the main subject 401.

The configuration of the above described second embodiment will be described below in short.

The AF point group containing the main subject is selected based on the defocus information detected from the plurality of AF points, in order to take the probability of the presence of the main subject into consideration. Thus, the AF point group is formed only of the AF points from which the defocus information has been obtained, that is, the AF points with which the focusing operation can subsequently be performed by driving the lens. Accordingly, the camera can be focused on all the AF points subsequently selected from the AF point group containing the main subject. That is, unless the photographer brings the main subject out of the AF point, the release operation after the focusing is ensured.

The gazing point which is the information on the photographer'line of sight, is not used to select one of a plurality of AF points present within the observing screen, but the AF points are grouped into a plurality of groups based on the location of the gazing point, that is, the information on the photographer's line of sight with respect to the entire observing screen. These groups are provided beforehand and correspond to respective AF point groups containing the main subject. These groups are formed taking the probability of the presence of the main subject into consideration, and the process priorities are set therefor. According to these parameters, a AF point group containing the main subject is further selected to select at least one AF point is selected therefrom. As a result, the information on the photographer's line of sight can be used as information on his intention over a wide area of the observing screen.

Furthermore, one AF point is determined by selecting AF points talking into consideration two different probabilities of the presence of the main subject, i.e. the defocus information and the information on the photographer's line of sight and executing a process according to the above described grouping tables and group process priorities.

Further, one AF point is selected according to the previously provided grouping tables and group process priorities, based on the defocus amounts of a plurality of AF points obtained at a time and on the information on the photographer's line of sight obtained only once. That is, it is unnecessary to calculate the defocus amounts of all the AF points for repeated calculations based upon each other.

Moreover, the grouping tables and the group process priorities are switched according to the information on the camera position. The first priority group includes AF points near the user's gazing point. Furthermore, in selecting one AF point from the group, an AF point is selected, for which has been obtained a defocus amount indicating that the AF point is nearest to the camera.

Then, the focusing lens is focused using a signal based on the defocus amount obtained from the selected one AF point.

In the first and second variations of the embodiment, the present invention is applied to the single-lens reflex camera, but it is applicable to other cameras or optical apparatuses that enable focus to be detected at a plurality of AF points.

Furthermore, the present invention is applicable to ranging devices that can detect information on the distance to an object using a plurality of ranging points on a screen, or to cameras or optical apparatuses provided with such ranging devices.

What is claimed is:

1. An optical apparatus comprising:
    a plurality of focus detecting areas provided on an observing screen and from which focus information on a subject is detected;
    a line-of-sight detecting device that picks up an image of an eyeball of a user to detect a location of a gazing point of the user;
    a grouping circuit that groups said focus detecting areas into a plurality of groups with priorities based on the detected location of the gazing point; and
    a selecting circuit that selects one of the groups according to the priorities and selects at least one focus detecting area from the selected group.

2. An optical apparatus according to claim 1, further comprising:
    a position detecting device that detects position information on a position of said optical apparatus; and
    wherein said grouping circuit groups said focus detecting areas into the plurality of groups with priorities based on the detected location of the gazing point and the detected position information.

3. An optical apparatus according to claim 1, further comprising:
    a reliability determining circuit that determines reliability of the detected location of the gazing point; and
    wherein said grouping circuit groups said focus detecting areas into the plurality of groups with priorities based on the detected location of the gazing point and a result of the determination of the reliability.

4. An optical apparatus according to claim 1, wherein said grouping circuit executes the grouping according to preset tables.

5. An optical apparatus according to claim 1, wherein said selecting circuit executes a process of selecting a focus detecting area from a group with a higher priority of the plurality of groups, and if the selection from this group fails, executes a process of selecting a focus detecting area from each of the remaining groups by sequentially lowering the priority of the group until the selection succeeds.

6. An optical apparatus according to claim 1, wherein the plurality of groups includes a group with a highest priority that contains a focus detecting area near the location of the gazing point.

7. An optical apparatus according to claim 1, wherein said selecting circuit uses different selecting methods between a group with a highest priority and the other groups of the plurality of groups.

8. An optical apparatus according to claim 3, further comprising:
    a correcting circuit that corrects individual differences in eyeball characteristics of the user; and
    wherein said reliability determining circuit determines the reliability of the detected location of the gazing point using a size of the user's pupil detected by said correcting circuit and a number of corrections executed by said correcting circuit.

9. An optical apparatus comprising:
a plurality of focus detecting areas provided on an observing screen and from which focus information on a subject is detected;
a line-of-sight detecting device that picks up an image of an eyeball of a user to detect a location of a gazing point of the user;
a storage circuit that stores tables used to group said focus detecting areas into a plurality of groups with priorities based on the detected location of the gazing point; and
a selecting circuit that selects one of the groups according to the priorities and selects at least one focus detecting area from the selected group.

10. An optical apparatus according to claim 9, further comprising:
a position detecting device that detects position information on a position of said optical apparatus and a reliability determining circuit that determines reliability of the detected location of the gazing point; and
wherein said grouping circuit groups said focus detecting areas into the plurality of groups with priorities based on the detected location of the gazing point, the detected position information, and the determined reliability.

11. An optical apparatus comprising:
a plurality of ranging areas provided on an observing screen and from which information on a distance to a subject is detected;
a line-of-sight detecting device that picks up an image of an eyeball of a user to detect a location of a gazing point of the user;
a grouping circuit that groups said ranging areas into a plurality of groups with priorities based on the detected location of the gazing point; and
a selecting circuit that selects one of the groups according to the priorities and selects at least one ranging area from the selected group.

12. An optical apparatus comprising:
a plurality of ranging areas provided on an observing screen and from which focus information on a subject is detected;
a line-of-sight detecting device that picks up an image of an eyeball of a user to detect a location of a gazing point of the user;
a storage circuit that stores tables used to group said ranging areas into a plurality of groups with priorities based on the detected location of the gazing point; and
a selecting circuit that selects one of the groups according to the priorities and selects at least one ranging area from the selected group.

13. An optical apparatus comprising:
a plurality of focus detecting areas provided on an observing screen and from which a defocus amount of a subject is detected;
a focus information detecting circuit that detects a defocus amount of each of said plurality of focus detecting areas;
a line-of-sight detecting device that picks up an image of an eyeball of a user to detect a location of a gazing point of the user;
an area selecting circuit that selects a focus detecting area which has a defocus amount falling within a predetermined range, with reference to one of focus detecting areas from which the defocus amounts have been detected, the one of focus detecting areas being determinable to be at a shortest distance;
a grouping circuit that groups the selected focus detecting area into a plurality of groups with priorities based on the detected location of the gazing point; and
a selecting circuit that selects one of the groups according to the priorities and selects at least one focus detecting area from the selected group.

14. An optical apparatus according to claim 13, further comprising:
a position detecting device that detects position information on a position of said optical apparatus; and
wherein said grouping circuit groups said focus detecting areas into the plurality of groups with priorities based on the detected location of the gazing point and the detected position information.

15. An optical apparatus according to claim 13, wherein said selecting circuit executes a process of selecting a focus detecting area from a group with a higher priority of the plurality of groups, and if the selection from this group fails, executes a process of selecting a focus detecting area from each of the remaining groups by sequentially lowering the priority of the group until the selection succeeds.

16. An optical apparatus according to claim 13, wherein the plurality of groups includes a group with a highest priority that contains a focus detecting area near the detected location of the gazing point.

17. An optical apparatus comprising:
a plurality of ranging areas provided on an observing screen and from which a defocus amount of a subject is detected;
a focus information detecting circuit that detects a defocus amount of each of said plurality of ranging areas;
a line-of-sight detecting device that picks up an image of an eyeball of a user to detect a location of a gazing point of the user;
an area selecting circuit that selects a ranging area which has a defocus amount falling within a predetermined range, with reference to one of ranging areas from which the defocus amounts are successfully detected, the one of ranging areas being determinable to be at a shortest distance;
a grouping circuit that groups the selected ranging area selected into a plurality of groups with priorities based on the detected location of the gazing point; and
a selecting circuit that selects one of the groups according to the priorities and selects at least one ranging area from the selected group.

18. A camera comprising:
a plurality of focus detecting areas provided on an observing screen and from which focus information on a subject is detected;
a line-of-sight detecting device that picks up an image of an eyeball of a user to detect a location of a gazing point of the user;
a grouping circuit that groups said focus detecting areas into a plurality of groups with priorities based on the detected location of the gazing point; and
a selecting circuit that selects one of the groups according to the priorities and selects at least one focus detecting area from the selected group.

19. A camera comprising:
a plurality of focus detecting areas provided on an observing screen and from which focus information on a subject is detected;

a line-of-sight detecting device that picks up an image of an eyeball of a user to detect a location of a gazing point of the user;

a storage circuit that stores tables used to group said focus detecting areas into a plurality of groups with priorities based on the detected location of the gazing point; and a selecting circuit that selects one of the groups according to the priorities and selects at least one focus detecting area from the selected group.

20. A camera comprising:

a plurality of ranging areas provided on an observing screen and from which information on a distance to a subject is detected;

a line-of-sight detecting device that picks up an image of an eyeball of a user to detect a location of a gazing point of the user;

a grouping circuit that groups said ranging areas into a plurality of groups with priorities based on the detected location of the gazing point; and a selecting circuit that selects one of the groups according to the priorities and selects at least one ranging area from the selected group.

21. A camera comprising:

a plurality of ranging areas provided on an observing screen and from which focus information on a subject is detected;

a line-of-sight detecting device that picks up an image of an eyeball of a user to detect a location of a gazing point of the user;

a storage circuit that stores tables used to group said ranging areas into a plurality of groups with priorities based on the detected location of the gazing point; and a selecting circuit that selects one of the groups according to the priorities and selects at least one ranging area from the selected group.

22. A camera comprising:

a plurality of focus detecting areas provided on an observing screen and from which a defocus amount of a subject is detected;

a focus information detecting circuit that detects a defocus amount of each of said plurality of focus detecting areas;

a line-of-sight detecting device that picks up an image of an eyeball of a user to detect a location of a gazing point of the user;

an area selecting circuit that selects a focus detecting area which has a defocus amount falling within a predetermined range, with reference to one of focus detecting areas from which the defocus amounts have been detected, the one of focus detecting areas being determinable to be at a shortest distance;

a grouping circuit that groups the selected focus detecting area into a plurality of groups with priorities based on the detected location of the gazing point; and a selecting circuit that selects one of the groups according to the priorities and selects at least one focus detecting area from the selected group.

23. A camera comprising:

a plurality of ranging areas provided on an observing screen and from which a defocus amount of a subject is detected;

a focus information detecting circuit that detects a defocus amount of each of said plurality of ranging areas;

a line-of-sight detecting device that picks up an image of an eyeball of a user to detect a location of a gazing point of the user;

an area selecting circuit that selects a ranging area which has a defocus amount falling within a predetermined range, with reference to one of ranging areas from which the defocus amounts are successfully detected, the one of ranging areas being determinable to be at a shortest distance;

a grouping circuit that groups the selected ranging area selected into a plurality of groups with priorities based on the detected location of the gazing point; and a selecting circuit that selects one of the groups according to the priorities and selects at least one ranging area from the selected group.

* * * * *

UNITED STATES PATENT AND TRADEMARK OFFICE
CERTIFICATE OF CORRECTION

PATENT NO.   : 6,456,788 B1
DATED        : September 24, 2002
INVENTOR(S)  : Tadasu Otani It is certified that error appears in the above-identified patent and that said Letters Patent is hereby corrected as shown below:

<u>Column 2,</u>
Line 6, delete "and-a" and insert -- and a --.

Signed and Sealed this

Thirtieth Day of September, 2003

JAMES E. ROGAN
*Director of the United States Patent and Trademark Office*